(12) United States Patent
Knapp et al.

(10) Patent No.: US 6,995,310 B1
(45) Date of Patent: Feb. 7, 2006

(54) METHOD AND APPARATUS FOR SENSING AND DISPLAYING TABLATURE ASSOCIATED WITH A STRINGED MUSICAL INSTRUMENT

(75) Inventors: R. Benjamin Knapp, Sebastopol, CA (US); J. Daniell Hebert, San Francisco, CA (US); Robert L. Miller, San Francisco, CA (US); Kevin A. McFarland, Concord, CA (US)

(73) Assignee: Emusicsystem, San Francisco, CA (US)

( * ) Notice: Subject to any disclaimer, the term of this patent is extended or adjusted under 35 U.S.C. 154(b) by 478 days.

(21) Appl. No.: 10/200,083

(22) Filed: Jul. 18, 2002

Related U.S. Application Data

(60) Provisional application No. 60/306,494, filed on Jul. 18, 2001.

(51) Int. Cl.
*G10H 1/18* (2006.01)
(52) U.S. Cl. .............................. 84/722; 84/462; 84/645
(58) Field of Classification Search .................. 84/723, 84/735, 645, 722, 462
See application file for complete search history.

(56) References Cited

U.S. PATENT DOCUMENTS

| | | | |
|---|---|---|---|
| 3,837,256 A | 9/1974 | Gullickson | |
| 4,080,867 A | 3/1978 | Ratanangsu | |
| 4,286,495 A | 9/1981 | Roof | |
| 4,466,324 A | 8/1984 | Okamoto et al. | |
| 4,480,521 A | 11/1984 | Schmoyer | |
| 4,563,391 A | 1/1986 | Tanner et al. | |
| 4,688,460 A | 8/1987 | McCoy | |
| 4,690,026 A | 9/1987 | McCoy | |
| 4,694,723 A | 9/1987 | Shinohara et al. | |
| 4,730,530 A | 3/1988 | Bonanno | |
| 4,791,848 A | 12/1988 | Blum, Jr. | |
| 4,915,005 A | 4/1990 | Shaffer et al. | |
| 4,947,726 A * | 8/1990 | Takabayashi | 84/743 |
| 5,012,086 A | 4/1991 | Barnard | |
| 5,024,134 A * | 6/1991 | Uchiyama | 84/654 |
| 5,040,447 A * | 8/1991 | Murata et al. | 84/612 |
| 5,074,182 A | 12/1991 | Capps et al. | |
| 5,214,232 A | 5/1993 | Iijima et al. | |
| 5,237,126 A | 8/1993 | Curtis et al. | |
| 5,266,735 A | 11/1993 | Shaffer et al. | |
| 5,270,475 A * | 12/1993 | Weiss et al. | 84/603 |
| 5,408,914 A | 4/1995 | Breitweiser, Jr. et al. | |
| 6,066,791 A | 5/2000 | Renard et al. | |

(Continued)

FOREIGN PATENT DOCUMENTS

| | | |
|---|---|---|
| CA | 921738 | 2/1973 |
| DE | 32 43 563 A1 | 5/1984 |
| DE | 35 28 991 A1 | 2/1987 |

*Primary Examiner*—Jeffrey W Donels

(74) *Attorney, Agent, or Firm*—John P. O'Banion

(57) ABSTRACT

A system and method of enhancing guitar instruction based on Tablature Plus encoding of playing techniques within a MIDI file or other data structure, that may be rendered on an associated player application that provides multimedia output of the piece being played including a number of playing techniques. The system hardware for encoding the information comprises a pickup head for registering string motion, and optionally a hand motion and finger positioning sensor, such as a data glove, for simultaneously registering the actions of the guitarist while playing the piece. The software comprises algorithms for determining note pitch and duration, and for extracting playing techniques from the data being collected. Multimedia player software is also described which renders a visual and audio output for the Tablature Plus encoded file, wherein the encoded playing techniques are represented within the display output.

135 Claims, 36 Drawing Sheets

U.S. PATENT DOCUMENTS 6,107,557 A     8/2000   Fukada
6,162,981 A *  12/2000   Newcomer et al. ....... 84/485 R
6,188,008 B1    2/2001   Fukata
6,191,348 B1    2/2001   Johnson

* cited by examiner

METHOD AND APPARATUS FOR SENSING AND DISPLAYING TABLATURE ASSOCIATED WITH A STRINGED MUSICAL INSTRUMENT

CROSS-REFERENCE TO RELATED APPLICATIONS

This application claims priority from U.S. provisional application Ser. No. 60/306,494 filed on Jul. 18, 2001, incorporated herein by reference.

STATEMENT REGARDING FEDERALLY SPONSORED RESEARCH OR DEVELOPMENT

Not Applicable

REFERENCE TO A COMPUTER PROGRAM LISTING APPENDIX

Appendix A entitled "Source Code Listing" referenced herein is contained in the enclosed compact disc in a file entitled "EMU5292 Source Code.txt" created on Jul. 12, 2002 and having a 235 kb file size. The computer program code, which exceeds 300 lines, is submitted on compact disc in accordance with 37 CFR 1.52 and 1.96. Duplicate identical compact discs are provided according to 37 CFR 1.52(e)(4). Appendix A contained on the compact disc is incorporated by reference herein.

NOTICE OF MATERIAL SUBJECT TO COPYRIGHT PROTECTION

A portion of the material in this patent document is subject to copyright protection under the copyright laws of the United States and of other countries. The owner of the copyrights has no objection to the facsimile reproduction by anyone of the patent document or the patent disclosure, as it appears in the United States Patent and Trademark Office file or records, but otherwise reserves all copyrights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to learning to play stringed instruments and more particularly to a system and method for providing multimedia instruction for learning how to play musical pieces for a guitar, bass guitar (generally referred to simply as a "bass" by guitarists), or similar stringed instruments which is played by hand, or using a pick.

2. Description of the Background Art

There are approximately ten million people in the United States who play guitar. After acquiring the basic skills such as how to hold, tune, play chords, and strum, the vast majority of individuals invest significant time trying to learn to play all or parts of songs that they have heard and enjoyed.

In order to learn to play all, or a portion, of various guitar musical pieces, guitar players have historically relied on a variety of teaching tools and resources. Skilled guitarists able to hear a piece and immediately figure out what was played, and how it was played are rare individuals. For most guitar players, the ability to hear, deconstruct, and replicate by ear the performance of another guitarist is very difficult, wherein they must rely on other resources for learning a new piece of guitar music. Those resources typically involve a combination that may include lessons from teachers or friends, books, videos, audiotapes, software, and, more recently, web based lessons. These learning approaches can be readily grouped into interactive and non-interactive categories.

The interactive category involves being tutored by the teacher on how to perform the guitar piece, wherein the student watches the teacher, asks questions, attempts to duplicate the notes and playing techniques while receiving feedback and encouragement from the instructor. Students typically are able to learn a piece more readily using interactive learning methods than with non-interactive "book learning". However, interactive learning has a number of disadvantages, including cost, scheduling time, location, finding a competent teacher that has mastered the pieces of interest, lesson structure, communication difficulties between student and teacher. Guitarists wanting to learn may seek out guitar playing friends to teach them a new piece. However, similar instructor related issues arise and in many cases the ability to play a piece is not indicative of an ability to instruct a student to play the piece.

The less effective non-interactive approach involves reading, watching, or listening to others explain how to play the piece. This approach generally does not involve feedback, although recently, there have been some attempts at creating software applications that confirm whether the student has played the notes or chords correctly. There are many resources for this type of teaching and each has its own style and approach. However, all (with the exception of pure audio instruction) rely on presenting material that illustrates the music. In other words, non-interactive approaches illustrate some representation of the notes, chords, and techniques required to play all or part of a song. The presentation of the notes, chords, and techniques has been historically accomplished by depicting standard notation, chord diagrams, tablature, and more recently, virtual fretboards. All of these techniques have significant shortcomings that reduce their overall effectiveness.

Standard Notation

Conventional music notation, or standard notation, was derived from vocal music in the Middle Ages. It will be recognized that as the human voice produces one note at a time, it is considered generally monophonic. Standard notation was created for representing music for monophonic instruments, along with some polyphonic instruments, such as pianos and organs. Standard notation is commonly seen when taking piano lessons and conveys the notes and tempo for instruments that have only one way to play a particular note.

Chord Diagrams and the Guitar

The guitar is a true polyphonic instrument, with multiple simultaneous notes which may each be played in a variety of ways. Notation for guitar is generally represented in the form of chord diagrams, which are pictures of chords in which a particular fingering is utilized when multiple strings are struck, picked, plucked, or strummed. Chord diagrams represent where to press down on the strings along a guitar neck to play a collection of notes that represent the chord. Thousands of chord diagrams exist and they do not provide for representing individual notes, the sequence of notes, transitioning in or out of the chord, or the tempo.

Music for a guitar represent a unique challenge for a notation system because not only is it polyphonic, but a number of ways exist for playing any one note. Having to make a selection on where to play a particular pitch on a guitar is not the exception, but the rule. Notational confusion can arise in that one can play the same scale (identical pitches) using a number of different combinations of locations, positions, and fingerings on the guitar fretboard. Standard musical notation as well as chord diagrams are inadequate for conveying the information contained in a piece of guitar music.

Tablature

Tablature was created as a notation for stringed instruments to overcome a number of these shortcomings. Tablature for a guitar comprises six lines which represent the guitar strings, and numbers for representing fret positions along those strings.

Tablature Provides:
  Indication on which notes to play-string to strike and fret to play it with.
  Hammer-ons, pull-offs, bends, slides, harmonics and vibrato.
  Tuning for the piece.
  Information on use of capos and so forth.
  Rhythm of the piece (long notes versus short notes).

If the tuning information is not given explicitly, then normal tuning may be assumed.

Tablature does not Provide:
  Note lengths (aside from standard rhythmic notation).
  Which fingers to fret which note.
  Information about picking and strumming.
  User determines whether upstrokes/downstrokes.
  Easy to read notation.
  How to finger and execute bending, vibrato, and so forth.
  Symbols in tablature are difficult to read and provide no information on nuances.

It will be appreciated therefore, that conventional tablature is a helpful representation system, however, it is incapable of conveying the information necessary for properly and rapidly learning a piece of guitar music. As indicated, since note lengths are not provided, the user will generally need to listen to the song themselves, with the tablature in front of them, and work out the rhythm of the notes being played. Although some tablature formats provide standard rhythmic notation, (i.e. quarter notes, eighth notes, and so forth, built into or displayed above it) this is often of limited value insofar as a limited percentage of guitarists are capable of reading music. It is difficult with conventional tablature to correlate sight with sound in learning a guitar piece. One of the difficulties of understanding tablature, is that it is out of context with the accompanying music, wherein the symbols utilized in tablature may be more readily understood when the associated music is heard as well as being seen in the tablature form. Correlating sight with sound allows the student to quickly pick up and remember how long a bend lasts, how much the note is bent, whether there is vibrato added to the bend, and a number of other related playing metrics.

Aside from being deficient with regard to indicating "how" notes are to be played, conventional tablature does not provide indications of "why" the notes are being played. This "why" can be thought of in different ways: (1) visually since the notes in a chord, scale, riff, and so forth form a visual pattern, and after repeated exposure an individual begins recognizing common visual patterns shared between musical pieces, or (2) aurally since it is common practice to add "flavor" to different chords, scales, and so forth by playing notes not usually found in the chord or scale, (3) in addition to the "why" of guitar playing, the "why" of music in general.

The use of conventional tablature does not teach the user about music theory, such as recognition of note names, degrees of the scale, different scales, modes, inversions, interactivity, slowing down, looping, and so forth.

Although some computer music applications now display a virtual fretboard on a computer monitor with lights and often numbers to indicate fingering, they do not indicate timing or technique, wherein the student is required to experiment or to work closely with an instructor familiar with the piece.

Commercial teaching programs (i.e. Voyetra Teach Me Guitar™, eMedia guitar method™) can provide limited on-screen animated tablature as an instructional tool. The display within these applications render six horizontal lines representing guitar strings and vertical lines representing frets, with dots appearing on the strings and frets to indicate fingering. The tools, however, provide no means for conveying information on how the notes are to be played, such as downstroke/upstroke, bending, slides, hammer-ons, pull-offs, muting, and other techniques. In addition, these systems lack means for creating and composing content for their particular display technique. Although MIDI data may be received in a limited capacity by these tablature systems, they generally only display pieces which are either built into the software package, or encoded by the software developer in a proprietary format.

Sequencers:

Other popular software packages (i.e. Cakewalk Guitar Studio™), being referred to as "sequencers" read MIDI data from a file, or in real time, from a MIDI enabled device, and may provide tools for electronically composing music. Amongst these tools is a tablature translator that receives music written in standard notation and converts it to tablature for guitars. The tablature notation used in "Cakewalk Guitar Studio" is similar to that of the teaching programs and remains generally lacking in features for representing specialized playing techniques.

Enhanced Tablature:

There also exist programs that enable a user to manually edit tablature files to include specialized playing notation such as bar lines, single and double repeats, hammer-ons, pull-offs, slide up/down, dead notes, vibrato, ghost notes, bends, time signatures, tempo markers, tap, slap/pop, text, above and below staves, paragraph text, rhythmic notation, including dotted notes and triplets. One such program, Bucket O' Tab™, is freely distributed on the Internet. This and others programs with similar capabilities, however, are limited to creating and editing the tablature manually, most do not read MIDI files directly and have no interface capabilities with MIDI instruments. Presently, tablature files can not be automatically created that include fingering information, timing information, and other metrics associated with the hand motions of the musician. Currently, the creation of enhanced tablature files is performed by manually editing the tablature files after capture by having a trained musician analyze the music and edit the files to include the enhanced information.

Guitar to Tablature Interfaces:

Patents such as U.S. Pat. No. 4,970,935 by Bonano, issued 1987 and U.S. Pat. No. 5,270,475 by Weiss, issued 1993 describe various hardware implementations of extracting pitch (pitch tracking) and timing from the guitar and sending that information to the computer. These patents attempt to distinguish themselves from guitars that have switch inputs on the fretboard by stating that their guitars are stringed musical instruments while these other implementations are not. The switch activated patents distinguish themselves by stating that they can determine exact finger position by sensing where the strings have been manipulated. It should be appreciated, however, that the feedback still does not convey the use of the hands by the musician, or the subtleties of technique in the way the musician plays the piece.

Therefore, a need exists for a multimedia guitar instruction system that provides a multimedia output according to how the musician played the given piece of music, and which does not require manually entering information as to how the piece was played. The present invention satisfies those needs, as well as others, and overcomes the deficiencies of previously developed guitar instructional software.

BRIEF SUMMARY OF THE INVENTION

The present invention provides a tutorial system for learning guitar pieces. In particular the invention comprises two main components, (1) a system for capturing notes, tempo, and playing techniques within a new notation format (such as rich MIDI containing enhanced tablature notation), and (2) a system for generating multimedia output including audio and animated images which depict not only "what" notes are played but "how" those notes are played.

Current systems provide the user with "what" notes are played, wherein only the notes being played are captured and displayed, or may be read from a listing. By contrast, the present system includes encoding of information on "how" the notes are played. During a performance of a particular guitar piece the note and technique information is captured (encoded) into a combined data stream, such as a rich MIDI stream within an enhanced tablature format, referred to herein as Tablature Plus (TAB+). The system for capturing the information may be referred to as a TAB+ encoder. A student may then learn the performed guitar piece using a TAB+ player, which receives the TAB+ file or data stream and generates a multimedia tutorial output of the captured "what" and "how" of the performance in a visually rich user friendly format. In addition to a rich MIDI format, the TAB+ data structure may take many forms to accommodate the new digital rights management encoding as well as other appropriate data structures, such as those created by other music creation software.

In particular, the present system registers both the notes played on each string of the guitar, and the fingering techniques utilized to create those notes, such as how the note is played and plucked. The system can recognize a variety of playing techniques regardless of whether the note is a harmonic, a hammer-on, a pull-off, a slide, a bend, and so forth. The system also provides a new way to see and learn music, as it provides a computer generated multimedia output including a display of precisely the guitar fingering actions that the guitarist executed when playing the particular piece of music as captured using the system, along with accompanying audio. It will be appreciated that the system does not "record", per se, the audio and video of the piece being played, but instead registers notes, tempo (or similarly note durations), and guitar specific playing techniques associated with the piece being played. The registration of the notes, tempo, and guitar specific playing techniques, however, may be generated in response to individual string motion data, contained in a stream or data file, which has been digitized for processing by the TAB+ encoder. The system output is preferably configured for displaying the entire guitar, or active portions thereof such as frets and board; illustrating how notes, chords, fingering, strumming, and picking is performed along with the general techniques utilized. Furthermore, the display of the guitar may be optionally shown with or without the hand of the musician being displayed. The musician's hands may be preferably shown without visually blocking other portions of the guitar, such as by displaying fingertips only (i.e. ovals, fingernail icons, etc.), hand/finger outlines, transparencies, and combinations thereof.

The use of the Tablature Plus format in the present invention provide the advantages of both interactive and non-interactive learning. Live playing can be captured with its subtle nuances into a rich MIDI file containing Tablature Plus notation, that may be compactly saved, stored, edited, or communicated, such as over the internet. Users can load the Tablature Plus modified MIDI files into a Tablature Plus player application to view how the piece is being played while listening to the MIDI-based audio rendition of the piece (computer generated). The system thereby allows the student to more readily learn how to play the given piece, as they can see each contributing movement, they can repeat sections, slow it down, change viewing angles, see it with and without the hand positioning of the musician, and alter other displayed aspects of the performance to enhance the learning experience.

During a performance, the information may be captured automatically from the guitar. The data stream or file thereby created, provides a digital representation of note pitch and duration (rhythm) in addition to notations associated with the notes and transitions between notes about the guitar specific playing techniques utilized. Playing technique corresponding to the note pitch and duration, can be determined from a motion sensing device, from registration and algorithmic processing of string movement, or from a combination thereof. Registration of playing technique may be performed in real time, or may be preferably performed in non-real time wherein the processing algorithms can accurately extract all available information from the registered data, whether it comprises string motion data, hand motion data (data glove outputs), or a combination thereof.

The TAB+ encoder may be implemented utilizing electronic hardware containing a processor element that is configured for executing encoding routines as described. By way of example, the encoder may be implemented on a computer system adapted with inputs for the digitized pickup information, such as from a data acquisition board therein. The computer system may comprise a personal computer, laptop, gaming console, tablet PC, workstation, mainframe, or other computer system capable of registering the inputs as described. Alternatively, the encoder may be implemented on a circuit having an embedded microcontroller, microprocessor, digital signal processor, or other processing element.

It should be appreciated that the data stream or file does not contain a recording of the audio and video corresponding to playing the piece, but instead provides a digital data sequence, which can be considered a document and printed out as such, regarding both the notes played and the techniques utilized for playing those notes. The digital data sequence preferably comprises data that follows a rich MIDI format with extensions, the format of the tablature notation including the particular extensions used herein being referred to as Tablature Plus. Files, which may also be referred to as documents since they can be represented textually, following the Tablature Plus format may be quickly and efficiently created within the system and shared between users. It will be appreciated that the storage requirements for a digital data sequence file, such as the rich MIDI Tablature Plus files, is far less than that required for storing an audio and video recording. Furthermore, the digital data sequence file contains only the music and playing techniques, wherein details that are unnecessary and could be distracting to a student trying to learn a given piece of music are eliminated.

The TAB+ player may be implemented utilizing electronic hardware containing a processor element that is configured for converting the Tablature Plus guitar specific playing annotations into displayed playing techniques. Preferably, the electronic hardware simultaneously decodes note pitch and duration information from the file, such as from an enhanced MIDI formatted file, and generates the synthesized audio for the musical piece. By way of example, the encoder may be implemented on any computer system having a display and an audio output. The computer system may comprise a personal computer, laptop, PDA, gaming console, tablet PC, workstation, mainframe, or similar computer systems capable of providing a visual display.

Possible Uses of the Tablature Plus System:

The Tablature Plus format can generally be thought of as a new form of multimedia "sheet" music, one that is superior to the use of standard notation, chord diagrams, and tablature for conveying how to play songs using a guitar. The present system allows for the generation of Tablature Plus files when a given piece of music is played. The resultant files provide a form of instruction that may be rapidly deployed in a number of ways. The generated data stream, or file, may be played from a data disk, received over a network, such as the Internet, or communicated and received in other ways by a computer running a player application according to the present invention which provides a user friendly visual and auditory tutorial. The player application reads the Tablature Plus files and generates multimedia instructions including both visual information showing how the piece is played and accompanying audio information (synthesized audio from the MIDI data) of the piece being played. The system embodies a new way to teach guitar playing that approaches having a live guitar teacher. Additionally, the captured information may be output in other formats, including a hard copy format, which for example could be utilized for publishing guitar music. The data stream or file may be communicated to other musicians.

One benefit of the present invention lies in the ability to create Tablature Plus during playing of the guitar and/or the use of subsequent processing thereof. The playing information may be either captured directly or determined by computational means from captured string motion data. In either case, a pickup, such as an optical pickup head, piezoelectric head, magnetic head, and so forth, are utilized to detect the motions of the strings associated with the pitch and rhythm of play.

To directly and accurately capture the techniques of play, the hand movements of the guitarist may be optionally captured, such as by using a data glove, or similar motion registration means which preferably includes a means for detecting finger positioning, and preferably capturing the relationship of the fingers with the hand of the musician. The input from the data glove and pickup head are processed within the system using a set of algorithms for determining not only the musical aspects of the piece, such as the notes being played, but how the piece was played; these aspects being incorporated within the Tablature Plus notation generated.

To determine playing information from sound related data, a set of signal processing routines is utilized that extract "how" the notes were played based on guitar specific parameters. These guitar specific techniques (GST) are capable of algorithmically mapping the detected string motions for a guitar into the actions required for creating that string motion. It may be said that the software algorithms described for the present invention are therefore cognizant of the specific techniques utilized within a guitar for creating the registered string motions. It is contemplated that the GSTs will be further refined, or parameter driven, based on the type and/or model of guitar being utilized. This algorithmic method of encoding guitar playing techniques allows Tablature Plus data streams, or files, to be created without the use of a data glove, or other direct motion registration means, although the number of playing techniques registered may be somewhat restricted using algorithms exclusively.

A second aspect of the present invention is the ability to play a Tablature Plus file including illustrating the fingering and plucking techniques that were actually used while playing the piece, in addition to MIDI generated audio for the given music. The playback preferably includes both computer generated audio of the notes being played in addition to a computer generated animated display of the playing techniques used to generate those notes. The animation includes the display of notes being played and guitar fingering. Preferably, the user can select whether representations of the musicians hands are to be shown. The musician's hands can preferably be shown as fingertips, outlines, semi-transparently, combinations thereof, or using other forms of representation.

The Tablature Plus based learning environment for guitars provided by the present invention allows an individual to readily learn how to play the given guitar music piece without the need of tutoring from a musician that is at least competent with playing that piece.

An object of the invention is to increase the speed with which a musical piece may be learned on the guitar, bass, or similar stringed instrument.

Another object of the invention is to provide methods of registering "how" notes were played on a guitar.

Another object of the invention is to directly register "how" notes were played from a hand motion sensing means coupled to the system, which preferably includes registration of finger positioning.

Another object of the invention is to indirectly register "how" notes were played by utilizing signal processing routines for extracting play information from collected string motion information.

Another object of the invention is to provide "guitar specific techniques", (GST) in which play information may be extracted from string motion which is specific to how notes are generated on a guitar.

Another object of the invention is to provide for the generation of Tablature Plus data files (similar to or such as rich MIDI files) that include extended information about "how" notes were played (playing techniques) during the MIDI recording.

Another object of the invention is to provide a player application capable of reading the MIDI files as enhanced with the play information.

Another object of the invention is to provide a player capable of multimedia output wherein playing the piece of music along with common playing techniques is visually displayed.

Another object of the invention is to provide an animated (moving) display of guitar playing according to an enhanced form of MIDI file of a given piece of music.

Another object of the invention is to provide an animated display of guitar playing in which colors and shading are utilized to increase the ease with which displayed playing techniques may be recognized.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 36. It will be appreciated that the apparatus may vary as to configuration and as to details of the parts, and that the method may vary as to the specific steps and sequence, without departing from the basic concepts as disclosed herein.

1. Overview of Architecture.

Figure 1:
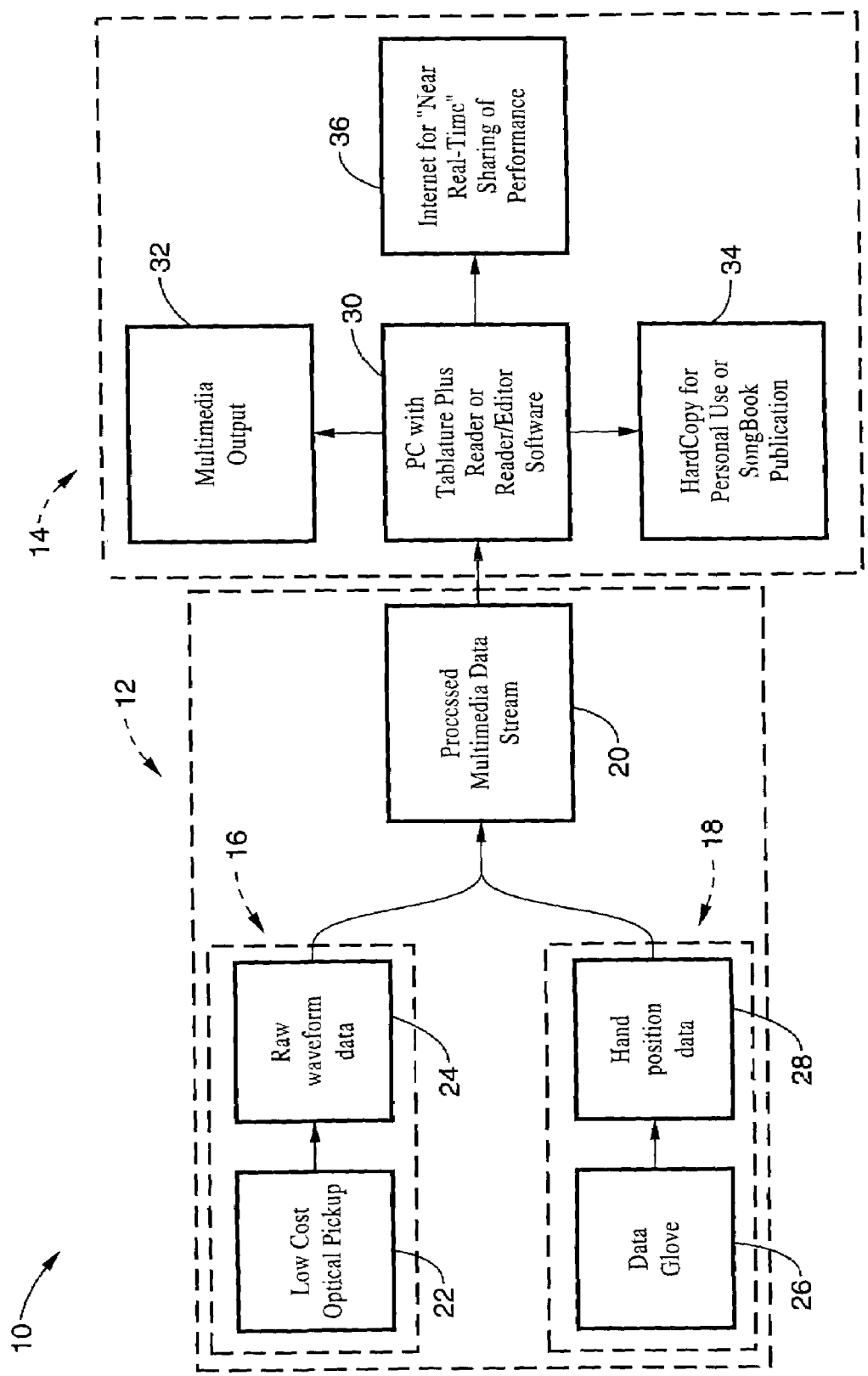
FIG. 1 is a block diagram of a guitar instruction system according to an embodiment of the present invention, showing generation of Tablature Plus from information from a pickup head in combination with an optional data glove along with a multimedia guitar tutorial application which reads the Tablature Plus data file and outputs multimedia instruction on playing the piece.

FIG. 1 depicts a representative block diagram for the present invention 10 showing the generation 12 of Tablature Plus and the reading of the generated Tablature Plus 14 data within a player application for providing multimedia instruction as described within the present invention, along with other forms of distribution.

Tablature Plus generation 12 is shown comprising the combination of data streams from a pickup 16, such as an optical pickup, and from an optional data glove 18, or similar mechanism for collecting data about the motions, preferably hand and finger motions (positions), of the guitarist as a musical piece being played is encoded by the system into a Tablature Plus data stream or data file within the present encoding system. The pickup and hand motion data are being processed collectively, with notes and playing techniques being extracted to create a Tablature Plus data stream as per block 20. The raw digital waveform data generated from the optical pickup and the positioning and finger movement data from the data glove are combined within block 20 into a processed data stream, having packets which each represent a string being played/muted or a pitch being modified which includes information as found in the rich MIDI tablature format, augmented by fingering information, wherein all the information is provided on a per-string basis. Alternatively, the motion data may be determined from the signal generated from the optical pickup, and optional monitoring input, using algorithmic methods, preferably based on guitar-specific techniques.

The generation of the pickup data being preferably provided by a low-cost optical pickup 22, that is processed to create raw waveform data within block 24. The pickup registers the entire analog waveform of the string(s) that have been strummed which is digitized for processing. It should be appreciated that accurate acoustics are not required of the pickup, because the system is converting the guitar playing into a MIDI sequence with the addition of Tablature Plus information, and the pickup is not used for generating actual audio. Hand motions are preferably registered through the use of a data glove 26, or similar, that is processed as per block 28 to provide hand position data. A data glove device can be utilized which records hand and finger positioning along with movement. An example of this type of data glove device is the Virtex Cyberglove™. The two sets of data are then processed and combined into a single data stream, as per block 20, containing the multimedia commands associated with the Tablature format. It will be appreciated that a simpler hand and finger motion sensing device, or devices, may be utilized, such as acceleration sensors, touch sensors, and so forth, whose output may be registered in combination with the string motion sensing of the hexaphonic head to aid in the extraction of the playing techniques. Although the use of a sophisticated data glove, with hand motion detection and finger positioning, can register all the subtle nuances of play, simpler data gloves, or other forms of motion detection may be utilized for registering a wide range of playing techniques. One other simple device for registering play related motions, is the use of a simple three axis accelerometer, mounted to one or both hands for detecting the movements thereof. The signals from the sensor, however, can require substantial signal processing to extract the playing techniques. Furthermore, other forms of motion registration, such as movement extraction algorithms from camera imaging, and others, may be less preferably performed to determine the movements relating to performing the particular piece of guitar music.

The playing 14 of the MIDI files with the Tablature Plus notation is represented as a computer 30 configured for reading, and/or editing the Tablature Plus files, and which can provide a number of different outputs. The reading of Tablature Plus data may be configured for output on a multimedia output device 32, preferably providing a video display and synthesized MIDI audio, the combination of reader 30 and multimedia output 32 comprising a player application. A similar output may be directed as hardcopy 34 for off-line use or for use with a published output. Finally, the output may be directed over a network, such as the Internet, for the real-time sharing 36 of performance data.

2. String Motion Pickup.

A pickup head provides for registering motions in each of the separate strings. The depicted pickup head is an infrared hexaphonic pickup that emits infrared optical energy toward the string and detects the infrared optical energy being reflected from the strings of the guitar, bass, or similar fretted stringed instrument.

Figure 2:
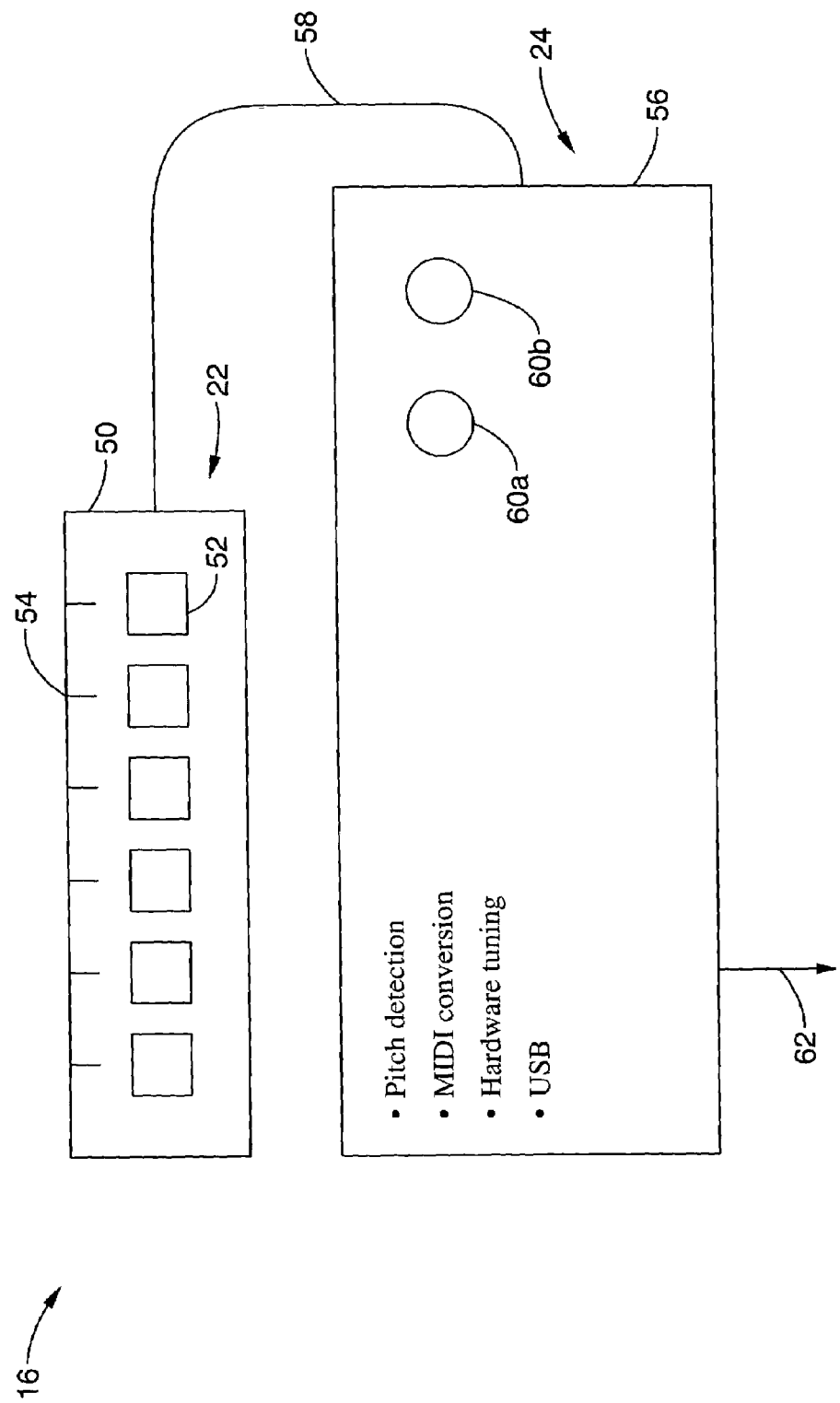
FIG. 2 is a block diagram of an optical pickup head according to an aspect of the present invention, shown with an optical detector head wired to processing electronics for generating a MIDI data stream.

FIG. 2 depicts an example of an optical pickup, exemplified as an Emusic™ optical pickup 16 having a sensor module 22 and an electronics processing module 24. Optical pickup 16 provides a computer input device for a guitar using techniques similar to U.S. Pat. No. 5,213,232 to Lijima et al., however, preferably implemented at reduced cost as a consequence of the output not being required to provide sufficient accuracy for reproducing the actual audio. The optical pickup device is typically affixed to an existing guitar by a user or manufacturer utilizing any convenient fastening means such as glue, screws, and so forth, although the optical pickup may be integrated within the design of a guitar. For example, the present system may also utilize string motion information derived from an accurate guitar pickup within a guitar from which audio is being generated. Often these accurate pickups (optical, piezoelectric, magnetic, etc.) are integrated within the guitar body to provide an improved alternative to conventional forms of acoustical pickups. The signals from this accurate optical pickup may be additionally routed to a MIDI signal processing module to create a data stream for use in the present invention.

When considering a system utilizing a data glove, or other motion sensing means, a conventional MIDI signal processing module may be utilized with the pickup. It is preferable, however, to utilize digitized raw signals for processing within the software so that playing information may be extracted from the string motion data. In considering the use of the system without a data glove, it is important that substantially raw digitized string motion data be received by routines determining the guitar specific techniques so that all nuances of play represented in the waveforms may be extracted.

Sensor module 22 is affixed under the strings of the guitar near the bridge, and the electronics module 24 is generally affixed to the guitar body in a location that is conveniently out of the way of the user. Sensor module 22 is shown with a housing 50, infrared sensors 52, and a set of alignment marks 54 for aligning the sensors with the strings. Sensor module 22 contains at least one dedicated emitter and infrared sensor for each string to sense the vibration of each string based on reflection and to generate hexaphonic analog signals to an associated electronics module. Typically a cover (not shown) is utilized to protect the infrared sensors from ambient infrared interference. The output of sensor module 22 is directed to electronics module 24 which detects the pitch for each string, encodes it into MIDI format and sends the resulting data stream to the PC, such as communicated over a USB connection.

Electronics module 24 comprises a housing 56, connected for receiving signals from the infrared sensors within sensor module 22 over a wired connection 58. Electronics module 24 is shown with optional tuning LEDs 60a, 60b to indicate whether each string is in tune, annunciated for instance utilizing LEDs for sharp 60a and flat 60b. The pitch data is converted by the circuitry into a MIDI format data stream, or a similar format into which a pitch sequence may be encoded. The data is then communicated to a PC, such as over a universal serial bus (USB) 62 or other communications protocol.

Figure 3:
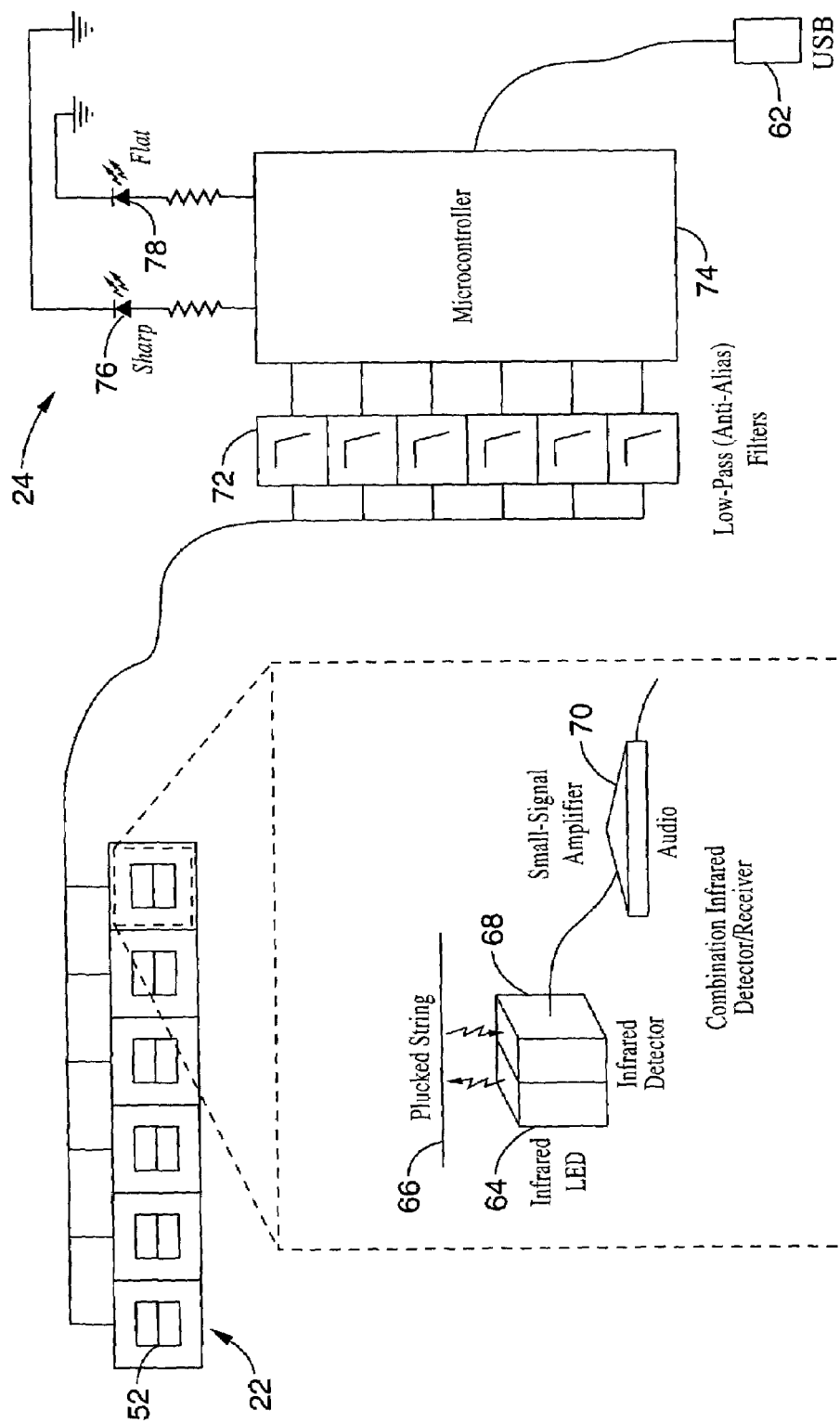
FIG. 3 is a block diagram of hexaphonic head signal processing according to an aspect of the present invention shown with a detail of the infrared LED and detector used for sensing string motions.

FIG. 3 depicts the interconnection of optical pickup 22 with the functions of electronics module 24. The infrared detector 52 reads string vibration information for each of the six strings of the guitar using infrared emitter-detector pairs aligned directly under the strings. An infrared emitter 64 generates infrared electromagnetic radiation toward string 66, the reflected light being detected by infrared detector 68 and amplified by a small-signal amplifier 70. String motions show up as a modulation of the reflected infrared radiation which is detected by infrared detector 68, which is carried within the amplified signal to electronics module 24. Electronics module 24 is preferably configured with a low cost microcontroller shown receiving each of the hexaphonic signals through a set of low-pass anti-aliasing filters 72, the output of which is received by the inputs of microcontroller 74 for processing. The programming of the microcontroller is executed for detecting pitch, providing hardware tuning, and performing MIDI conversion which is generated on an output 62, such as according to the universal serial bus (USB) standard. Feedback for string tuning is provided by microcontroller 74, which detects sharpness and flatness which is indicated by the LEDs 76, 78.

It should be appreciated that the above describes the use of a generally conventional optical pickup with a microprocessor for extracting MIDI pitch information, however, the present invention may derive the pitch information utilized in conjunction with hand motion sensing in a number of alternative ways. In addition the pickup may be used to generate raw string motion data that is digitized before being processed within a computer that executes algorithms for detecting not only pitch, but the guitar specific playing techniques associated with the notes. Therefore, the pitch, or string motion information provided by the low cost optical pickup may be utilized in a number of ways including, the detection of notes and chords being played by the user for encoding a performance, utilized separately or in combination with the data glove data for encoding the fingering and plucking, or striking, techniques associated with a given piece, for comparing a performance through software intervention to suggest refinements or corrections, or for sending real-time musical information over networks for collaboration with other users. It should also be appreciated that the output of the pickup may be connected directly to an input of a standard personal computer data acquisition system.

Therefore, the optical pickup system may be connected to a microprocessor or directly into a computer system, such as a conventional personal computer, using a communications port such as a USB port, serial port, parallel port, and so forth. Alternatively, the optical pickup system may be connected to a MIDI synthesizer using a MIDI cable, or a hexaphonic cable similar to those utilized by Roland®. If the playing techniques utilized in playing the piece are to be registered by processing signals from the optical pickup system, then the signals to be processed should be obtained directly from the optical detector, or at least with minimal post processing, wherein all available information may be extracted from the signal.

3. Tablature Plus Player.

The basic concept of the Tablature Plus player software is to use data streams or data files, according to the data format described previously, to drive a multimedia display having a visual display representing the instrument being played, and an audio system for playing the accompanying audio which synthesizes the sound from the MIDI information. The received MIDI file with Tablature Plus notation extensions is processed to extract the MIDI information for use in generating audio, and for extracting the playing techniques for visual display to accompany the audio. The multimedia output is preferably created as a dynamic image stream of the notes being played on the guitar, which is a non-static output that illustrates both the notes being played and the transitions between the notes.

The multimedia output provides a large amount of instructional content on both what and how a piece of guitar music is played. The system may be utilized by musicians who want to learn how to play a given piece of music, even though they may lack the ability to read music. Again, the purpose of using the Tablature Plus file within the present system is to provide the capability for describing common guitar techniques, such as harmonic characteristics of a note, string muting, bends, slides, finger/fret relationship, hammer-ons, pull-offs, event timing, and so forth, within a MIDI based data file. Audio may be synthesized from the MIDI information, while the information on "how" the notes were played is encoded within the extended portion of the MIDI data which may be utilized by a multimedia player to accurately render the playing techniques visually from the original performance when the data stream, or file were encoded.

3.1 Visual Display.

Figure 4:
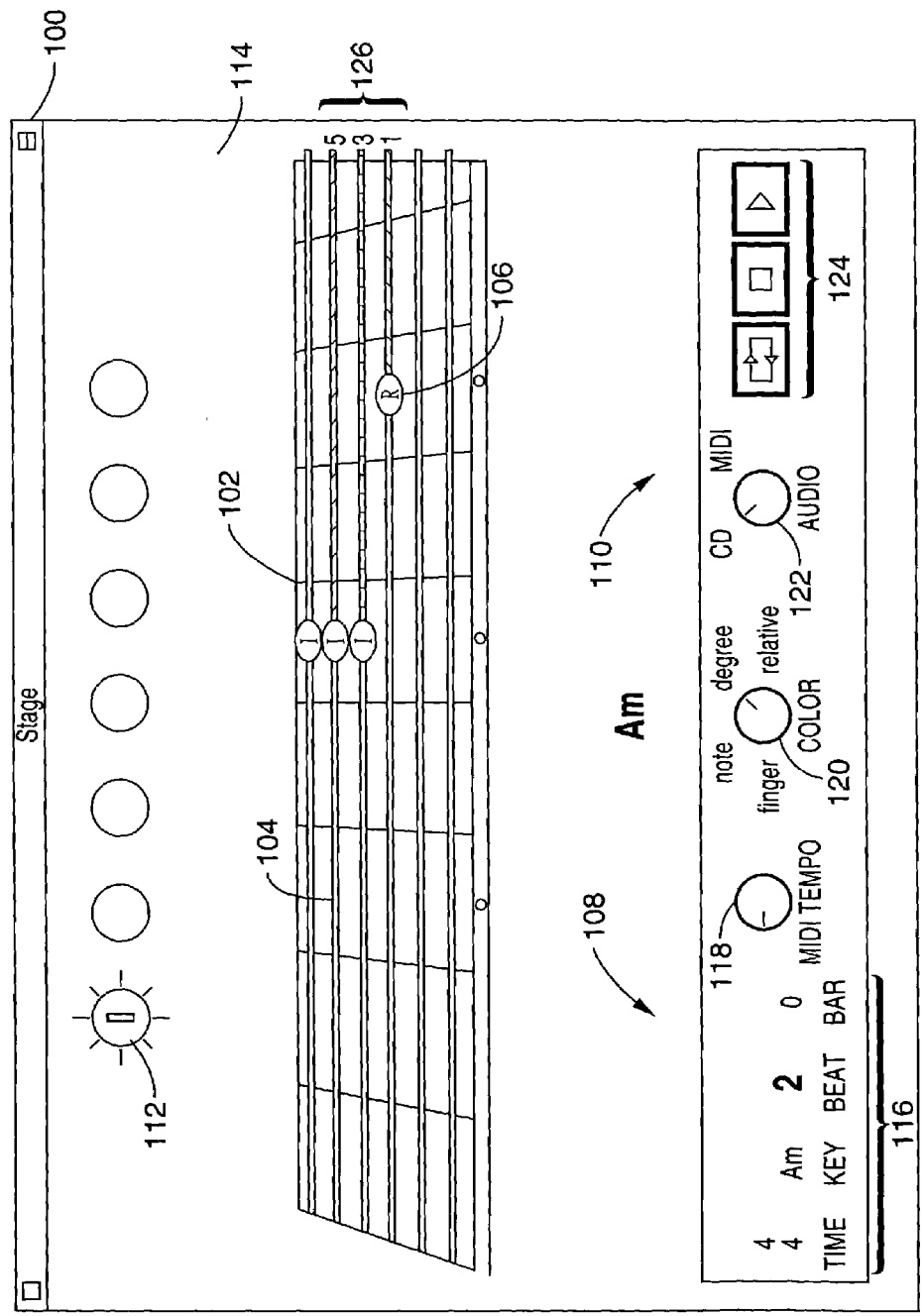
FIG. 4 is a screen shot representing the output of the Tablature Plus reader according to the present invention, shown outputting a guitar image with fingering and technique information to aid in learning the piece of music.

FIG. 4 through FIG. 12 represent screenshots which exemplify aspects of the visual display provided by the present invention. Referring first to FIG. 4, a screenshot 100 is depicted showing a guitar neck 102, strings 104, and finger positioning 106 for the left hand. It will be appreciated that the fingers of the left hand may be denoted using symbols, for example wherein "I" is for index finger, "M" is for middle finger, "R" is for ring finger, and "P" is for the pinky finger. In the figure three adjacent strings are being pressed by the index finger, as denoted by the "I" character within the oval, while a separate position is being pressed by the ring finger, as denoted by the "R" character within another oval. It should be noted that the screen shot is depicted from the point of view of the musician looking down at the guitar, wherein the top of the guitar is represented at the bottom of the screen.

In this way the student can more readily model the playing techniques in view of their actual instrument. Each time a note is heard by the user, they see the corresponding string on the guitar light up, vibrate, then fade away, matching the decay of the actual note. The attack and sustain are preferably denoted on the system by lighting strings accordingly to represent attack, sustain, and decay of a note, or by otherwise visually animating the actions corresponding to the playback of the encoded piece of music.

A set of information outputs 108, and control inputs 110 are preferably provided on the player system. The notes may be shown in colors 112 at the top of the screen or in their relative position within the key of the song being played. It will be appreciated that a desired background image 114, such as a default or user selected background image, may be displayed behind the guitar. Furthermore, it is contemplated that animated backgrounds may be generated which change in time with the music, or may visually convey additional tonal "colorings" of the music.

A scale output 116 provides information about the piece being played, such as its timing (shown as 4/4) along with its key, beat, and bar. A MIDI tempo control 118 allows the user to control the pace or rate of playing to facilitate instruction. A color selector 120 allows user selection of coloring to match fingering, notes, degrees, and relative pitch in the key. An audio selector 122 is provided wherein the accompanying audio can be selected as either the actual song, or the MIDI synthesized audio, according to user preference and depending on the availability of actual audio. MIDI audio configures the player to play back the MIDI notes with enhanced Tablature Plus features at any speed desired using the MIDI player available on most personal computers. The CD audio setting configures the player to play the actual recording of the song synchronized to the player animation. While the audio quality is superior in this mode, it does not allow for continuous playback speed adjustment, only selected speeds such as full speed, half speed, and so forth. A set of controls 124, such as repeat, stop, and play are provided for controlling the system while learning the piece. Notations on the strings 126 convey the fingering of the strumming/picking hand, typically the right hand for right handed guitar players.

Goals of the programming within the player application which control the display of the guitar, with notes and playing techniques, are to visually model exactly what is occurring at the guitar string, while avoiding the use of printed static symbology, as would appear with standard tablature, and instead illustrating a visual animated onscreen representation of the events including techniques being utilized. For instance, if the left hand bends a string, the onscreen representation of that string visually bends. If the left hand "shakes" the string to apply vibrato, the onscreen string representation mimics the string shaking. The initial direction of movement of the string is configured to match the actual direction that the string was picked, using either "downstrokes" or "upstrokes". If the right hand mutes a string, the initial flash of light representing the string attack is accordingly displayed as muted. If a note is sounded by the non-picking hand to provide "hammering on" or "pulling off" of the string, then the visual representation indicates this and the string attack is shown muted by a certain amount, as well as no upstroke or downstroke information being conveyed.

3.2. Visual Representations of Actions.

The most basic playing technique is the striking of a string(s) to play a note(s). Preferably, modulating the displayed color and lighting of the strings represents the attack, sustain, and decay of the note. The initial attack, for example, is preferably shown by flashing the string which indicates it has been struck. Described in terms of color (hue, saturation, brightness), with brightness changing from a default 50% (neutral gray) to 100% (white). If the user has chosen to have the strings displayed in color, hue will also change to show pitch or other information, and saturation will increase to 100%. As the note fades, the displayed string likewise fades, brightness (and saturation if in color mode) decreasing to match the decay of the note. When the note has died out completely (this can take as long as 7–8 seconds), or has been stopped by the player (by lightly resting either or both hands on the strings), brightness (and saturation) will be back at their default values.

Light also preferably conveys which part of the string is actually vibrating after being struck, as the string is only lit from the bridge of the guitar to the fret position being fingered. The remaining part of the string, from the fret position being fingered to the head of the guitar, does not vibrate, and so therefore is shown remaining in its neutral state, preferably gray. This provides a clear visual indication as to which note is being depressed by the left hand, i.e. the light extends from the right side of the screen leftwards to the note being fingered (if no note is being fingered, i.e. playing an "open string", the light extends all the way to the left side of the screen, up to the head of the guitar if it is shown). It should be noted that the notations regarding left and right hands utilized herein is in reference to a guitar being played in a traditional right-handed manner, the references would be reversed for a guitar being played in a left-handed manner.

Additional fingering information for the left hand is conveyed by gray ovals representing the ends of the fingers (finger pads), indicating the point(s) where the left hand fingers are actually depressing the strings. It is likewise indicated if a left hand finger, such as the index finger or the ring finger, is covering several strings at once, which is also known as "barring". Instead of displaying an oval, the situation would be preferably depicted by displaying a gray shadow in the shape of the top part of the finger shown covering the strings.

Figure 5:
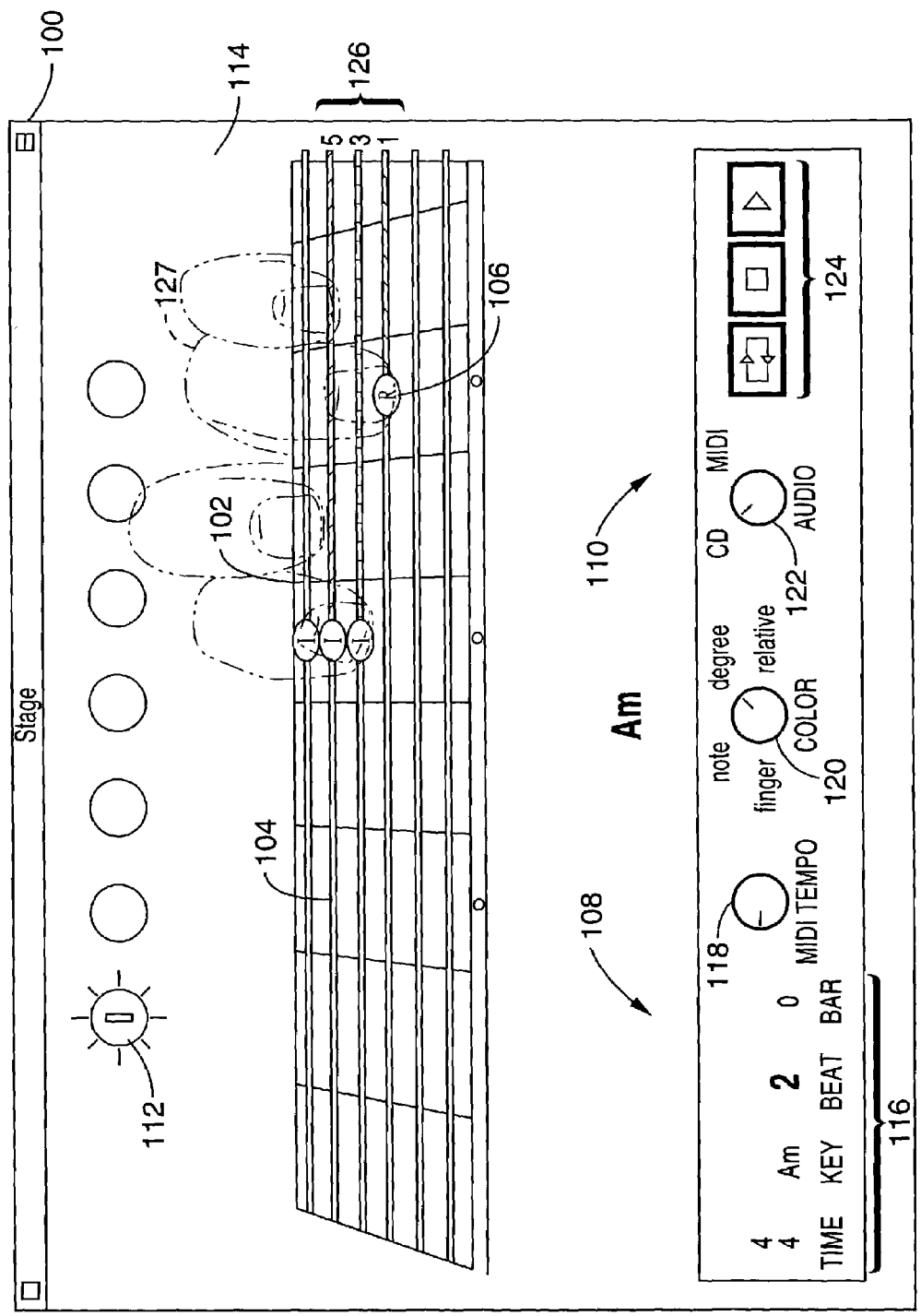
FIG. 5 is a screen shot representing the output of the Tablature Plus reader according to the present invention, showing guitar fingering by displaying the outline of the left hand of a guitarist according to an aspect of the present invention.

FIG. 5 depicts another representation of the fingering of FIG. 4, wherein the user has elected to be provided with a view of fingering, represented as an outline of the guitarists hands 127 during fingering. The present invention preferably provides a number of methods of displaying both the striking and fingering of the strings, such as by displaying hand outlines, transparent or semitransparent hands, fingertips, finger pad ovals (as shown in the other views), or alternative ways of representing hand position.

FIG. 6 through FIG. 11 indicate the display of additional right hand information within a box or similar separate area on the right hand side of the screen to provide information about how the string has been struck. Guitarists generally classify strikes into "downstrokes" and "upstrokes", depending on whether the string(s) were struck with the right hand moving towards the ground ("downstroke") or instead with the right hand moving back up towards the player's head ("upstroke"). In the present system using animations based on Tablature Plus, the downstrokes and upstrokes are differentiated in the right hand box by apparent motion in the direction that the string has been struck, that for a brief moment, visually indicate the direction of the strike upon attack.

Figure 6:
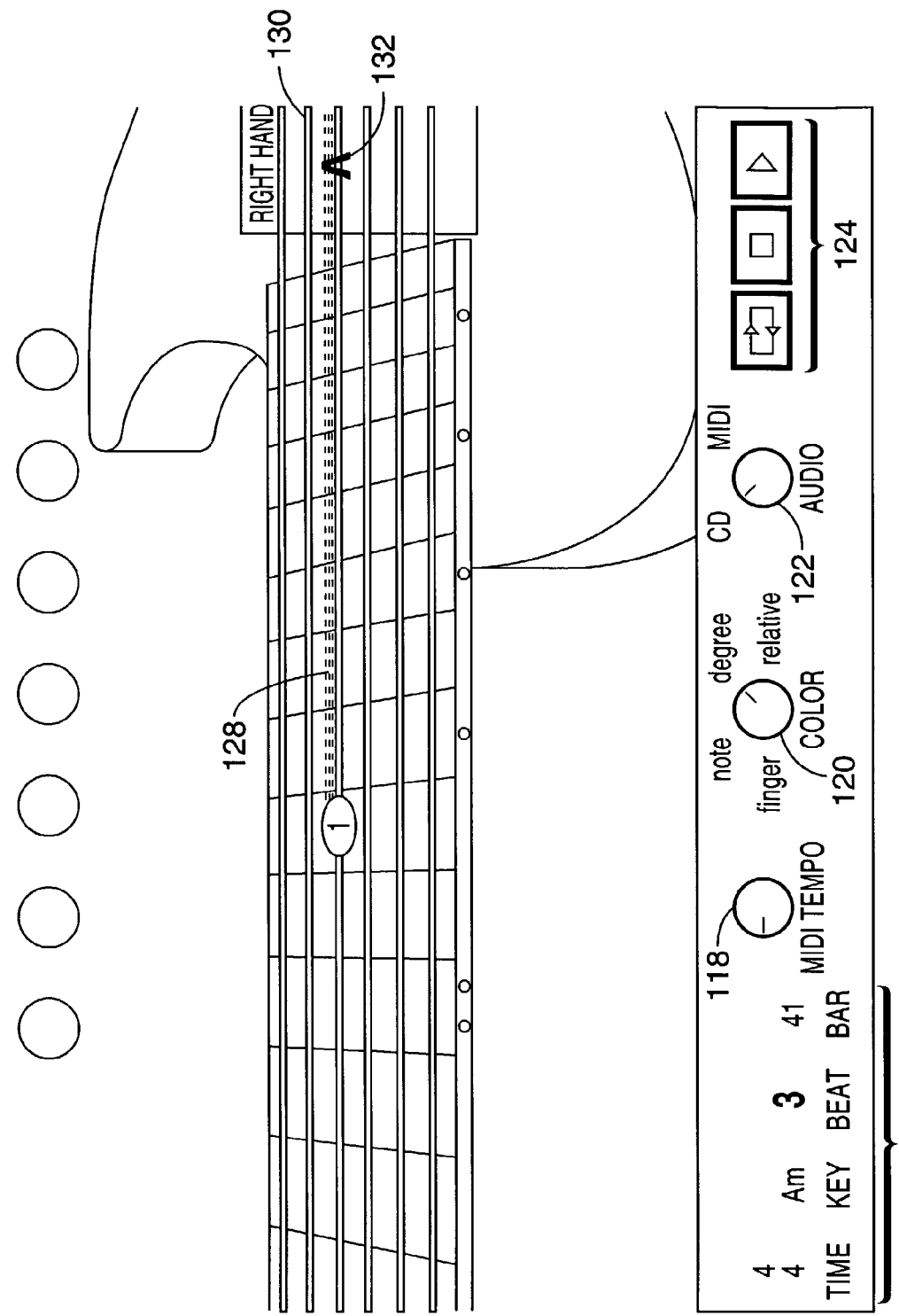
FIG. 6 is a screen shot representing a downstroke as an aspect of the Tablature Plus reader according to an aspect of the present invention.

FIG. 6 depicts a string motion 128 representing a downward strike, in conjunction with a right hand box 130 in which a downward stroke symbol "Λ" appears adjacent to the string upon attack.

Figure 7:
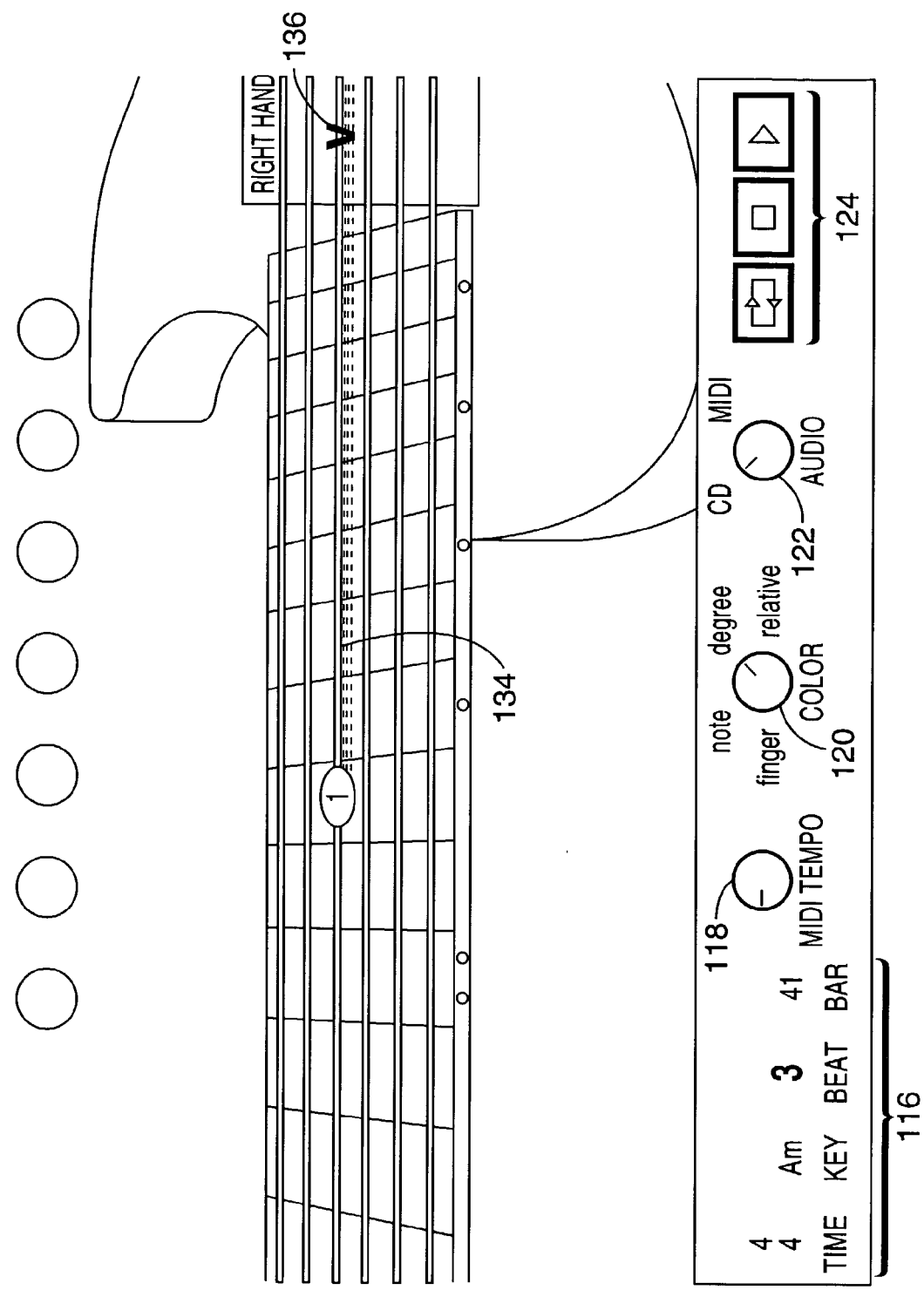
FIG. 7 is a screen shot representing an upstroke as an aspect of the Tablature Plus reader according to an aspect of the present invention.

FIG. 7 depicts string motion 134 representing an upward strike, it will be noted that the trailing highlights are facing an upward direction opposite to that shown for the downward strike. In addition, an upstroke symbol "V" 136 appears adjacent to the string with string motion being represented in the same upward direction.

Downstrokes and upstrokes are the most basic techniques of striking a string, however, several additional common techniques exist, such as utilized by rock guitarists. Perhaps the most common technique is that of bending a string with a finger on the left hand to modulate the pitch of the string as it is pushed with the finger. A similar technique is that of rapidly moving the string back and forth with the finger to produce vibrato. In displaying animations that result from reading Tablature Plus within the present system, the strings are preferably shown for bending on screen to match the change in pitch of the note. Displaying this technique visually over time (i.e. full motion animation) provides a number of benefits in relation to indicating the use of the technique in printed form only. For example, all the subtle nuances of the bending technique may be displayed in the actions displayed, since the Tablature Plus player is simply reacting to pitch bend information encountered in the playback of the MIDI sound file. These subtle nuances include the speed at which the note is bent up to the final pitch, the speed at which the bend is released because at times a player will slowly release the bend from the final pitch back to the original pitch, the amount the string is bent, and of course simultaneously the musician may be picking the note repeatedly. Also, if the user has chosen a color mode display to display pitch, the hue of the string will change to match the pitch change.

Figure 8:
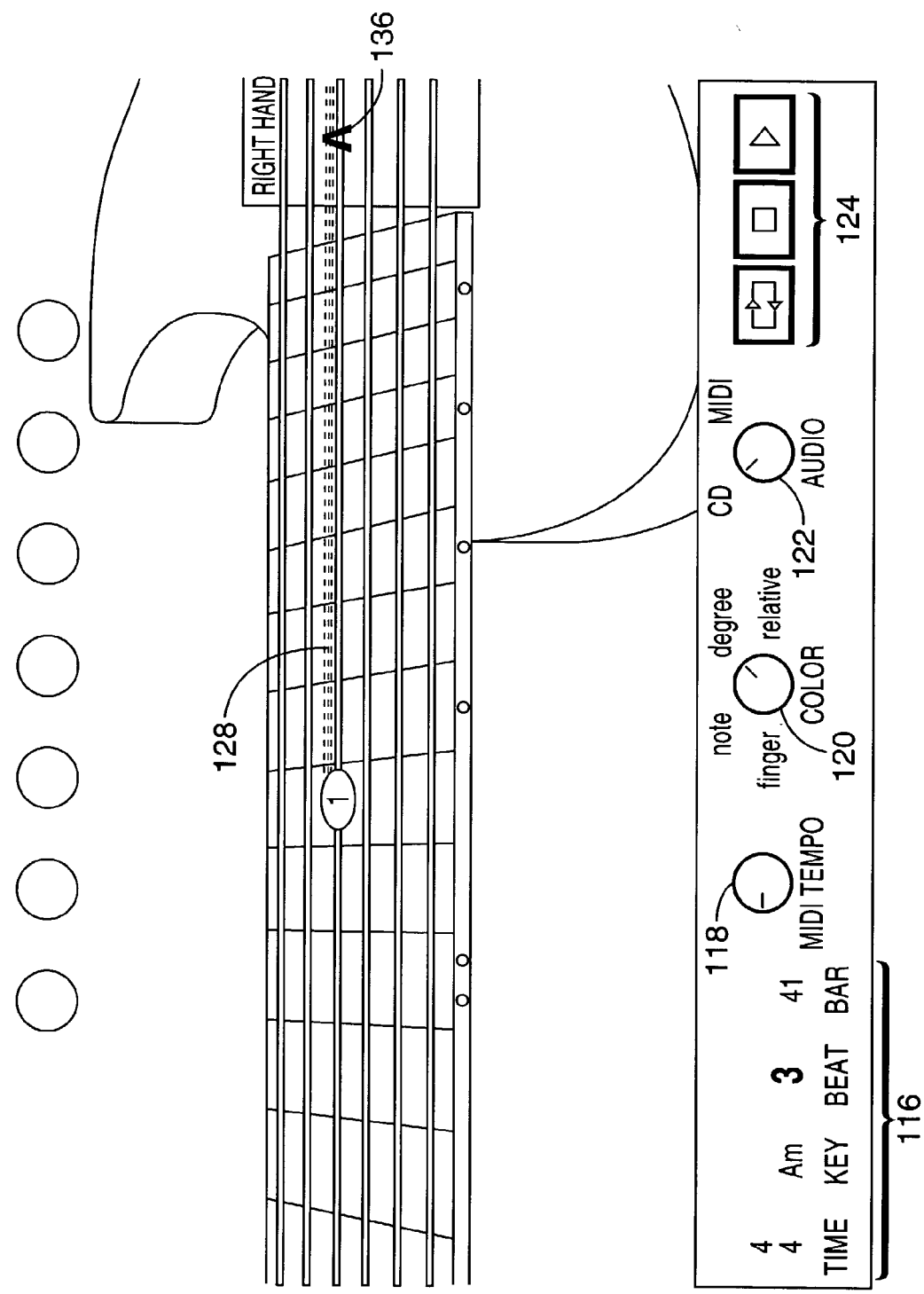
FIG. 8 is a screen shot representing a first step in a hammer-on technique as an aspect of the Tablature Plus reader according to an aspect of the present invention.
Figure 9:
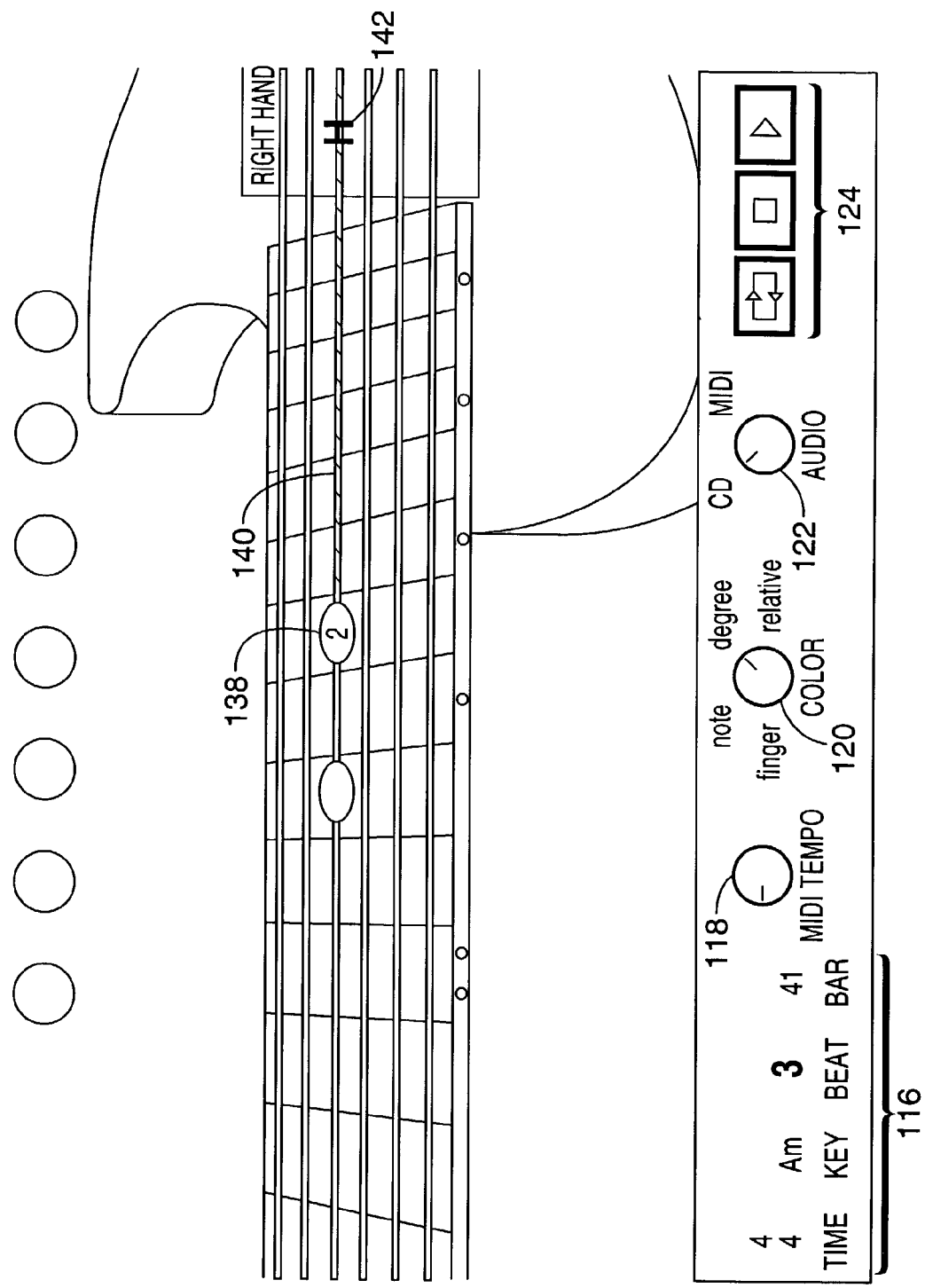
FIG. 9 is a screen shot representing a second step in a hammer-on technique as an aspect of the Tablature Plus reader according to an aspect of the present invention, showing the second finger position and the designation in the right-hand box.

FIG. 8 and FIG. 9 depict another common technique referred to as "hammer-ons" and "pull-offs". Hammers-ons and pull-offs can allow for creating subsequent notes after a strike by using the fingers of the right or left hand to "hammer on" or "pull off" of the string to sound subsequent notes. After a first note is picked, a hammer-on is performed by "hammering on" with another of the left hand fingers, such as the ring finger, to sound a second note. The opposite of a "hammer-on" is a "pull-off", wherein the first note might be fingered by the ring finger, with the first finger already in place, the second note is sounded by the ring finger "pulling off", allowing the first finger to sound the remainder of the note. Hammer-ons and pull-offs are preferably indicated within the present system by symbols shown in the right hand box, such as the downstroke or upstroke symbols changing to an "H" or "P" to represent "hammer-ons" and "pull-offs" respectively. Additionally, the strings preferably are not shown moving for a moment, which is indicative of a difference with a picked string. Furthermore, it is preferable that the initial attack as represented by lighting the string be considerably diminished, for example to a half intensity to signify that the string has not been attacked (picked) at normal strength. FIG. 8 depicts the first note being played using a downstroke, after which the "hammer-on" note is shown in FIG. 9 with a second oval 138 being added on the string and the motion highlighting 140 being removed, while a symbol 142, such as the letter "H", appears on the right hand box.

Another common technique is that of the slide, wherein a player picks one note and then sounds the next note by sliding the left hand finger up or down the neck to the next note. Slides are preferably indicated within the present system by motion of the finger pad which created the note sliding up or down the neck of the guitar to the appropriate note along with the lighted portion of the string changing correspondingly. Additionally, similar visual indications are used as in "hammer-ons" and "pull-offs", wherein the downstroke or upstroke symbol in the right hand box changes to an "S", the displayed string motion is halted, and the initial attack lighting is diminished to signify that the string has not been attacked (picked) normally. A variation on the slide is to pick a string and then move the left hand finger rapidly down the neck, but not to one particular note. The technique is provided more as a sound effect between phrases, and is indicated similarly to a regular slide but there is no destination note being held.

Figure 10:
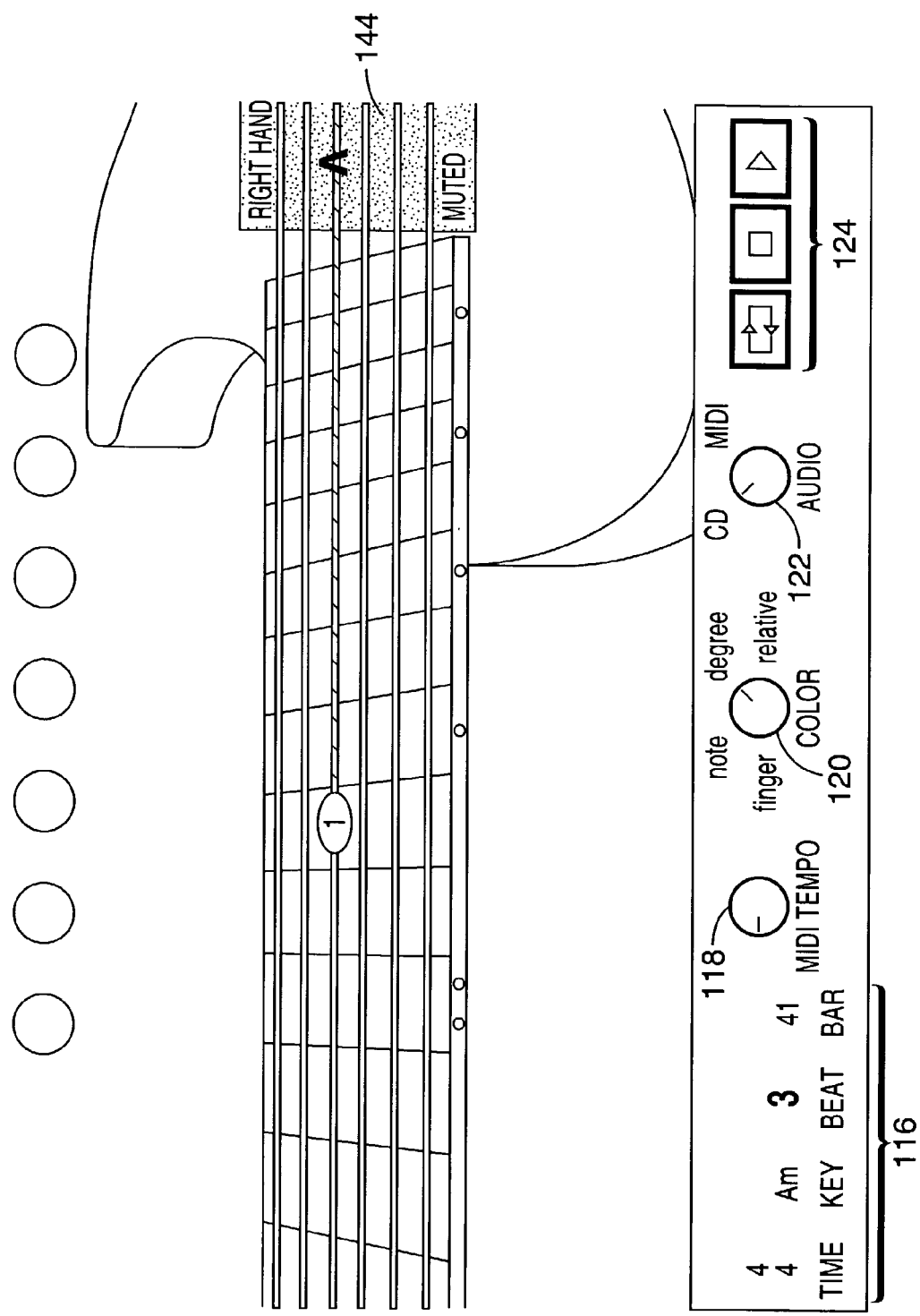
FIG. 10 is a screen shot representing muting as an aspect of the Tablature Plus reader according to an aspect of the present invention, shown by muting the string providing indications in the right hand box, depicted as color changes and text.

FIG. 10 represents right hand muting, which is a technique often used to somewhat deaden the strings. This technique is practiced by the player resting the palm of the right hand on the strings while playing, not enough to completely deaden the string, but sufficiently to yield a muted sound. Right hand muting is preferably indicated by applying a shadow 144, representing the right hand palm, in the right hand box similar to the gray shadows used to represent the left hand depressing strings, while the initial attack is represented by diminished string highlighting to signify that the string has not been attacked (picked) at normal strength. In addition, the decay of the note is represented more rapidly, such as a maximum of a second or two.

Figure 11:
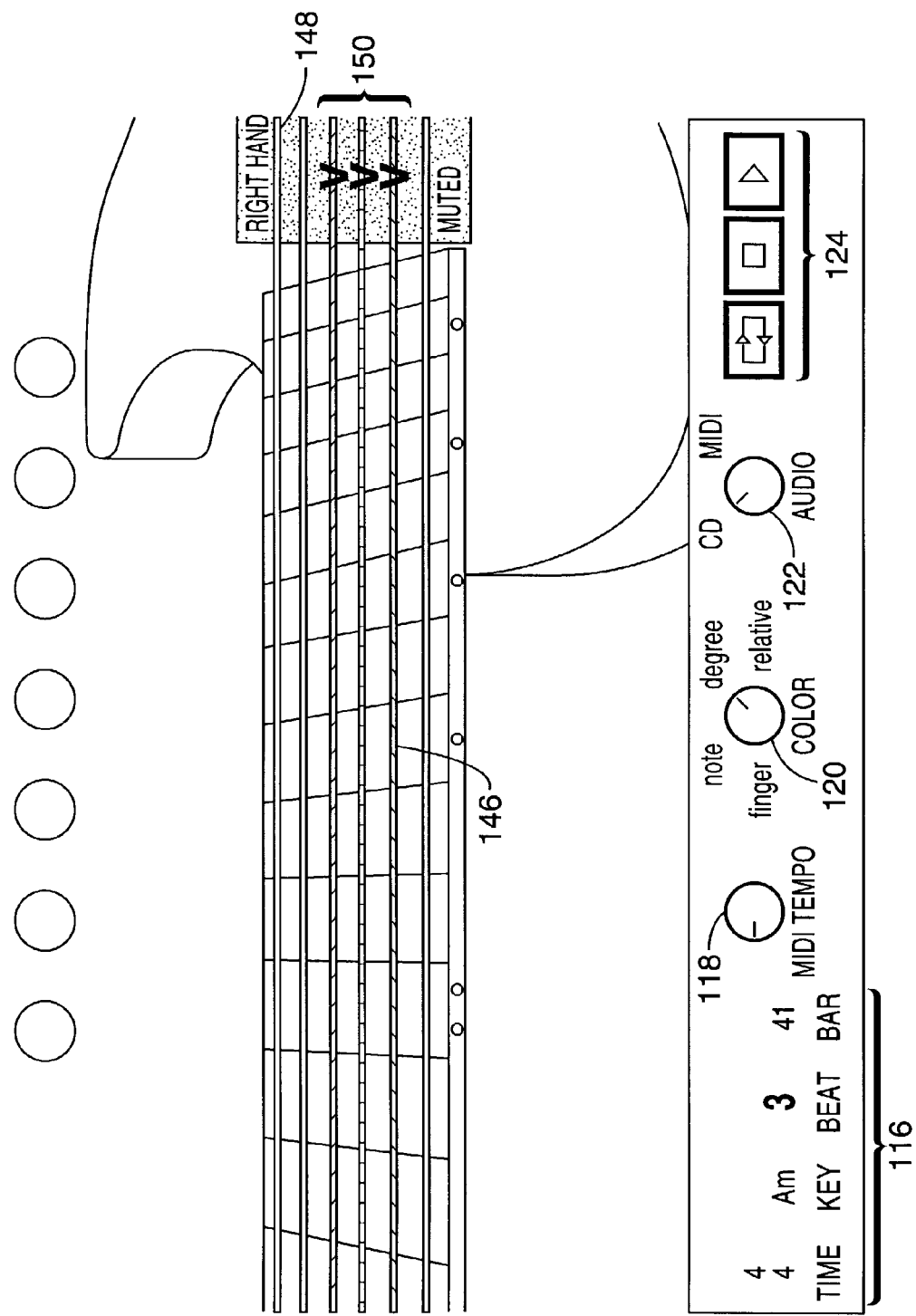
FIG. 11 is a screen shot representing the display of dead strings associated with rhythmic fills between chords within the Tablature Plus reader according to an aspect of the present invention.

FIG. 11 depicts muting as performed to create rhythmic fills between chords, which may be utilized when playing a rhythm guitar (chords). The musician adds the rhythmic fills by strumming back and forth across the strings while muting with both hands, so that no notes are sounded, but the sound of the pick being stroked back and forth over the muted strings provides the rhythmic sound fill. This differs from right hand muting in that with the former you still hear a note which has pitch, whereas strumming the "dead" strings provides no discernible pitch 146. Since no notes are being depressed with the left hand, the string appears like an open string, while it is shown with no pitch coloring, a muted string color is shown because the attack is significantly dampened, the right hand box is shown muted 148, and the right hand box indicates the direction of strumming 150 on one or more strings.

The use of a tremolo bar, also referred to as a "whammy" bar, may be detected within the present system, denoted in the Tablature Plus notation, and represented within the displayed rendition. A tremolo bar is a pole or bar several inches in length that may be fastened to the bridge of the guitar. In use, the right hand may depress or rapidly move the bar back and forth to cause any strings currently sounding to waver or go down in pitch. Although not shown in the diagrams, an animated bar may be shown along with proper string color changes to illustrate the effect of using the tremolo bar.

Harmonics may also be produced by lightly placing the left hand over certain frets while picking the string to create a bell-like sound referred to as a "harmonic". This effect is preferably represented within the present system by showing an "m" in the right hand area of the display as well as by displaying the graphical image of a hand which can be preferably viewed from multiple angles.

Right hand "pick squeals" may be created by altering the hold on the pick so that parts of the right hand thumb and first finger lightly brush the string while picking to generate a distinctive squeal sound. The creation of a "pick squeal" is preferably represented by showing the graphical image of a hand performing this form of picking. The hand may be preferably viewed from any of multiple angles.

A number of guitar effects are available, which may be represented on the display. For example an icon may be used to indicate the use of a "wah-wah pedal", "chorus", "phase shifter", "flanger", and so forth when these effects are being applied to the guitar.

4. Software Description.

A description of the Tablature Plus multimedia player is now described in a pseudocode format. Each block of pseudocode described may be thought of as an object, with properties and methods listed as necessary.

4.1. MIDI File Control.

The code needed to open and play a MIDI file, and especially to read MIDI events in the file as they are generated, is preferably provided by available third-party libraries. The use of "wrapper" code (interface) may be needed to enable the Tablature Plus player for accessing these libraries, depending on the development environment utilized.

4.2. MIDI Event Routing.

The routing of MIDI events, once a MIDI file is opened and is playing, an object or routine performs listening for the MIDI events which are then routed to appropriate objects.

method getEventspoll

This method periodically, such as at sixty times per second, polls for MIDI events, and routes them to the appropriate object. It will be appreciated that since several events may have occurred since the last polling event; an event queue is necessary, a reference kept as to the time of the last event, index maintained of the last event, or other mechanism for handling multiple events for each new event.

For each event, collect event parameters:

get_event_type (noteOn, noteOff, pitch bend, continuous controller, aka CC)

get event channel number (1–16)

Given a channel number, route to appropriate instrument object(s). It may be best if CC messages are added on to the noteOn events before routing to instrument, since the CC messages will usually need to be received either before or at same time as noteOn messages, as they affect the initial display of the note, in particular the attack type.

4.3. Instrument Related.

Instrument properties:

mySprite(s): reference to bitmap(s) of art for my instrument myStrings: array of string objects (subclass)

myPositions: lookup table or array method receiveEvent, event

For any MIDI event received given parameter event channel number, pass to appropriate string (1–6).

method setView, viewID

Message sent by CC events embedded in MIDI file change the onscreen view of the instrument by moving mySprite(s), given input parameter viewID (value 1–127), translate that view ID into something meaningful in context, i.e. how far along x axis to move mySprite(s), or how much to scale mySprite(s) up or down need to pass this message to each of myStrings.

method setGuitar, guitarID

Message sent by CC or SysEx message at start of MIDI file change artwork used for the displayed instrument allows selection of different guitar representations wherein different graphic artwork is shown. For example, the playing of a Jimi Hendrix song on a white Fender Stratocaster, and a Led Zeppelin song on a gold Les Paul, and so forth.

4.4. String Related.

String properties:

myStringSprite(s): reference to onscreen art for my string.

myStringNum: 1–6 myOpenNoteValue: MIDI note value of string when not fretted, i.e. open string.

myFretList: lookup table(s) of fret positions for my string, in form fret number|x axis location.

myField(s): small field next to string which displays name (or scale degree) of note being played.

myDecayLength: default value for how long my string sounds after a note is played.

myDecayRate: value(s) by which to determine slope/shape of note decay.

method noteOn, MIDInoteValue, finger, attackType

MIDI noteOn message routed to me, with additional parameters finger, attackType added by router given MIDI note Value, ask color manager what initial color (hue) of string should be given attackType (value, e.g. 1=picked upstroke, 2=picked downstroke, other values indicate string was not picked, but rather note was sounded by left hand hammer-on, or pull-off, or slide, or right hand tap), modify starting saturation of string accordingly (saturation represents velocity and attack, 0 saturation=string at resting value, i.e. not sounding). Saturation is dimmed as note decays (in "decay" method below) also given MIDI noteValue, ask mode manager what note text information should be displayed in myField. Given MIDInoteValue, compare to myOpenNoteValue and determine what fret note should be displayed on look up in myFretList and find corresponding onscreen location of note, and adjust left of myStringSprite accordingly.

method noteOff

MIDI noteOff message routed to me to set color of string mySprite back to default color.

method decay

Message sent by system many times per second (i.e. 60) to adjust color (saturation) of string based on myDecayLength, myDecayRate, so that unless interrupted by a noteOff message, or another noteOn, string will eventually fade back to default color.

method pitchBend, value

MIDI pitchBend message routed to me given value, move myStringSprite(s) along y axis by appropriate amount and in appropriate direction. Note that current hue of string may need to be recalculated on the fly, since hue represents pitch. And that I actually have two strings, myStringSprite(s) which meet at the point of the note, giving the appearance of one string; this serves two purposes: (1) only strings to right of note (the part which actually vibrates) should be colored; and (2) in bending the string, the part of string which actually vibrates has its left side bent along y axis, whereas the "dead" part of string (from left of note up to the head of guitar) has its right side bent along y axis, using two sprites to achieve this visual effect is probably preferred over writing custom code to warp a single sprite at any given point along its x axis.

method tuneString, MIDInoteValue

Message sent by CC or SysEx message at start of MIDI file. Set value of property myOpenNoteValue. Allow for possibly different tunings to be used.

4.5. Mode Manager.

Receive input in form of MIDI note value, return either note name, or note scale degree (i.e. 1, 3, b5, #7, etc.). Depends on how user has set preferences, for example how strings are colored.

4.6. Color Manager.

The color manager receives input in the form of a MIDI note value or scale degree, returns a hue for that note (hue represents pitch). Depending on how the user has set preferences (how strings are colored): off (no coloring); or fingering (color represents left hand fingering), or note name (i.e. red=A, orange=B, etc.), or scale degree (i.e. red=1, orange=2, etc.). Seven colors (red, orange, yellow, green, blue, purple, violet) map to seven degrees of the scale (e.g. "do-re-mi . . . "); accidentals (e.g. outside the scale) being represented by colors in between the previously mentioned seven colors; so that a flatted second for example would be colored red-orange.

The use of color is preferred within the player application of the present invention. Musicians who play by ear must depend extensively on their ear, and any musical phrase can be analyzed by using the numbers 1–7 (adding sharps and flats as necessary, also translating pitches above the octave appropriately, e.g. 9 to 2, 11 to 3, and so forth), both in terms of background (chord) and foreground (individual notes).

As described previously, in the environment of the present invention, hue preferably represents pitch while saturation represents attack/sustain/decay. Brightness, the third component of the standard 3D representation of color has the capability to represent degrees of pitch; so that although a given note has a blue hue, a higher brightness value represents the same note an octave higher, a lower brightness the same note an octave lower. By way of example and not of limitation hue represents circumference, saturation the x axis, brightness the y axis.

4.7. Pattern Manager.

Given input in the form of MIDI CC message(s), these are translated into an appropriate visual pattern, and superimposed upon the onscreen guitar neck. These are basically dots which outline the shape of a chord or scale (one dot per note). Playing music by ear is often a significantly visual experience. Certain chord shapes or scale shapes (e.g. the blues scale) are commonly recognized and used by many guitarists. Superimposing these patterns visually upon the neck of the displayed guitar is beneficial to beginning players as it provides an aid in recognizing why a guitarist is playing the particular notes. The pattern manager object preferably also displays the text name of the chord or pattern being displayed, (i.e. "A", "Fmaj7", "E minor blues scale", and so forth).

4.8. Lighting.

Given input in the form of MIDI CC message(s), passing values 1–7, color the background lighting of the TAB+player appropriately (1=red, 2=orange, etc.). When music is played by ear it is important to learn to recognize chord changes, and it is advantageous to begin to recognize common chord progressions, such as I-IV-V. Changing the background lighting to match the chord changes is a simple way of conveying this information. The same color mapping is preferably utilized as for the color manager: seven colors (red, orange, yellow, green, blue, purple, violet) representing the roman numerals I-VII, which are traditionally used to convey chord progressions.

4.9. Miscellaneous Code.

Miscellaneous code will be necessary for controlling playback of the current audio file (either MIDI or CD audio), e.g. play, pause, stop; also if MIDI audio, to allow the user to set playback tempo speed, loop between certain points, and so forth.

5. Generation of MIDI File with Guitar Specific Play Techniques.

The following describes an aspect of the present invention, referred to herein as VG Studio Pro, which provides hardware and signal processing hardware to allow a guitar performance to be recorded and then analyzed using signal processing software to automatically extract parameters that characterize the performance. This aspect of the invention does not require the use of the data glove, or similar motion sensing device, while it can provide for algorithmic extraction of playing techniques from data collected during the performance. The annotations for the playing techniques may then be incorporated within an output file or document, such as enhanced MIDI file incorporating Tablature Plus notation according to the present invention, for use in a player capable of providing a multimedia display of the guitar performing the given piece. The software produces a MIDI file containing those parameters, which may be utilized as input for the Tablature Plus player as described earlier.

The system provides for automatic transcription of a guitar performance, generally not in real time, based on digitizing the output of a hexaphonic pickup mounted on a standard guitar, into an enhanced MIDI file. The signal from the guitar being played comprises a pickup head adapted to register the actions of each string, along with an optional audio monitor adapted for generating an electrical signal in response to all sounds being generated by the guitar as directed toward the audio amplifier.

The signals from the pickup, in particular an optical pickup as described herein, may be processed to extract information about the notes in a piece being played and to a lesser extent the techniques utilized for playing those notes on a guitar. A number of options exist for picking up acoustical information from the guitar, from which to generate MIDI data. The use of a hexaphonic pickup with an audio-to-MIDI hardware box, however, is generally not suitable for this aspect of the invention that does not receive hand position information. Furthermore, it will be noted that the audio-to-MIDI hardware boxes have been designed for real-time performance, and do not produce accurate MIDI output, particularly if the playing is not very "clean".

Audio-to-MIDI conversion can also be accomplished with existing non-real-time software, which is designed for extracting note information from a sound file. However, although the available software may be quite accurate for detecting notes, it does not have the capability to recognize and transcribe guitar-specific parameters such as slides or hammer-ons.

It will be appreciated that the processing of the registered signals from the hexaphonic head is generally not constrained to real time processing. Therefore, the use of off-line processing allows computationally expensive algorithms to be employed within VG Studio Pro to achieve the needed accuracy and to extract guitar-specific features of a performance.

5.1. System Requirements.

The hardware and software of the VG Studio Pro must meet a number of requirements in order to provide proper playing of guitar animations that match the performance. The system must be capable of working with conventional guitars, wherein modifications should be generally limited to the addition of a hexaphonic pickup head. The hardware must be capable of digitizing signals from each of the six guitar strings and audio monitor signal separately, with a signal-to-noise ratio sufficient to provide accurate software detection of note events. The software of VG Studio Pro must be configured to automatically extract a number of playing parameters from the digitized versions of the signals being generated from the hexaphonic pickup head. These parameters may include: MIDI note on/off, number, and velocity; note event timing; pitch bend and vibrato; slide (if distinguishable from pitch bend); hammer-on/pull-off (if distinguishable from two note strikes); percussive event (slap, pop, etc.); and so forth. The software being adapted for producing a standard MIDI file output, with guitar-specific extensions.

It is preferred that the time required to analyze a six-channel recording within VG Studio Pro should require less than fifty times the total recording time, while the notes should be recognized with an error rate of less than 10%, and more preferably less than 5%.

5.2. System Hardware.

Figure 12:
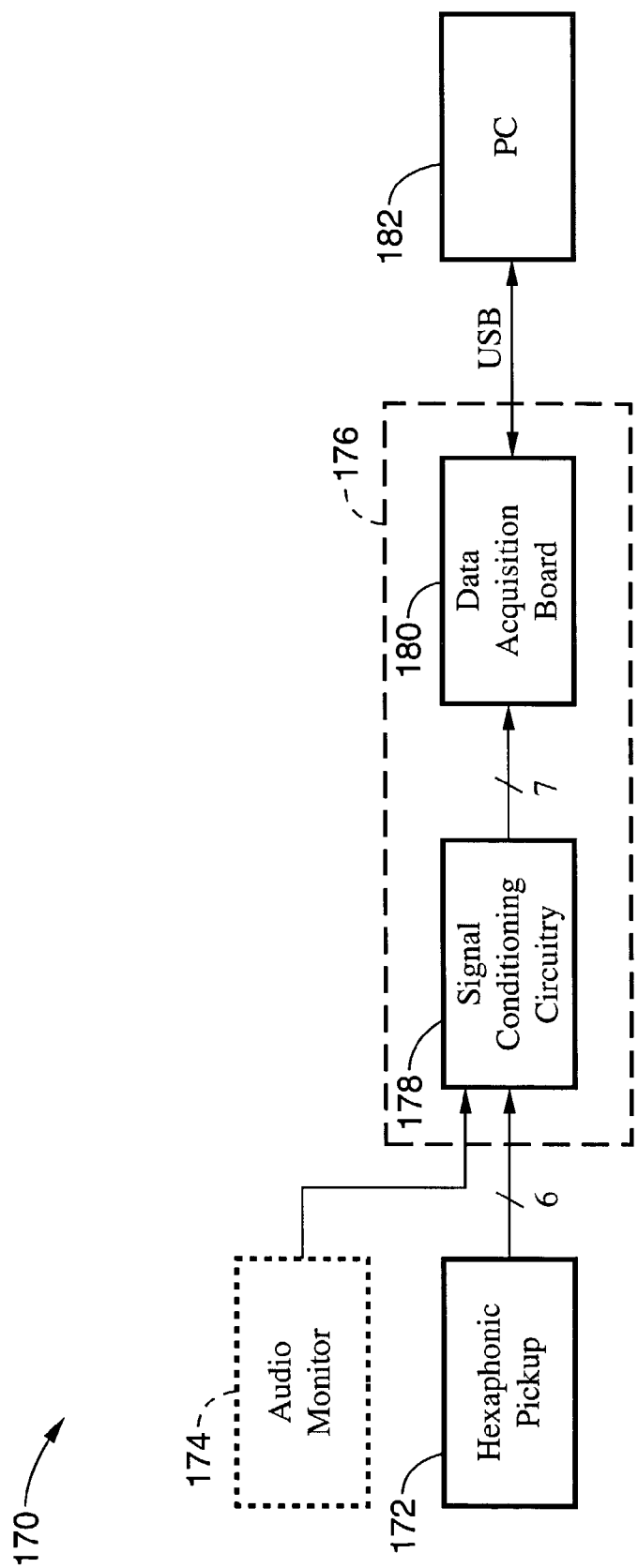
FIG. 12 is a block diagram of a hexaphonic pickup, and optional audio monitor, for input to a signal processing unit for generating a MIDI file having Tablature Plus notation.

FIG. 12 depicts a block diagram of the hardware 170 utilized for VG Studio Pro, illustrating a hexaphonic pickup 172, and optional audio monitor 174, being connected to a seven channel digitizing system 176 comprising seven conditioning circuits 178 whose output is fed to a data acquisition board 180. This digitizing system performs substantially the same function as described previously using a microprocessor. In this embodiment, however, the pitch to MIDI and guitar specific technique conversion is performed by routines executed within a computer. Thus, the raw digitized information is then transferred to a computer 182, such as a personal computer (PC), which receives the data over a communication link, such as a USB connection.

The signal generated by audio monitor 174 is utilized for synchronization and is supplied from the performer's monitor (using either its line output or a microphone in front of it, amplified to line level). One form of data acquisition board that may be utilized is a Data Translation® DT9803 USB data acquisition board, while the signal conditioning circuit 178 in this case was developed in-house. The signal conditioning circuit was designed to provide anti-aliasing filters on the string inputs as well as the composite (monitor) input. However, it was found that the noise introduced by the switching power supply exceeded that which resulted from aliasing. Consequently, the filters have been bypassed on the string signals. The opposite was true for the composite signal, and thus it still uses the anti-aliasing filter for improved sound quality.

Figure 13:
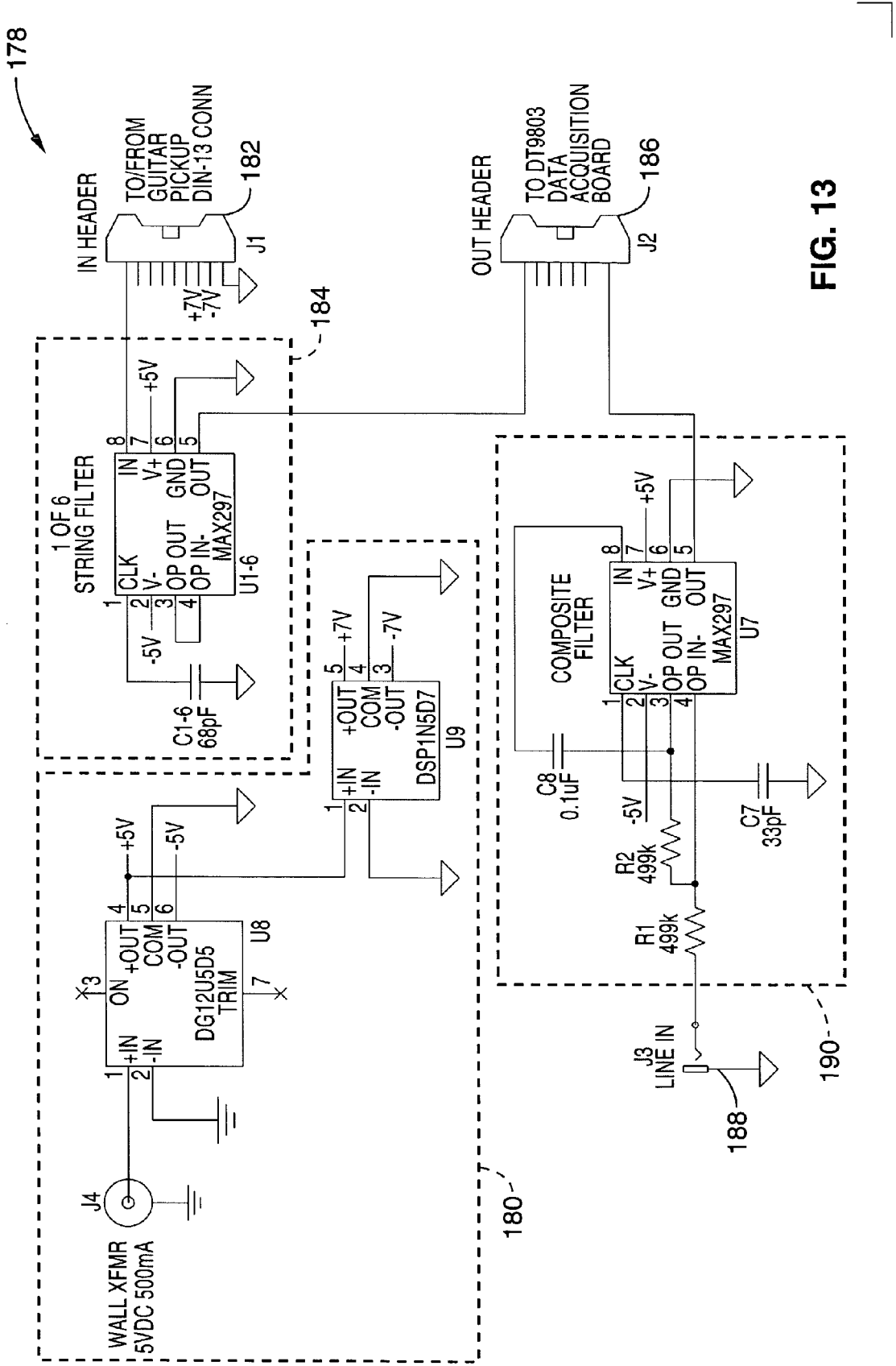
FIG. 13 is a schematic of a signal conditioning circuit for use with a hexaphonic pickup head for communication to a signal processing system according to an embodiment of the present invention.

FIG. 13 depicts conditioning circuitry 178, showing a power supply 180, a connector to/from the guitar pickup 182, a filter circuit 184 shown for one of the six strings from the hexaphonic output; and an output connector 186 to data acquisition system 180. A line input jack 180 is shown connected through a composite filter 190 and connected through connector 186 for providing the optional monitor input.

5.3. Software Overview.

Figure 14:
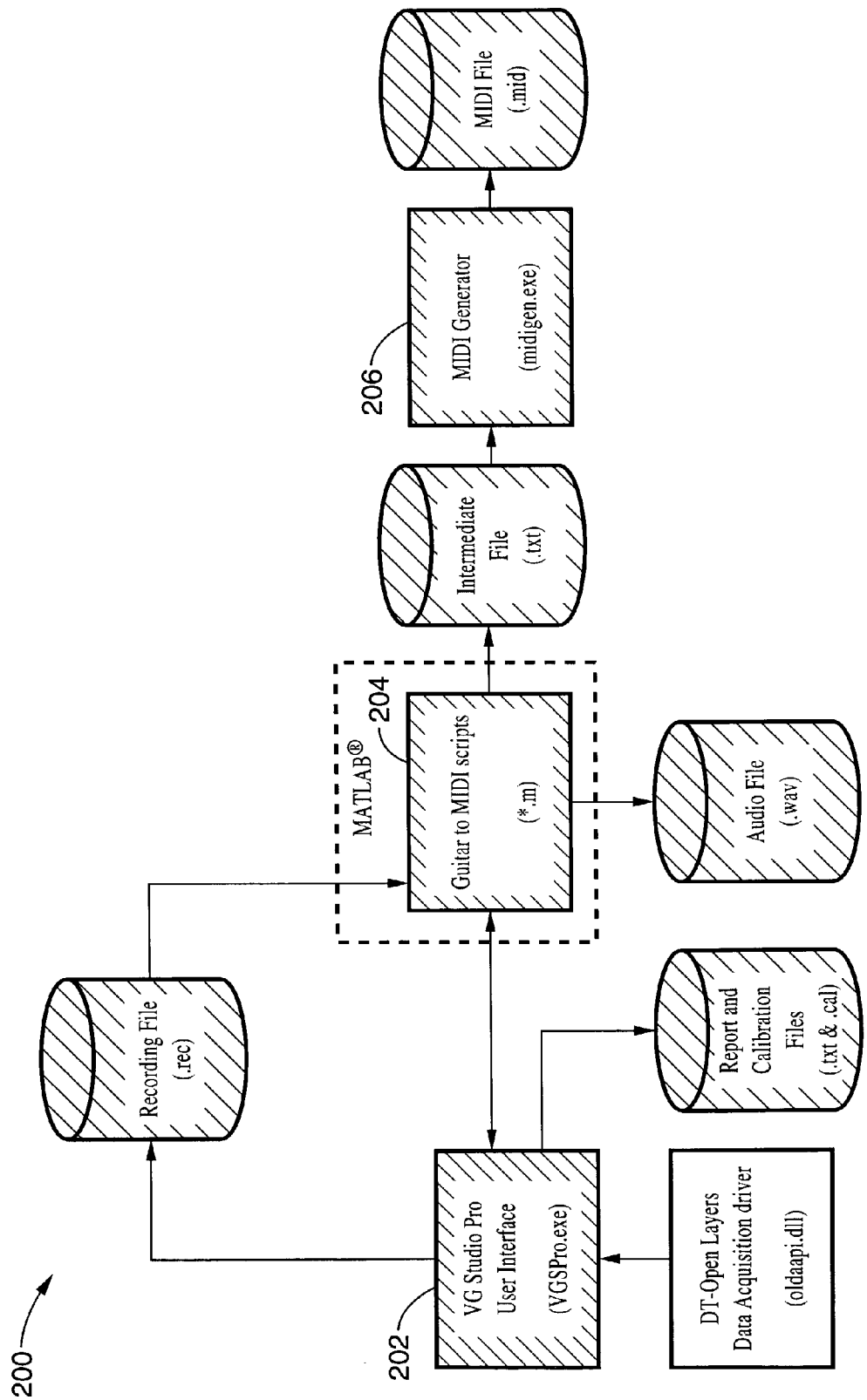
FIG. 14 is a block diagram of the software for performing signal processing on the hexaphonic output to generate a MIDI file having Tablature Plus.

FIG. 14 exemplifies an embodiment of the software for VG Studio Pro 200 which consists of VGSPro.exe 202, custom MATLAB scripts (*.m files) 204, and the file midigen.exe 206. It should be appreciated that the processing functions described herein, although shown with a particular embodiment of hardware, may be practiced utilizing a number of different software structures and embodiment as may be implemented by one of ordinary skill in the art without inventive efforts and without departing from the teachings herein. VGSPro.exe provides the user interface and handles data acquisition. The MATLAB scripts analyze the data to determine the appropriate MIDI output. Midigen.exe generates the actual MIDI files.

5.4. VGS Pro Software.

VGS Pro within the present embodiment was implemented as a Microsoft Foundation Classes (MFC)™ application wizard for generating dialog-based applications created with Microsoft Visual C++ 6.0. It includes ActiveX™ support in order to act as an automation client of MATLAB. It is responsible for providing a user interface and controlling the acquisition of guitar data and the processing of that data by MATLAB.

The user interface consists of a series of dialogs that preferably utilize state machines to implement a wizard-like behavior that leads the user through the process of recording and/or analyzing guitar files. The recording process relies on the DT-Open Layers™ driver stack for communication with the data acquisition hardware. Thus a level of hardware independence is achieved whereby any Open Layers compliant hardware/drivers that support the capabilities required by VG Studio Pro should be usable with VGSPro.exe. In order to rebuild VGSPro.exe, it must be linked with the libraries and headers in the Data Translation Data Acquisition SDK. The classes that implement the functionality of VGS Pro are described in greater detail below.

5.4.1. CVGSProApp.

CVGSProApp is a standard AppWizard-generated class with three additions. First, in InitInstance, code has been added to prevent the annoying "Server Busy" dialog from appearing when MATLAB has been invoked and the user clicks on a VGS Pro dialog. Second, the Analyze function has been added to wrap the call to MATLAB used by the calibration and conversion dialogs. It begins by invoking MATLAB as an ActiveX Automation server. Then it adds the path in which "VGSPro.exe" exists (assumed by default to be the same in which the MATLAB scripts and midigen.exe were installed) to MATLAB's search path. It then asks MATLAB to run the guitar2midi script with four arguments: (1) the recording file name passed in to the Analyze call, (2) a flag that tells guitar2midi to suppress debug output, (3) a flag that tells whether guitar2midi is being run only to check tuning, and (4) the complete path to midigen.exe. The resulting MATLAB reports are then returned to the caller as a string. The third addition is the utility function IsFileNameOK, used by the calibration and recording dialogs to check for valid file names.

5.4.2. CVGSProDlg.

CVGSProDlg implements handlers for buttons, specifically, the calibrate, Record, and Convert, buttons (or input devices providing similar functions). Its provides an OnPaint function that has also been modified to display a bitmap with some various in-house generated artwork.

5.4.3. CDaqDlg.

CDaqDlg is invoked by both the calibrate and record dialogs to handle the recording of guitar data to a binary file. In OnInitDialog it initializes the first DT-Open Layers compliant data acquisition board it finds, by calling InitConfig. That and other low-level functions for controlling that board have been copied from the cexmpl.c sample code in Data Translation's DataAcq SDK, modified as necessary.

CDaqDlg::OnOK implements the state machine that leads the user through the recording process. When the user presses the Start button, a binary file is opened and a header consisting of three two-byte values is written: the file format version no. (x 100), the sample rate for each string (Hz), and the size of each sample in bytes. The data acquisition board's channel/gain list is then set up so that each string is sampled at the base rate, with a gain of eight, and the composite input is sampled at twice the base rate (for higher fidelity) and a gain of two. The acquisition process is then initiated. The data in the file will thus consist simply of the header followed by two-byte samples in the following order (with no delimiters): string 1, string 2, string 3, composite, string 4, string 5, string 6, composite, [repeating] string 1, . . . and so forth.

CDaqDlg::OnBufferDone handles messages from the DT-Open Layers stack indicating that a buffer has been filled and is ready to be written to the file. It is based on OLDA_WM_BUFFER_DONE message handler within cexmpl.c.

CDaqDlg::OnQueueDone handles messages indicating that the system has run out of buffers and so has stopped acquiring new data. This could happen if the computer was not able to write the data to a file sufficiently rapidly to free up allotted buffer space. Storing the files in binary, as opposed to text, provides enhanced storage efficiency wherein this error should not generally occur.

5.4.4. CCalibrateDlg.

A CCalibrateDlg is created when the user presses the "Calibrate" button on the main dialog box. Its OnOK function again implements a state machine that walks the user through the calibration process. The current implementation checks guitar tuning and saves that tuning information to a text file. It is contemplated, however, that further calibration steps might also be implemented (i.e. for noise floor and maximum signal amplitude) and the tuning information would need to be conveyed to the animated fretboard.

The process begins when the user specifies a calibration file name and clicks "OK". A CDaqDlg is then invoked to record a guitar strum with open tuning, after which Check-Tuning is led to analyze that recording. It in turn calls CVGSProApp::Analyze, with the flag set to invoke guitar2midi with the "check tuning" option. The results returned from MATLAB are then parsed to determine if an error was reported, or if not, what the results of the tuning check were. These results are then saved in the calibration file and shown to the user.

5.4.5. CRecordDlg.

CRecordDlg allows the user to specify a file name and then opens a CDaqDlg to handle the actual recording of the file. If the user indicates they want to convert the completed recording to MIDI, then on return to CVGSProDlg::OnRecord the "Convert" button will be automatically "pushed" for them.

5.4.6. CConvertDlg.

CConvertDlg allows for user specification of the name of a previously recorded file to be converted to MIDI. It checks that the user wants to overwrite the MIDI files and *.wav files to be created, if they exist already, and then calls CConvertDlg::Analyze to handle the analysis. After it calls CVGSProApp::Analyze, the MATLAB results are parsed and saved in a report file if there were no errors. Note that the same report file name is always used, so if one already exists in the current folder, it will be overwritten. Two previously invisible buttons on the dialog are then made visible, offering the user the options to view the report and/or listen to the *.wav file generated by guitar2midi. This is accomplished using ShellExecute to open the files using whatever applications are associated with the text and *.wav files, respectively. The user can then use the "Save As" command of the report viewer to preserve it under a new name.

5.5. MATLAB Scripts.

The custom MATLAB scripts are responsible for analyzing a guitar recording to determine how it can be represented in standard MIDI with the addition of guitar-specific parameters. The output from MATLAB based on the scripts generally provides an intermediate text file containing all the information needed to generate a MIDI file that transcribes the input guitar recording.

The following MATLAB scripts are currently utilized within the present embodiment of the invention, although it will be appreciated that additional analyzation features are contemplated, for enhancing the generation of the enhanced MIDI files. Current MATLAB scripts: guitar2midi.m, audio2midi2.m, preproc.m, findpeaks.m, findpeaksSize.m, interpMax.m, hz2midi.m, midi2 hz.m, normalize.m, notes2semitone.m, status.m, status.fig.

Guitar2midi.m is the main function that converts a multi-channel guitar recording into a MIDI file. Guitar2midi.m opens each multi-channel guitar file, separates the data into seven tracks (six from the hexaphonic pickup, one that is line level audio), preprocesses the data with preproc.m, processes each string individually with audio2midi2.m, writes the converted output to an intermediate text file, converts this intermediate text file to a MIDI file with midigen.exe, and returns report file information to VGSPro.exe. Guitar2midi also creates subfolders called "\wavs" and "\midi" in the folder with the seven-channel recording. The composite guitar audio channel is written as a normalized *.wav file into the \wavs folder, and the final MIDI output, along with the intermediate text file, are placed in the \midi folder.

Audio2midi2.m handles the actual conversion of each string from audio to MIDI. It uses findpeaks.m, findpeaksSize.m, interpMax.m, hz2midi.m, midi2 hzm, normalize.m, and notes2semitone.m to help with this.

Status.m is a script that allows other scripts (guitar2midi and audio2midi2 in this case) to display status information on the screen as the conversion happens. The display window is saved as status.fig. It contains two text blocks and a disabled slider that functions as a timeline. The functionality to display messages and move the slider bar is found at the end of status.m.

5.6. Processing Algorithms.

The following series of plots and descriptions explain how string motion information may be processed to detect pitch information and information on guitar specific techniques utilized during the performance. The plots were extracted from the analysis of six notes at the beginning of a recording of the guitar music piece "surfing". These plots are provided by way of example, and not of limitation, to represent the processing performed on each string, as all processing is preferably performed one string at a time whenever string motion data is analyzed.

Figure 15:
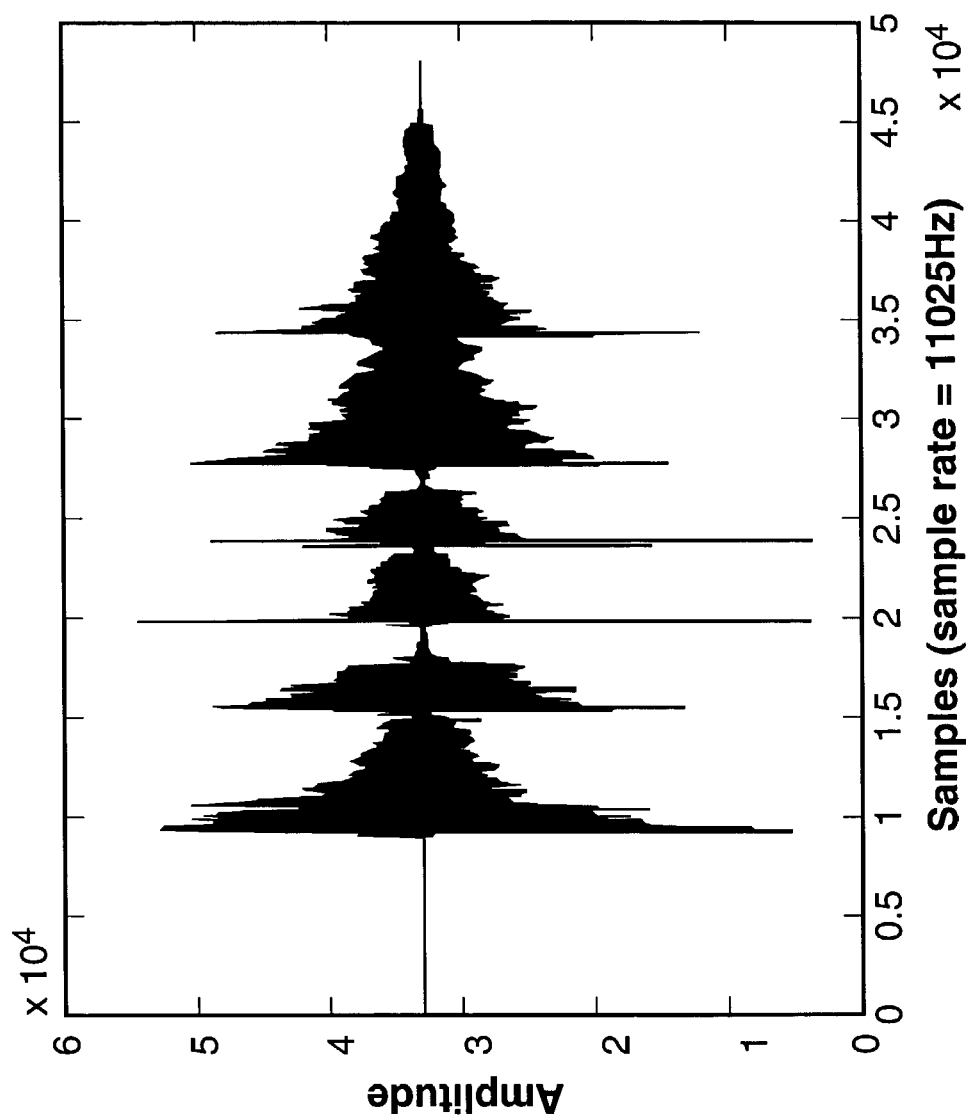
FIG. 15 is a graph of a raw analog signal from the optical sensor utilized according to an aspect of the present invention, showing amplitude over time.
Figure 16:
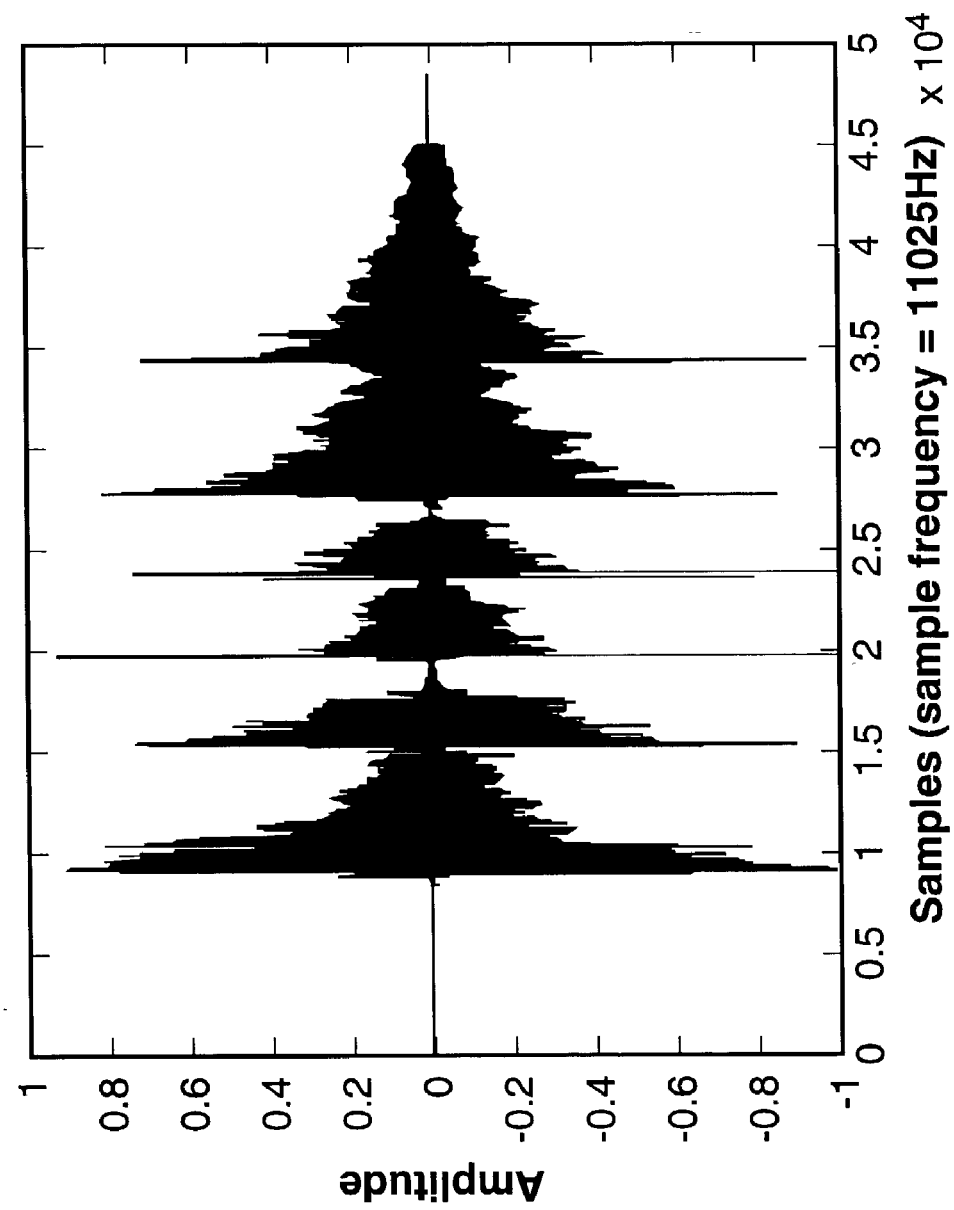
FIG. 16 is a graph of a limited and normalized waveform for the signal of FIG. 15.

FIG. 15 represents the raw amplitude waveform which includes the six notes. The first part of the conversion from string motion data to pitch information, which for example may be annotated within a MIDI file, is to preprocess the audio frequency string data. The motion data is converted from its raw form, such as with a range from 0 to 65535, to a normalized range of +/−1. The waveform is then limited and re-normalized with the result shown in FIG. 16. This process slightly reduces the "spiky" nature of the note attacks with less distortion than hard clipping would cause.

Figure 17:
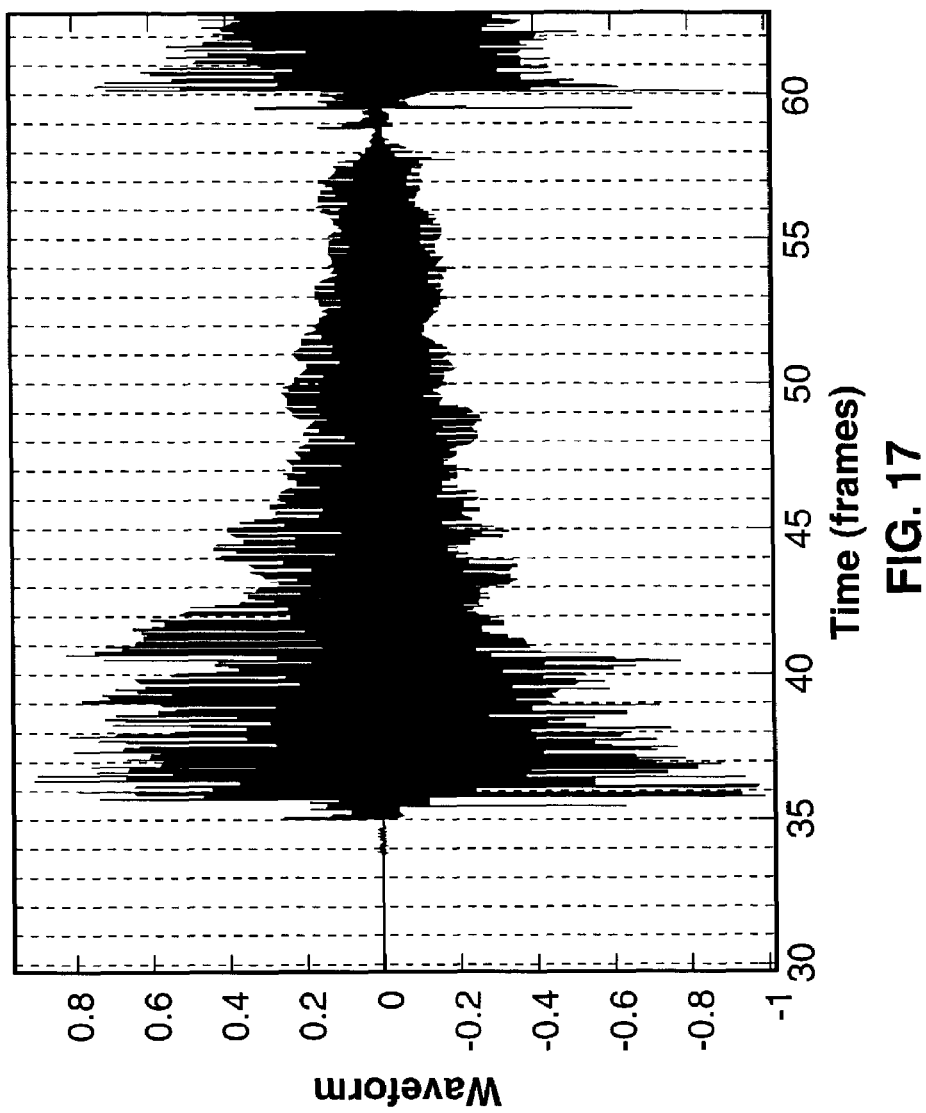
FIG. 17 is a graph of a zoomed-in portion of the waveform of FIG. 16, showing frame locations.

After preprocessing, the waveform is divided into 46 millisecond frames. FIG. 17 depicts a section of the waveform plot which has been zoomed-in on the first note to indicate where the frames lie. Note that the vertical lines on this graph show where each frame begins. Each frame is 50% overlapped. Therefore, frame 40 goes from the line at 40 to 42, frame 41 goes from 41 to 43, and so forth.

Figure 18:
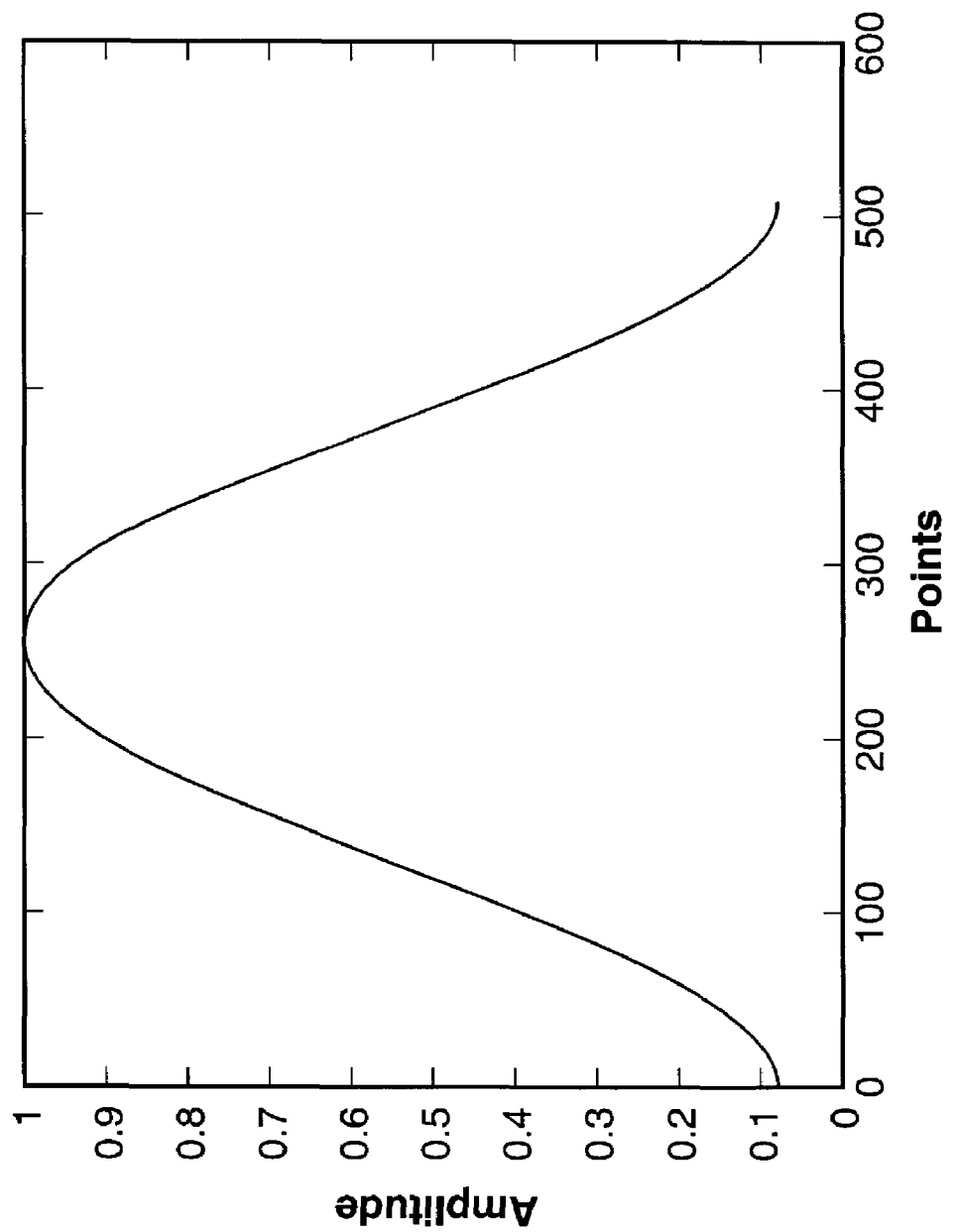
FIG. 18 is a graph of a 512 point hamming window for use according to an aspect of the present invention.
Figure 19:
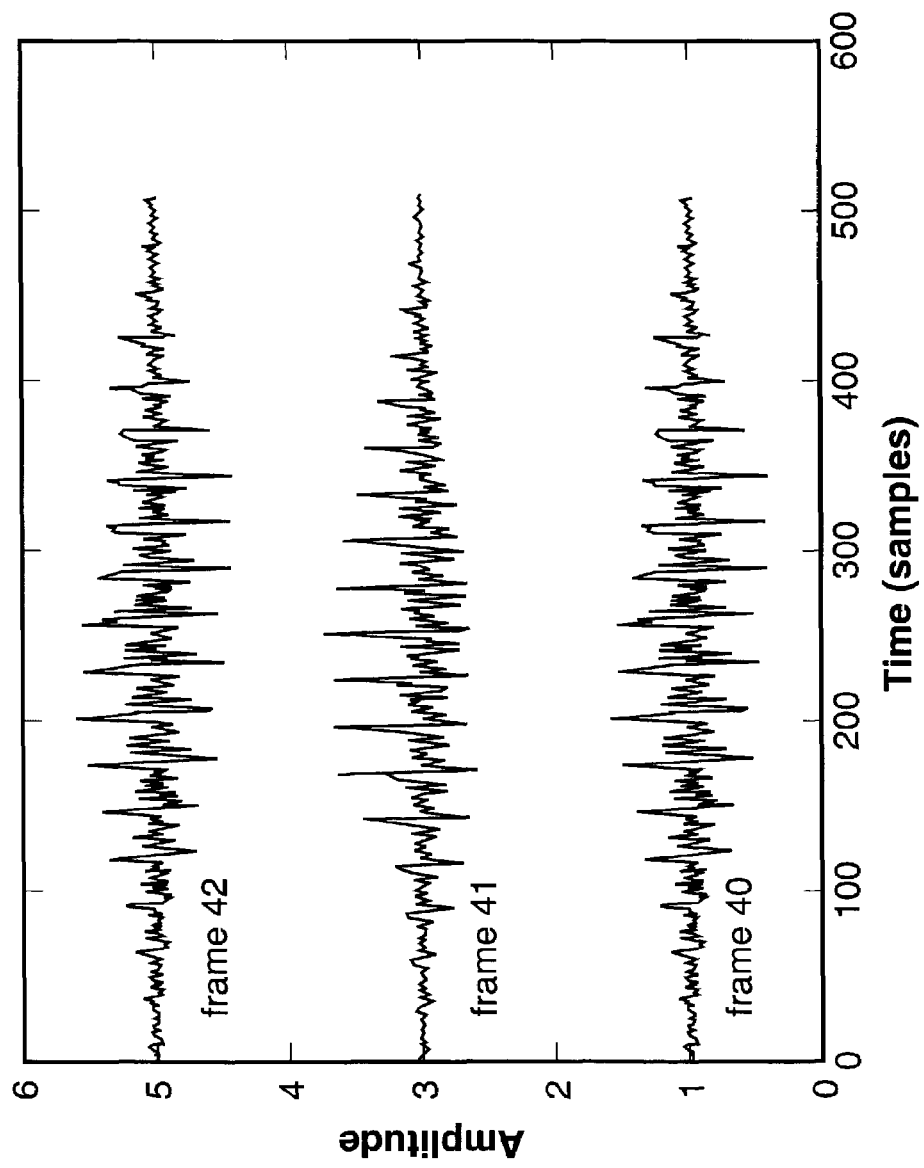
FIG. 19 is a graph of three frames (40, 41, 42) of windowed waveform.

Next, each frame is cut out of the waveform and multiplied by a hamming windowing function, as shown in FIG. 18, with three frames (40, 41, 42) in FIG. 19. shown after being multiplied by the windowing function.

Figure 20:
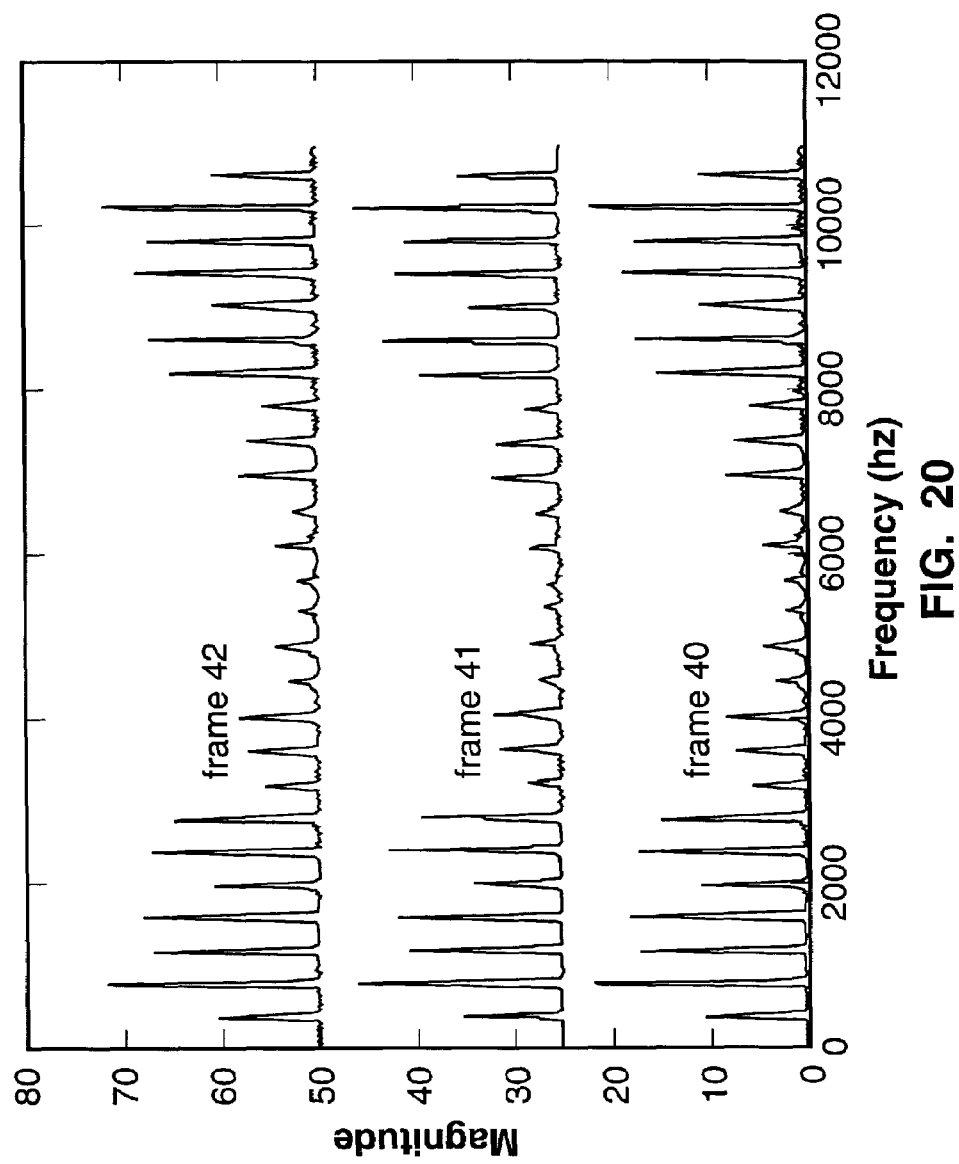
FIG. 20 is a graph of the magnitude of Fourier transforms (FFTs) of the windowed waveform of FIG. 19.

Fast Fourier transformations (FFT) are performed on the windowed frames which result in the plot of FIG. 20. Note that the waveforms were zero padded to twice their lengths before this operation, so the FFTs are 1024 points long.

Figure 21:
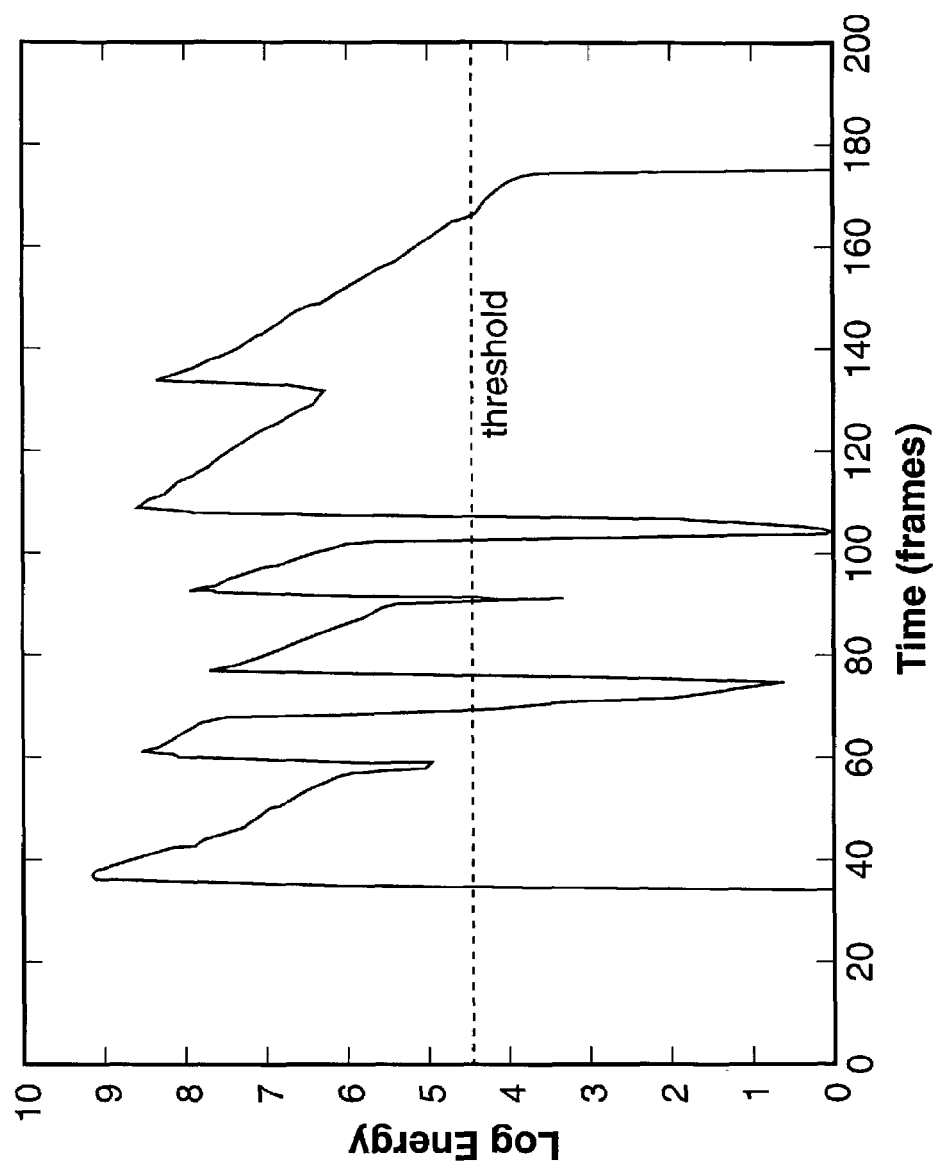
FIG. 21 is a graph of log scaled energy with respect to time according to an aspect of the present invention, shown in relation to an energy threshold.

The energy of each frame is then computed and converted to a logarithmic scale (log-scale), as shown in FIG. 21. A log-energy threshold is shown being set near the center of the plot, below which no calculations are carried out from this point on.

Four pitch estimation algorithms are then preferably run, but only on frames with energy greater than the threshold shown in the previous plot. The four estimations utilized are Fourier transform (FFT), autocorrelation function (ACF), cepstral analysis (CEP), and spectral autocorrelation (SAC).

Figure 22:
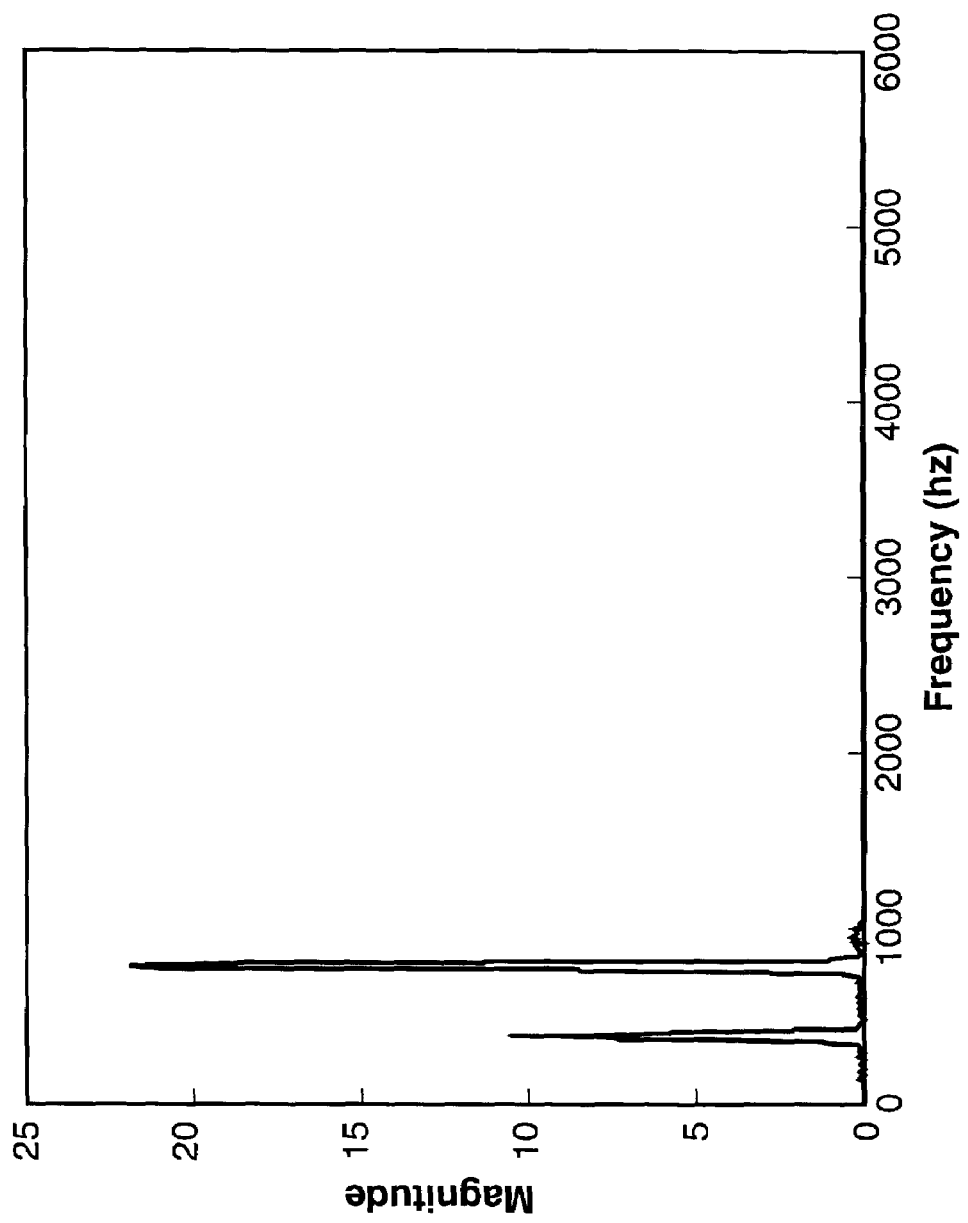
FIG. 22 is a graph of magnitude of FFT of frame 40 with frequencies outside of the string range removed.

The first estimate is based directly on the FFTs that were previously calculated. To find the pitch, all energy outside the possible range of the string is removed, the remaining peaks are then found. A location is only considered a peak if its maximum is at least 18% as large as the largest peak remaining. The exact location of the peak is determined by taking the three points nearest the peak and interpolating. The leftmost of the peaks found is then taken to be the pitch for each frame. The plot of FIG. 22 depicts one frame (frame 40) showing the magnitude of FFT on frame 40, after removing frequencies outside the range of the string. In this case, two peaks remain, with frequencies of 396 Hz and 796 Hz; with 396 Hz, the lowest value, being considered as the pitch with 796 Hz considered a harmonic.

Figure 23:
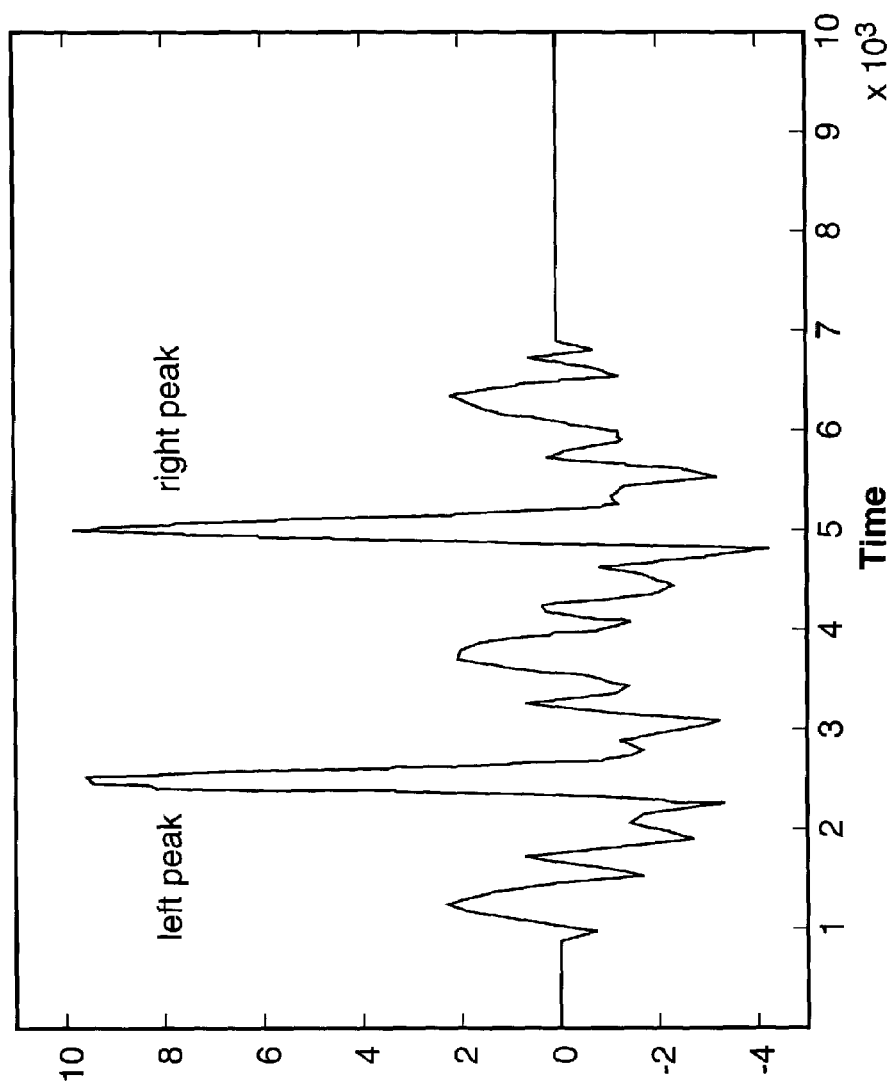
FIG. 23 is a graph of the real part of the autocorrelation function executed on frame 40 utilized according to an aspect of the present invention.

The second pitch estimation algorithm utilized was the autocorrelation function (ACF), which is calculated as the real part of the inverse FFT of the squared magnitude of the FFT, given by $acf(x)=real(ifft(|fft(x)|^2))$. FIG. 23 depicts this autocorrelation function as applied to frame 40. All frames corresponding to frequencies outside the range of the string are removed and the plot is zoomed-in. To find the frequency of the waveform the highest peak is located, with the interpolated x-axis value of this peak being the period of the note. In this case the large peak on the right with a period of 0.005 s is taken, and 200 Hz is the corresponding frequency. Since the autocorrelation function has a common error mode of selecting a frequency one octave too low (which occurred in the present case), a check is made to assure that substantial energy one octave higher, to the left on this graph, does not exist. Since there is a large peak to the left at exactly half the period, the pitch estimate is switched to this peak, which has a period of 0.0025 and a frequency of 400 Hz.

Figure 24:
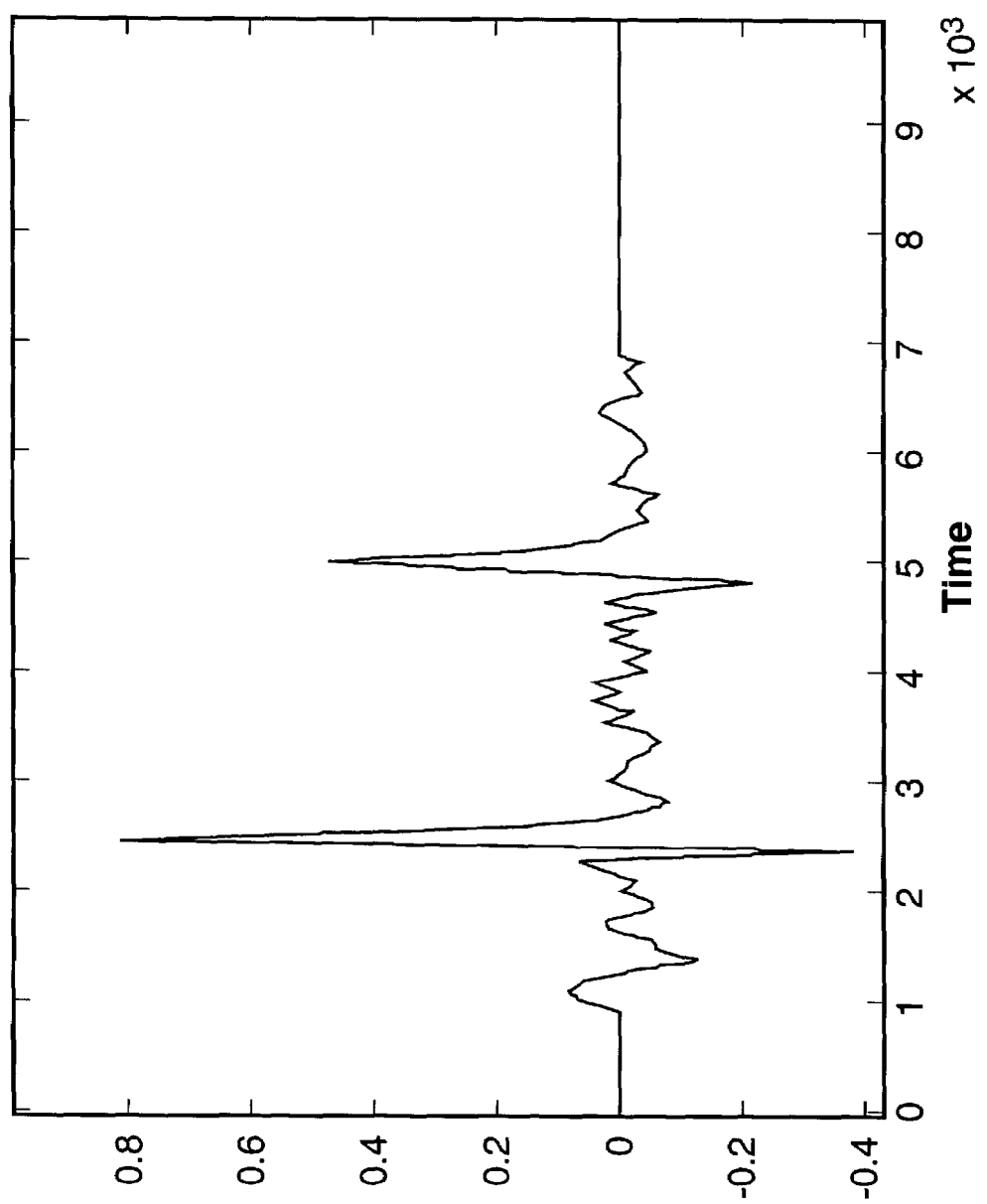
FIG. 24 is a graph of the real part of the Cepstrum function executed on frame 40 utilized according to an aspect of the present invention.

After performing the autocorrelation function, a cepstral analysis is performed for pitch estimation, and is calculated as: $cep(x)=real(ifft(log(|fft(x)|)))$. The process of finding the pitch once the cepstrum has been calculated works in exactly the same way as the autocorrelation function. FIG. 24 depicts this case with the real part of Cepstrum of frame 40 within which the period found being 0.0025 s, and with a frequency of 406 Hz.

Figure 25:
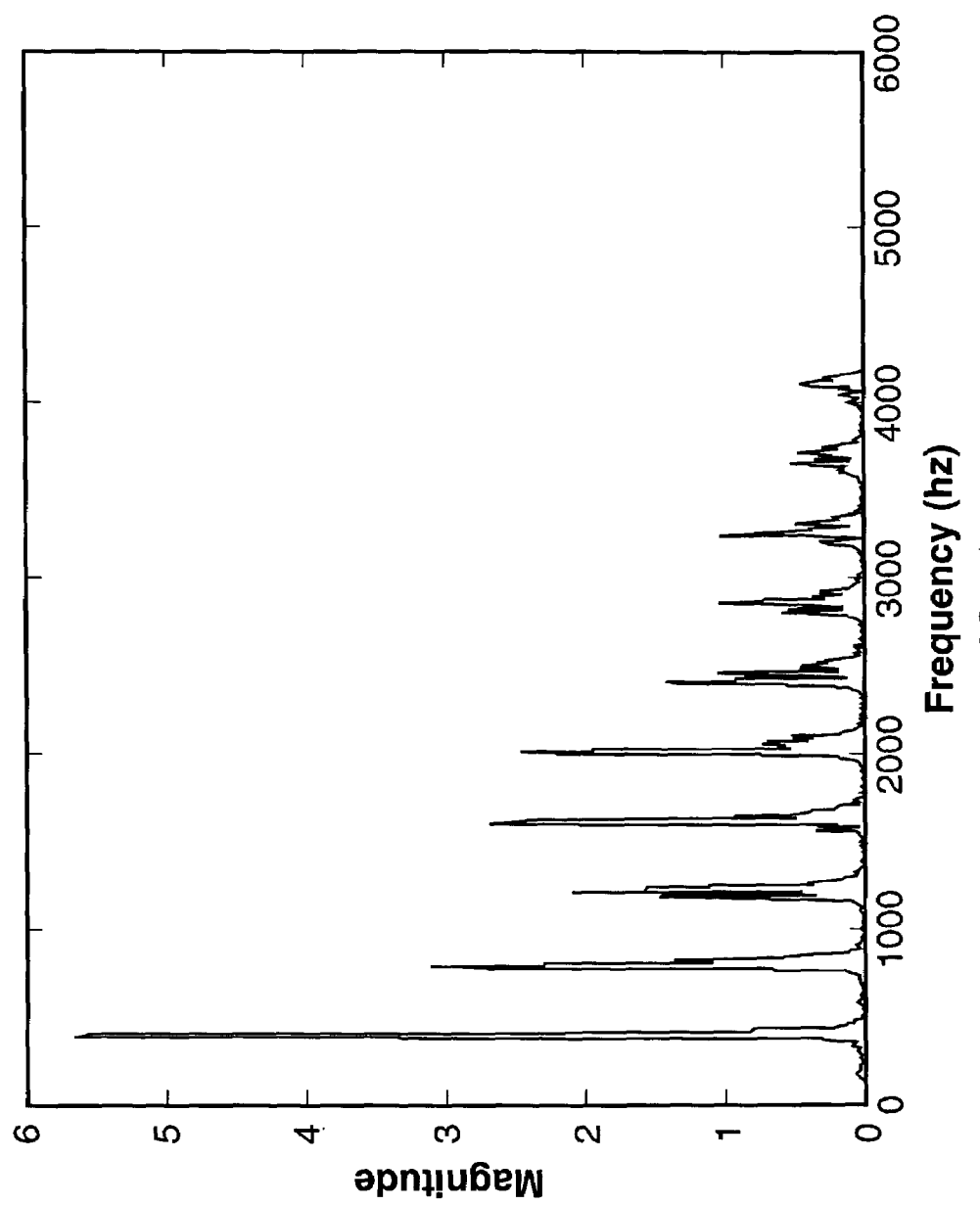
FIG. 25 is a graph of the magnitude of the spectral autocorrelation function (SAC) of frame 40 utilized according to an aspect of the present invention.

The final pitch estimation method utilized herein is spectral autocorrelation (SAC), which is calculated similarly to autocorrelation function, but starting with the spectrum instead of the time domain waveform. FIG. 25 depicts the magnitude of the spectral autocorrelation function of frame 40, and all frames outside the frequency range of the string are removed. The lowest peak within 18% of the maximum peak is taken to be the pitch in exactly the same manner as in the FFT pitch algorithm. In this case, the leftmost peak is found with a frequency of 399 Hz.

Figure 26:
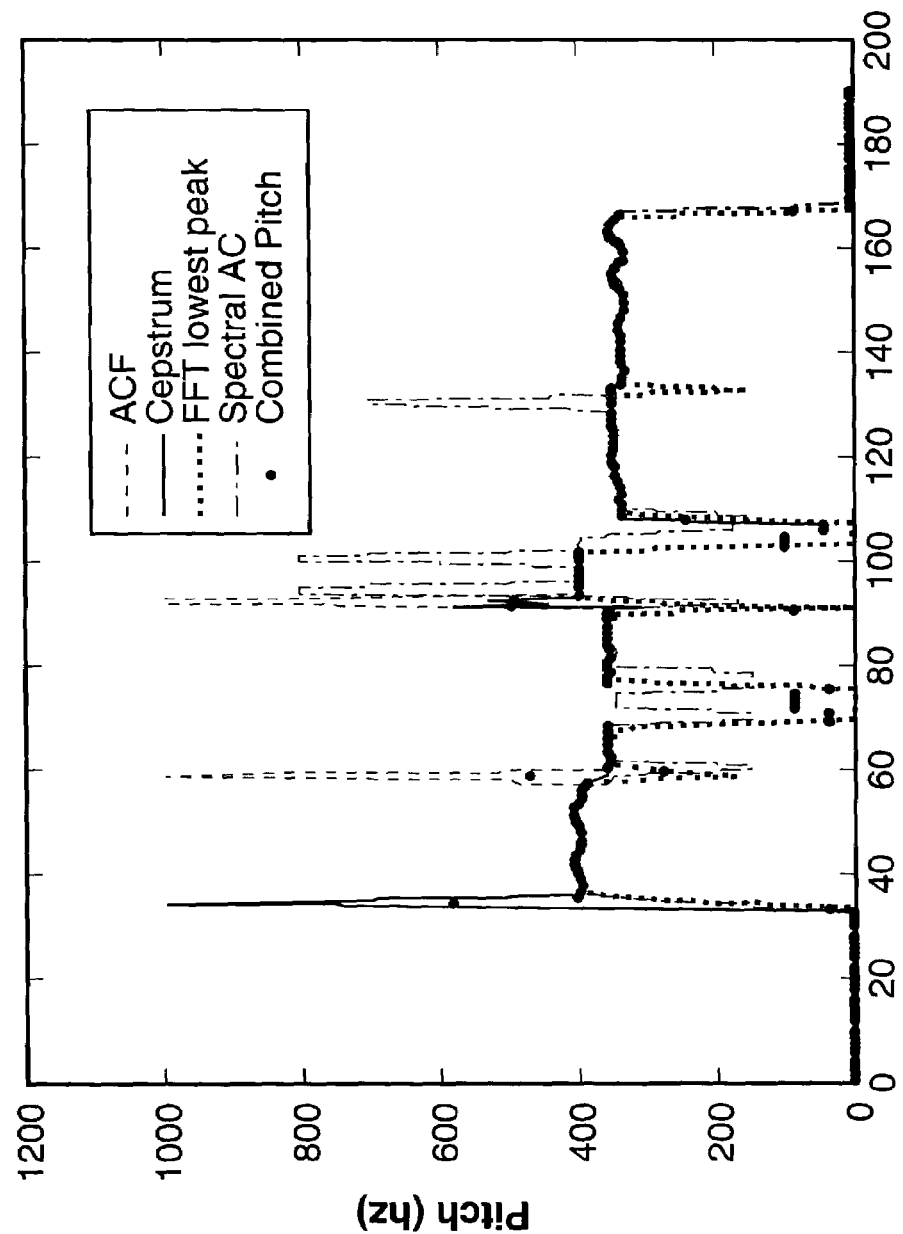
FIG. 26 is a graph of four pitch estimations plus combined estimation.
Figure 27:
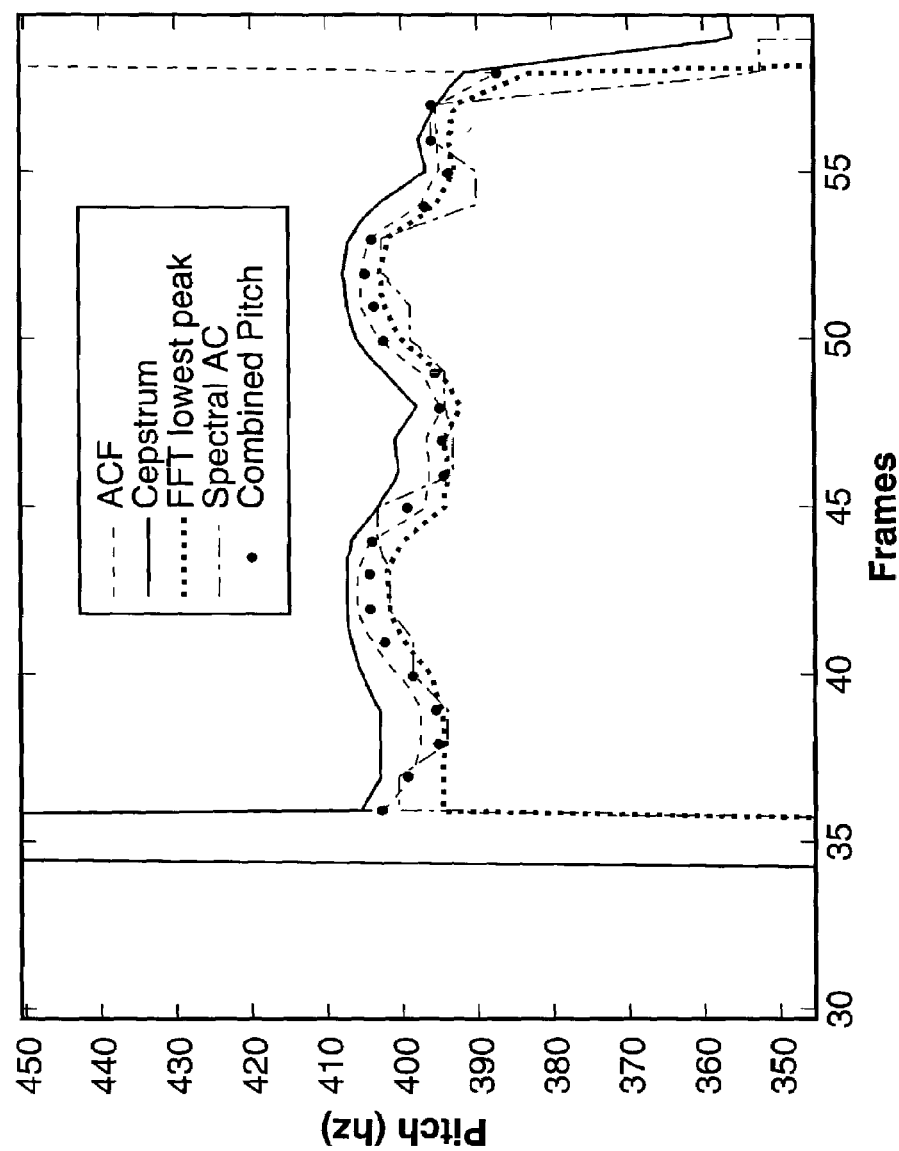
FIG. 27 is a graph showing a detailed view of a portion of the four pitch estimation methods of FIG. 26, from frame 35 to 55.

The four pitch estimates are combined by removing outliers and averaging. FIG. 26 depicts the results of the four pitch estimation algorithms, with the combination shown as the bold line plot of pitch over a series of frames. FIG. 27 depicts a detailed view of a section from the plot of the four pitch estimations, shown from around frame 40. It will be appreciated that the pitch estimation algorithms were set to zero and not run when the energy dropped below the energy threshold. Also, the spectral autocorrelation is executed using a different frame size and then interpolated so that it lines up with the other three pitch estimation techniques.

Figure 28:
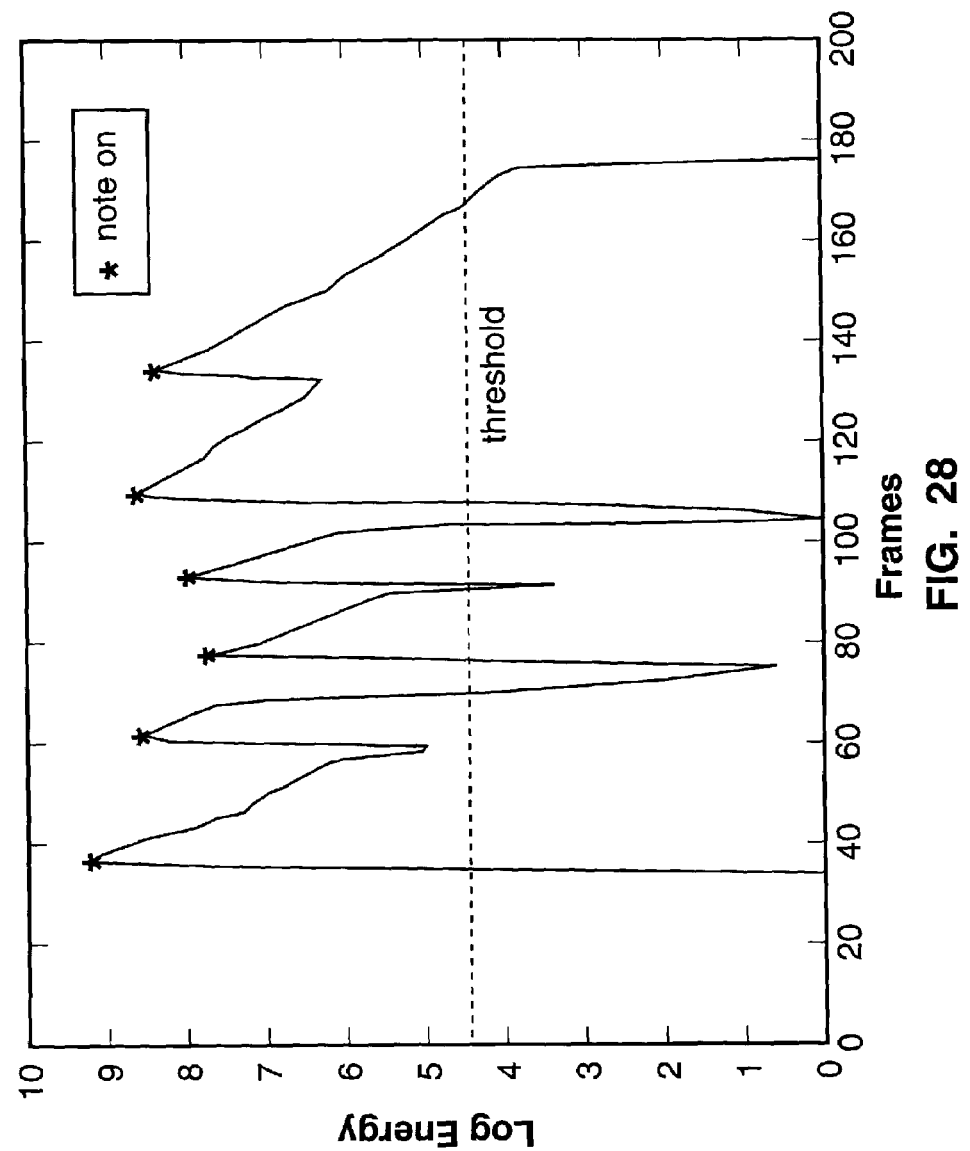
FIG. 28 is a graph of Note On detection determined by the slope of log energy, utilized according to an aspect of the present invention.

Now that the four pitch estimations have been carried out, the next step is to determine NoteOn/NoteOff locations. The first note detection method is based on the log-scaled energy. A note is found at a location where two conditions are met: (1) the energy exceeds the threshold, and (2) the slope exceeds a slope threshold. When several consecutive frames satisfy these requirements, the last frame is chosen as the note-on location. FIG. 28 depicts Note Ons detected by considering the slope of log energy.

Figure 29:
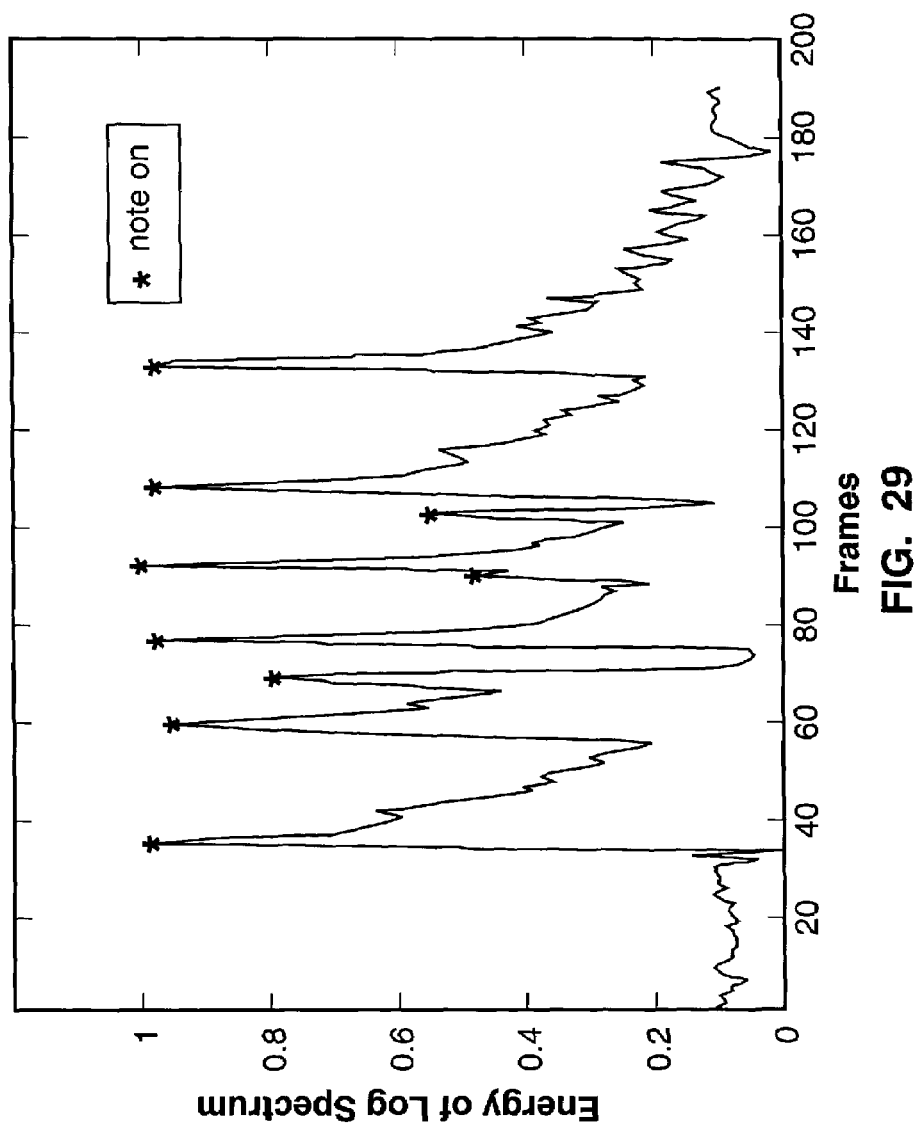
FIG. 29 is a graph of Note On detection determined from the energy peaks in the log spectrum utilized according to an aspect of the present invention.

Another note detection method considers energy peaks of the log-scaled spectrum. This method produces too many peaks to be useable as is, but can be modified by removing all note detections that are repeats of the first detection algorithm and all note detections that occur at the end of a note. FIG. 29 depicts Note Ons as detected by energy peaks within a log spectrum.

Figure 30:
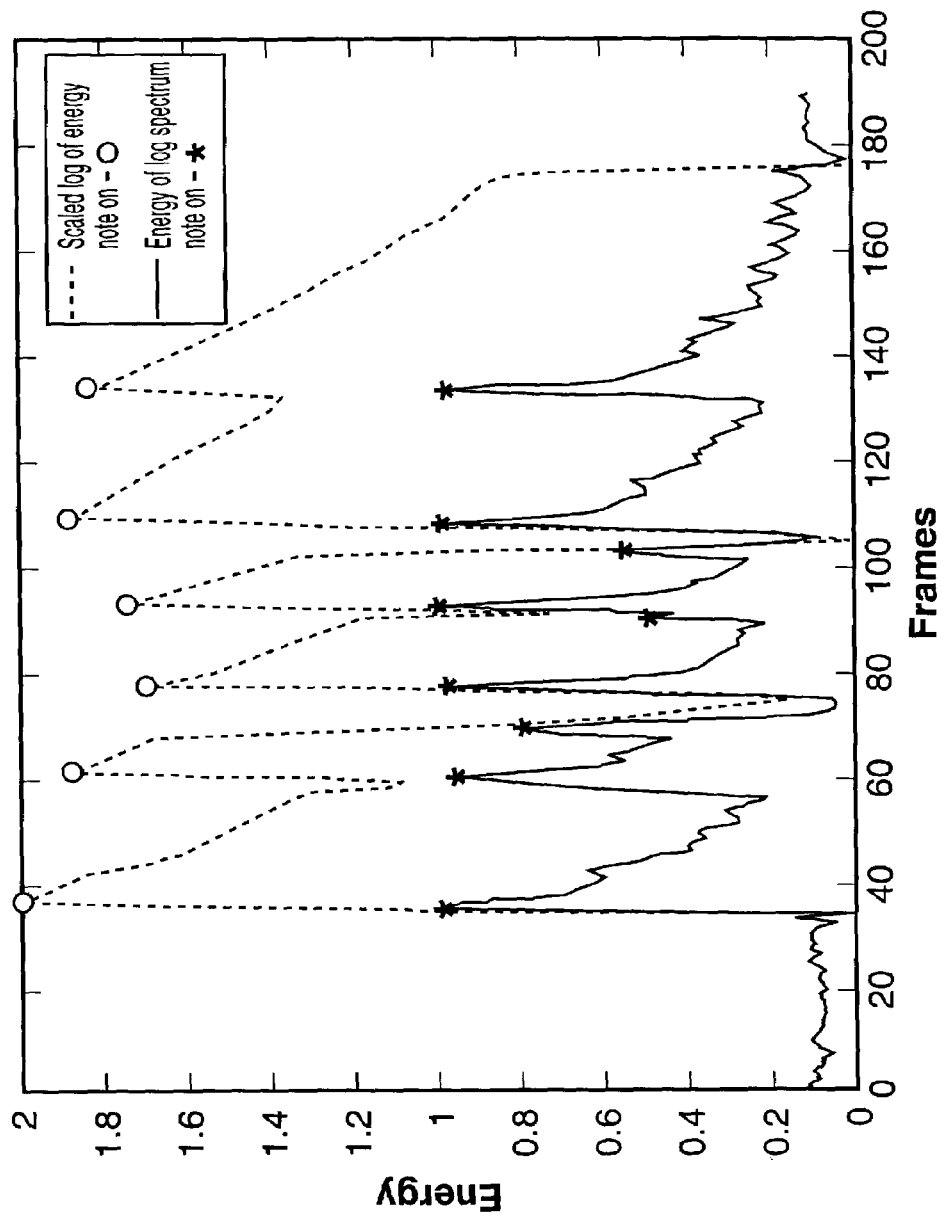
FIG. 30 is a graph of Note On detections by the two different methods of FIG. 28 and FIG. 29 utilized according to aspects of the present invention.
Figure 31:
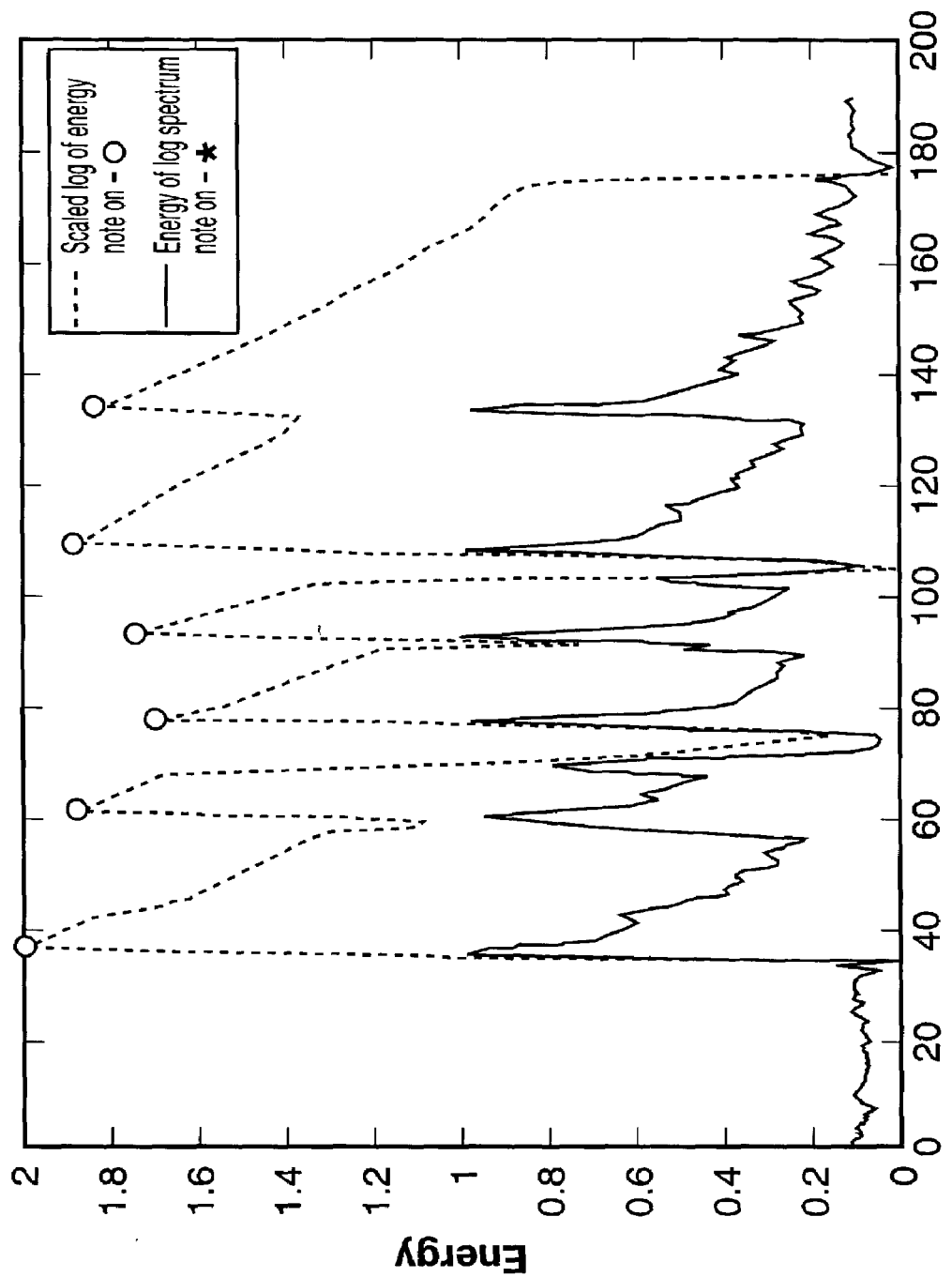
FIG. 31 is a graph of Note On detections as represented in FIG. 30, shown with "extra" notes removed.

FIG. 30 depicts the results of both Note On detection methods shown within a single plot, scaled log at the top of the plot and energy of log spectrum shown at the bottom. The log energy plot has been scaled to allow the two plots to be represented on the same graph.

FIG. 31 again depicts a combined plot of the two detection methods. However, in this plot, detections from the energy of the log spectrum have been removed if they are either redundant with detections from the first function or occur close to the note off. Since the note-off locations have not been determined yet, "note off" is where the energy drops back below the threshold. In this case, all notes detected by the second method have been discarded, which is fairly typical. At this time, any note detected by this second algorithm, which was not previously removed, is flagged as a hammer-on or pull-off, depending on the direction of pitch change between the current and previous note. If there is no pitch change, the note is not flagged as a hammer-on or pull-off.

Figure 32:
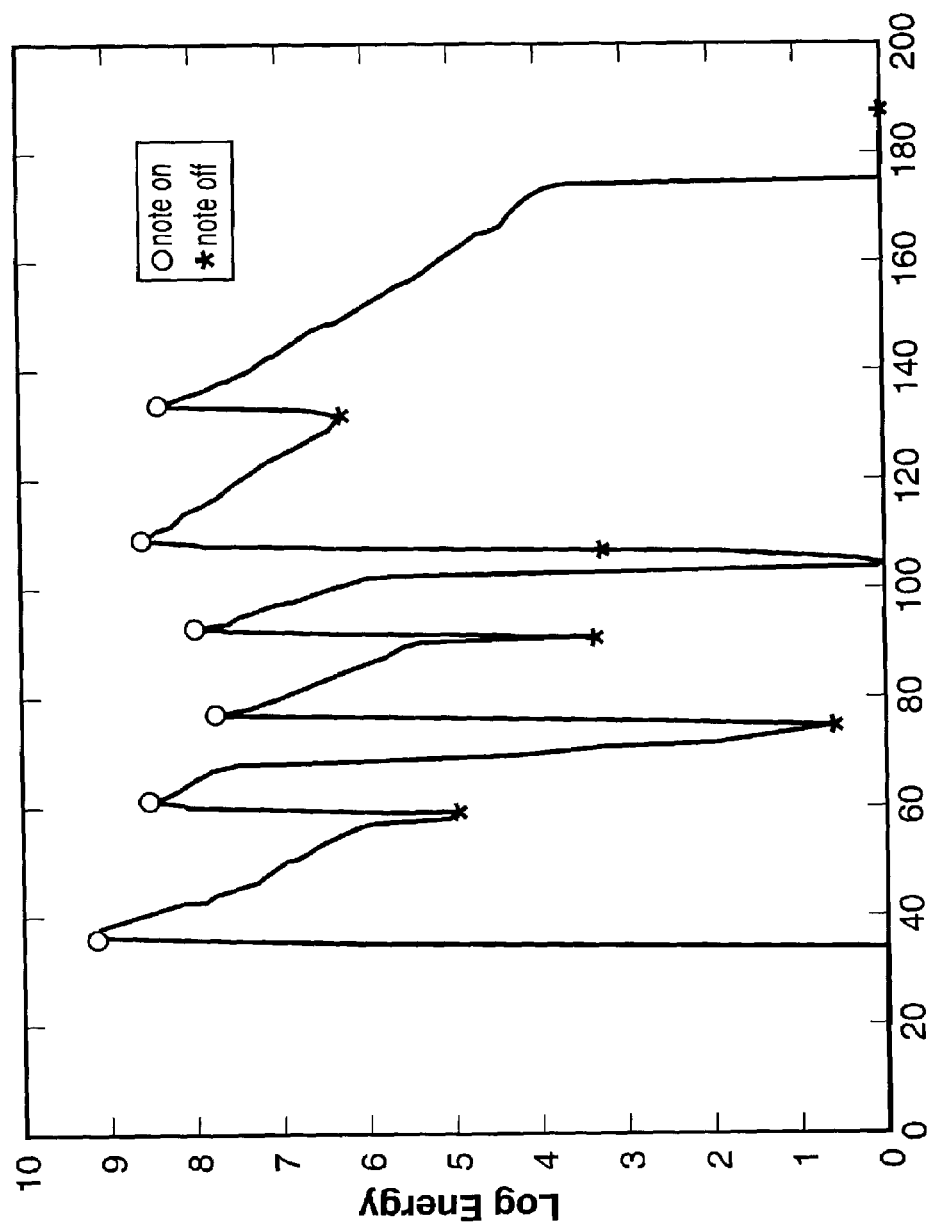
FIG. 32 is a graph of initial Note Off estimates, shown with Note Ons, used according to an aspect of the present invention.

Now that a set of note-on locations has been found, the corresponding note-off locations are to be determined. FIG. 32 depicts the initial estimations for note-off locations, which is two frames before the next note on. In the case of the last note, the last frame is the initial guess.

Figure 33:
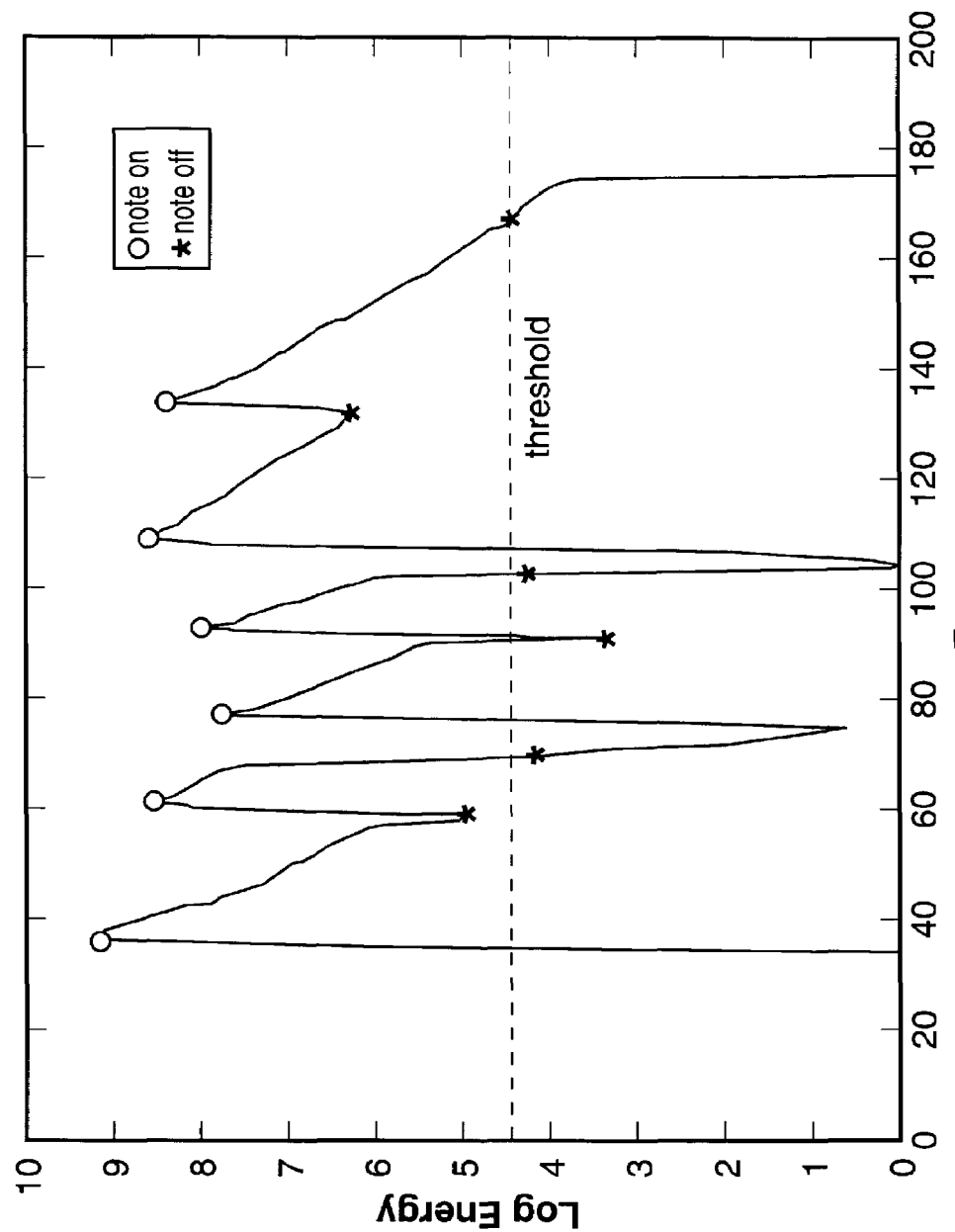
FIG. 33 is a graph of adjusted Note off estimates, and Note Ons, utilized according to an aspect of the present invention.

FIG. 33 depicts a plot with adjusted positions of the note off locations. If the energy drops below the threshold before reaching the initial estimation for the note off, the note-off estimation is moved up to where the energy first drops below the threshold. To this point note on, note off, and pitch have been determined for the waveform.

Figure 34:
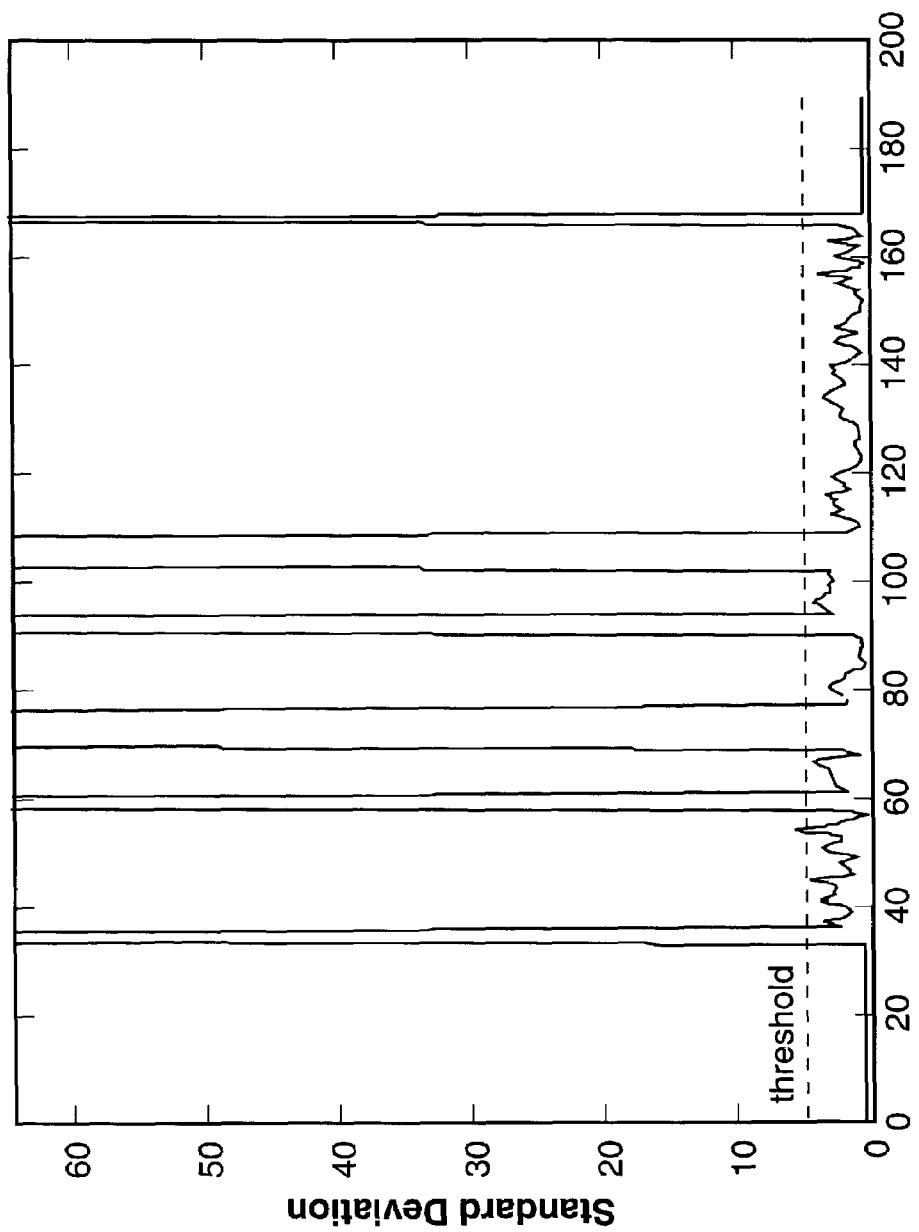
FIG. 34 is a graph of a standard deviation of pitch estimates and threshold utilized according to an aspect of the present invention.

The remaining processing is that utilized to flag bad notes and to extract guitar-specific techniques. The process of flagging bad notes starts by flagging all notes less than a defined length, which is currently a span of three frames, or about 140 ms. After this, the standard deviation of the pitch estimates is considered, which is shown in the plot of FIG. 34. A note is flagged if the standard deviation in the first three frames of a note are all above the threshold. None of the six notes played are flagged in this case.

Figure 35:
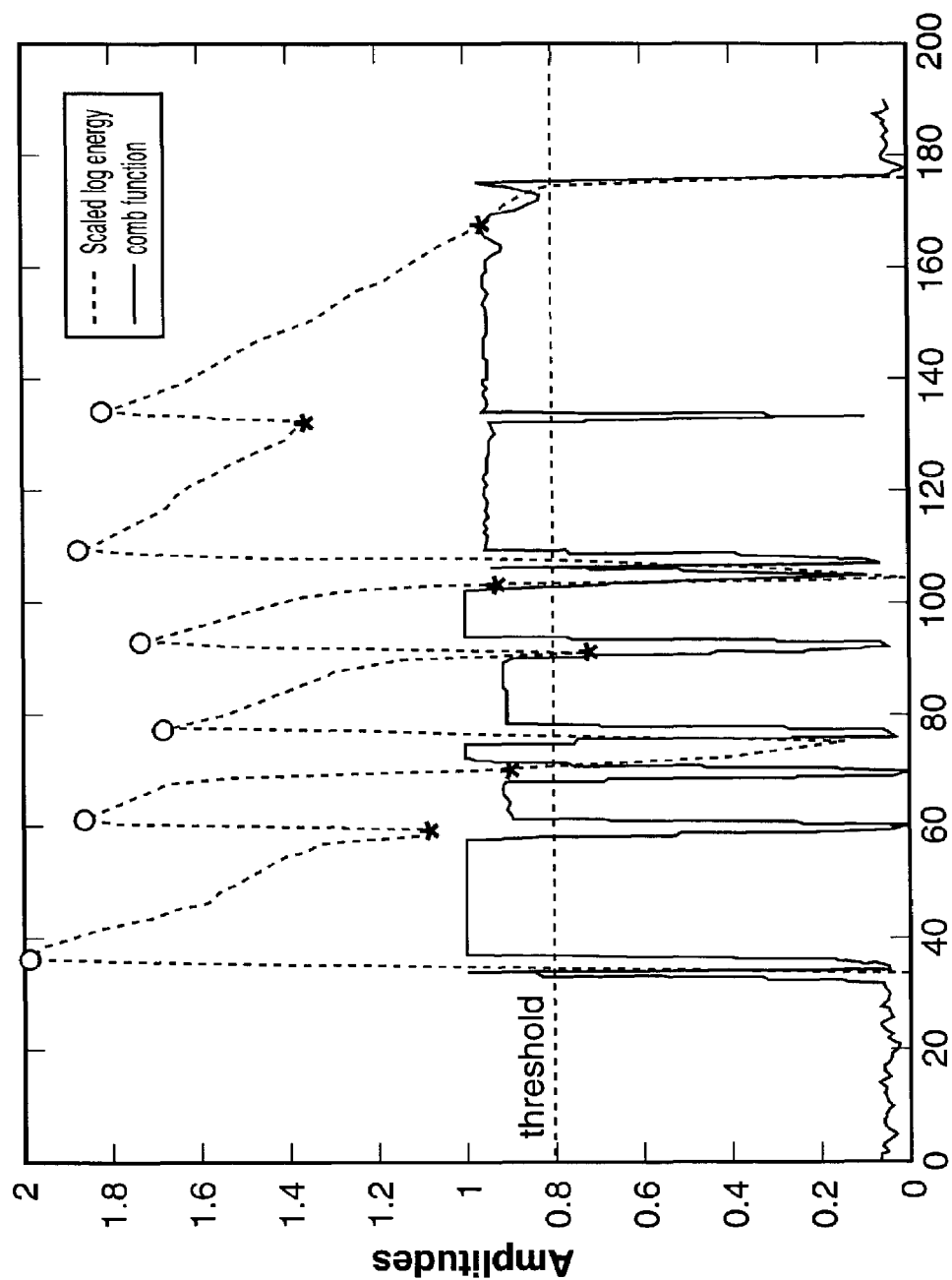
FIG. 35 is a graph of a comb function, comb threshold, and scaled log energy utilized according to an aspect of the present invention.

A second method of flagging notes is based on a "comb-ness" function. This function tries to determine if sound is harmonic or not. It is calculated by looking at the distances between peaks in the spectrum. To better understand this one may return to the FFT plot of frames 40, 41, and 42 depicted in FIG. 20 and notice how each plot provides a comb-like structure and may be scored based on this how well it fits such as structure. FIG. 35 illustrates that frames 40, 41, and 42 do indeed have a very high comb-ness score, which is shown plotted along with the scaled log energy. In order for a note to not be flagged, the comb function must rise above its threshold at some point within the boundaries of each note. For these six notes, this comb check does not flag anything. Note that the comb function is usually only calculated where the log energy is greater than the threshold; however, for this plot it has been calculated over the entire length of the file. Also, scaled log energy with note on/off locations is shown only for reference of where the notes take place.

Figure 36:
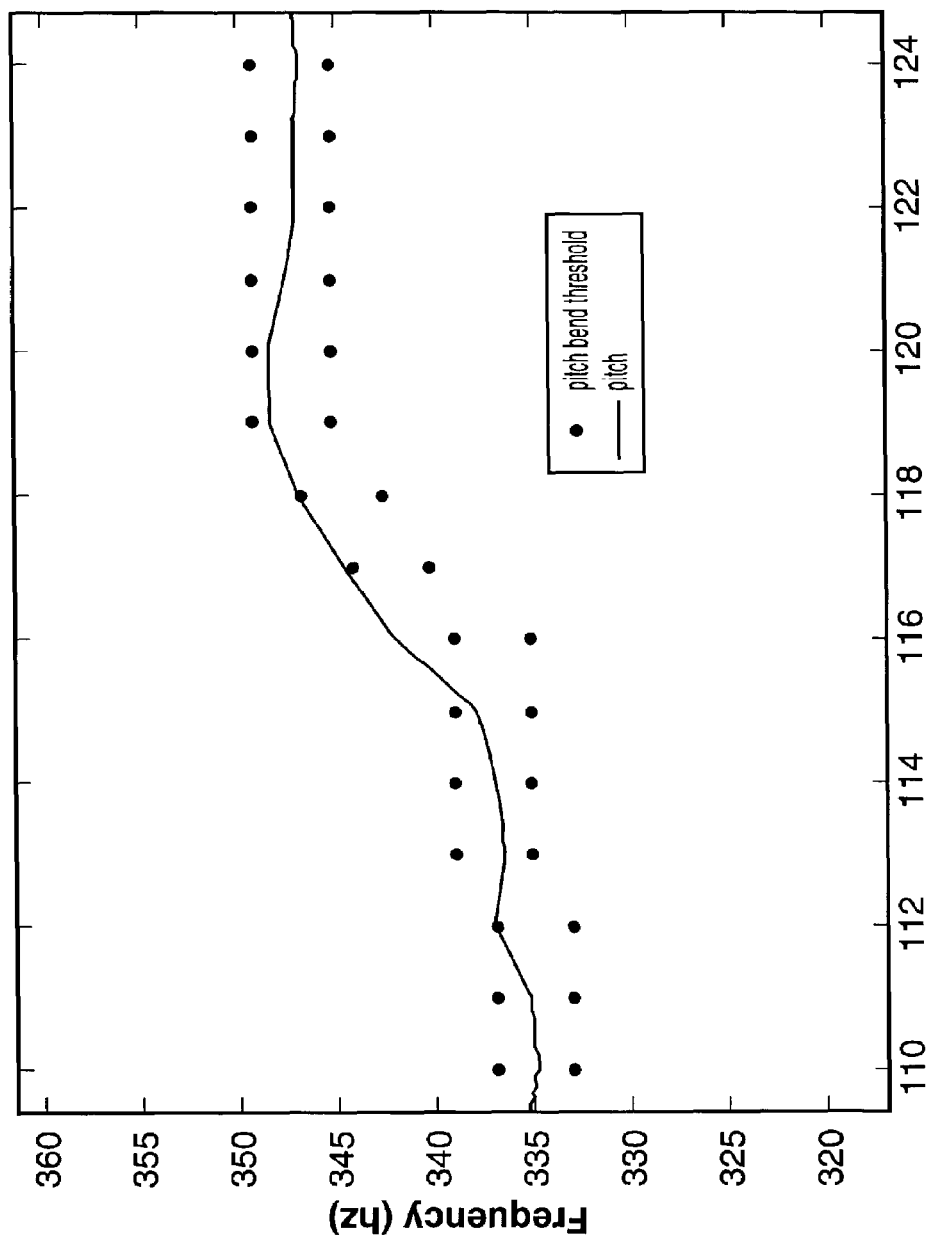
FIG. 36 is a graph of pitch and bend thresholds utilized according to an aspect of the present invention.

Pitch bends are the final phenomena to be described herein. Pitch bend messages can indicate either a bend or hammer-on/pull-off. The plot of FIG. 36 depicts how pitch bend messages are determined. First, the starting pitch is taken as the pitch of the first frame after the note-on detection. This is frame 110 for the note in this plot. Next, upper and lower bounds are set at +/−0.1 semitones. These are shown as dots on the plot. The pitch is then checked, one frame at a time, until it exceeds the +/−0.1 semitone threshold, which first happens at frame 112. As a result of exceeding the threshold, a pitch bend message is created, which effectively changing the output pitch to the pitch value of frame 112. The threshold is also adjusted so that it is now centered on the pitch at frame 112, and the process continues. This process repeats itself until the end of the note is reached. In this plot, four pitch bend messages would be sent, for frames 112, 116, 117, and 118. The pitch output to the MIDI player can be imagined to be a line running down the center of the black dot pairs. All notes are checked in this manner.

In addition to sending pitch bend messages, hammer-ons and pull-offs are checked for. This is accomplished by checking the slope of the pitch function. If the slope exceeds a threshold, a hammer-on or pull-off controller message is created. A check is then also made to see that multiple hammer-on or pull-off messages aren't created for the same event.

It will be appreciated that audio frequency signal processing algorithms, may be utilized separately, or in combinations, for extracting additional play related information from the string data, which may be enhanced with processing information from an audio monitor. Furthermore, motion information, as described in section "1. Overview of Architecture", may be used for augmenting the detection of playing techniques and/or for increasing the ability to discern one or more playing techniques.

The application midigen.exe according to the present embodiment of the invention is responsible for converting the intermediate text file produced by guitar2midi into a MIDI based file. The application is a Visual C++ Windows console application that may be executed from within a MATLAB script. It is called from within MATLAB by guitar2midi, but its functionality may be alternatively combined into VGSPro.exe.

5.7. Assembling and Using VG Studio Pro.

5.7.1. Component List for Alpha of VG Studio Pro.

Aside from the custom programming as described, an alpha version of VG Studio Pro was assembled using a number of off-the-shelf components and software packages, whose description and rough costs are listed in Table 4. It will be appreciated that the VG Studio Pro as described provides the functionality of encoding the play information into the extended MIDI data stream, or data file, but does not include the multimedia player for reading the Tablature Plus enhanced MIDI file to generate instructional video sequences for instructing the student, which are accompanied by the MIDI based audio synthesis. It should be appreciated that off-the-shelf generalized components, such as MATLAB® and the Signal Processing Toolbox, are to be preferably replaced with proprietary software in release versions of the system to increase speed and reduce cost per unit. Table 5 lists the pin-out for a standard 13 pin connector for a guitar pickup. It will be appreciated that the system may be interconnected in a number of ways and using various circuitry without departing from the teachings of the present invention.

5.7.2. Installation and Use of VG Studio Pro.

MATLAB and the Signal Processing Toolbox are installed following the directions on its accompanying compact disk (CD), it is not necessary to install the MATLAB documentation. The drivers are installed for the 9803 data acquisition board (9800 series drivers) following the instructions on the Data Translation CD. Whereafter the files: VGSPro.exe, midigen.exe, guitar2midi.m, audio2midi2.m, preproc.m, findpeaks.m, findpeaksSize.m, interpMax.m, hz2midi.m, midi2 hz.m, normalize.m, notes2semitone.m, status.m, status.fig, are copied into any convenient folder (that does not have an apostrophe in its path).

Connect the USB cable from the data acquisition box into the PC and wait for the "Found New Hardware" dialog box to disappear. Connect the guitar and monitor into the data acquisition box and connect the AC adapter of the signal conditioning circuit. Verify that the indicator (such as red LED) on the guitar pickup is activated to indicate that a proper power connection has been established.

To convert a guitar playing sequence to the enhanced MIDI format, double click the VGSPro.exe icon. Click the "Calibrate" button and follow the prompts to check your tuning. Click the "Record" button and follow the prompts to record the string motions within a guitar performance and convert it to a MIDI based file.

It should be appreciated that the algorithms described above for use on data from a hexaphonic pickup head and an optional monitor input within the described alpha unit do not allow automatically distinguishing all the playing techniques described for use within the Tablature Plus player described earlier. These shortcomings may be addressed using additional algorithms and optionally a hand motion registration device to increase the available data.

5.8. Testing Alpha Version of VG Studio Pro.

In order to test the performance of the Alpha VG Studio Pro hardware and signal processing software, a series of recordings were created using a Roland® GK-2A magnetic pickup on an Ibanez® RG 120 guitar, and a National Instruments® AT-MIO-16E-2 data acquisition board. Transcriptions were also prepared of these recordings for comparison to the Alpha VG Studio Pro MIDI file output.

Although nineteen test songs were recorded, and all of them were run through the signal processing software to produce *.wav and MIDI files, only the first four (Layla 1, Layla 2, Smooth, Ramble On), which have been analyzed in detail, are included herein. The raw output of these four songs are shown in Table 6.

The transcriptions in Table 6 contained a total of 108 notes for the four files: Layla, Layla2, Smooth, and Ramble On. Guitar specific techniques (hammer-ons, pull-offs, slides, and bends) were transcribed for 25 of those notes. There were 101 notes in the VG Studio Pro output that matched those in the transcription, with the caveats that Hammer-ons greater than the allowable range of 2 MIDI notes were used and releases show up as bends. VG Studio Pro occasionally detected a bend where there was none as seen in the transcription. In this Alpha version short slides were not distinguishable from pull-offs.

The cases that were not regarded as a match were:
A hammer-on pull-off pair in Layla that was recorded very weakly and was missed.
A note in Layla transcribed as 79 but regarded by VG Studio Pro as a bent 78, and flagged as a possibly bad note (the only note in this sample so flagged).
Three notes were not transcribed, but may have accidentally been played (the previous chords used the same note on the same string in all cases) in Layla2 and Ramble On.
Five pull-offs, not transcribed, were detected in Layla2, Smooth, and Ramble On, these may also have been accidentally played.
Two notes transcribed as upward bent 74's in Smooth were detected as downward bent 76's.
One note in Ramble-On was detected as a hammer-on.

Of the 25 guitar-specific techniques in the transcription, 23 were detected (with the caveats noted above). The only ones missed were the weak hammer-on/pull-off in Layla. Therefore, of the 133 notes plus techniques found in the transcription, the Alpha VG Studio Pro signal processing software made 5 to 15 errors (depending on exactly what is regarded as an error), for an overall accuracy of approximately 92%.

Referring to Table 6, and the additional transcriptions of Appendix A, the first five columns contain information taken directly from the MIDI output of the Alpha VG Studio Pro signal processing software: delta time (ms), MIDI message, channel (1–6 for each of the six strings), note, and velocity.

The possible MIDI messages in the transcription are: 9=note on, 8=note off, 14=pitch bend, or 11=controller message.

The meaning of the note column is:
if MIDI message=8 or 9, this is the midi note number.
if MIDI message=14, (pitch bend) this is part of the pitch bend value.
if MIDI message=11: (controller message)
103=attack type
119=possibly bad note The meaning of the velocity column is:
if MIDI message=8 or 9, this is the MIDI velocity.
if MIDI message=14, this is part of the pitch bend value.
if MIDI message=11 and note=103:
2=hammer-on
3=pull-off
if MIDI message=11 and note=119:
not used The sixth column (In EMS notation) gives the translation of the contents of the first five columns into a notation similar to that used in the present system's transcription (column seven), namely: "H", "P", "S", next to a note indicates it was not picked, but rather sounded by hammering-on, or pulling-off, or sliding. The "B" adjacent to a note indicates the given MIDI note was bent up by the given amount (1=1 fret=½step, 2=2 frets=whole step). The "R" next to a note indicates it was not picked, but rather sounded by releasing a previously bent note. Several note numbers on the same line, separated by a hyphen, indicate a chord.

Note that no attempt was made to quantify the amounts of bends indicated in the VG Studio Pro output, and that in order to arrive at the translation to EMS notation, it is often necessary to examine what happens some lines beyond the original note-on message.

5.9. Converting Guitar Sounds to MIDI.

The process of converting string motions into a notation, such as MIDI based notation, can be split into three steps: (1) capturing the sound from the string, (2) amplification of the signal to a level where pitch analysis can be performed, and (3) conversion from string motion to MIDI through pitch analysis.

Four tables, Table 7 through Table 11, are provided which outline different aspects of existing MIDI guitar based technology. The first section associated with Table 7 and Table 8 document complete setups; with a guitar, pickup, and MIDI conversion.

Table 7 lists complete MIDI guitar setups such as by Fender, Ovation, Takamine, Godin, and others, while Table 8 lists guitars using other technologies.

The more common brands, such as Fender, Ovation, Takamine, utilize a magnetic hexaphonic pickup to a 13-pin cable connection into a Roland or Axon audio-to-MIDI converter. The more custom guitar makers, such as Godin, Brian Moore, Parker, and so forth, generally favored piezo hexaphonic bridges to either the Roland 13-pin system or the Virtual DSP system, which has a standard 5-pin MIDI output.

The ideal guitar for testing pickups would have both a hexaphonic magnetic pickup like the Roland GK-2A, and a piezo bridge like those made by RMC. Cost and difficulty of retrofitting an existing guitar are negative aspects of a piezo pickup when considering the home user, but this situation might be worthwhile for the studio situation. One final note about the piezo pickup, is that the audio from this pickup sounds more like an acoustic guitar, so it may be preferable to also record the sound from a magnetic pickup to use for playback.

As for fret-sensing technologies, they appear to have become obsolete, as none were found available on the market. One of the original designers at Zeta stated that string and fret oxidation was a problem. The Ztar, which doesn't have strings at all (except as triggers on some models), is still made today. However it is more keyboard than guitar. The ultrasonic fret sensing technology was also used on a guitar that didn't produce its own acoustic output (the strings were all the same size).

Table 9 lists individual pickups and preamplifiers (step 1 of the audio-to-MIDI conversion). These pickups being typically integrated with pre-amps as well (step 2). Within the audio-to-MIDI guitars, there are generally two standard setups using either a magnetic pickup, or a piezo pickup. The companies that appear frequently when researching MIDI guitars are Roland, Axon, Shadow, RMC, and LR Baggs; two of these manufacture magnetic pickups, two manufacture piezo pickups, while one manufactures both.

Table 10 lists a summary of audio-to-MIDI hardware that is designed for real-time use with a guitar (step 3). It should be appreciated that for use with VG Studio Pro, accuracy is critical while speed is not very important. Therefore, the speed of Axon's conversion is not advantageous. Generally, none of the tested audio-to-MIDI hardware boxes have been found to be designed with design goals that map well to VG Studio Pro constraints, as they are real time devices that sacrifice accuracy for speed.

Table 11 lists audio-to-MIDI software that is not specifically designed for real-time MIDI guitar applications, but generalized non-real-time audio-to-MIDI conversions of audio files (also step 3). This last approach is more similar to the goals of the VG Studio Pro system than most of the real-time MIDI guitar audio-to-MIDI processors.

5.10. Source Code Listings.

Appendix A includes source code listings for many of the files and routines within the present invention, including MATLAB files: Guitar2midi.m, Audio2Midi2.m, FindPeaks.m, FindPeaksSize.m, interpMax.m, hz2midi.m, midi2hz.m, preproc.m, normalize.m, notes2semitone.m, status.m, and C++ files: midigen.exe, VGSPro.exe. It will be appreciated that a number of additional algorithms and processing routines may be implemented by one of ordinary skill in the art by modifying these routines to additional or alternative features, without departing from the teachings of the present invention.

Accordingly, it will be seen that this invention provides a number of beneficial features for helping students learn the guitar, bass (guitar), and similar fretted neck stringed instruments, in particular in relation to the learning of specific pieces of guitar music as played by a musician that has mastered the piece. Although a typical six string guitar is described within the specification, it should be appreciated that the system may be implemented for any fretted stringed instrument, such as four string basses, twelve string guitars, banjos, mandolins, sitars, lyres, lutes and any other fretted stringed instruments in which the strings are struck, picked, plucked, or strummed, while the other end of the strings may be held down (fingered) for creating the desired notes. These "struck" string instruments contrast to stringed instruments, such as violins, violas, cellos, string basses, and so forth, that are being stroked with a bow. Although, it will be appreciated that the present invention may be implemented on some typically "stroked" instruments that are being played without a bow, such as a string bass utilized for dixieland jazz, and similar situations with other stringed instruments.

The invention generally provides a method of notating "how" notes are played within the song, which are notated within a MIDI file (that conventionally only describes "what" is played consisting of notes and duration). The notation enhancing the MIDI file is referred to as Tablature Plus, and the present system includes a multimedia player mechanism configured for reading a MIDI file containing Tablature Plus information and generating a multimedia display of a guitar playing the notes in a piece of music with all the common guitar playing techniques being displayed visually using one or more representations. The present system has been described in terms of a single embodiment of the system, however, it will be appreciated that the teachings herein may be utilized by one of ordinary skill in the art to implement a number of variations without departing from the teachings herein. For example, the notations within the MIDI file may be configured in a number of ways for representing common guitar playing techniques, the method of encoding the techniques with the data glove may be provided with additional and/or alternative hardware and/or software, and the player mechanism for generating a multimedia display of the actions may be implemented in a number of alternative way under the teachings of the present invention.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Firmware Stack - Pickup Microcontroller

USB
Conversion to (High speed) MIDI data or Tablature Plus format
Tuning + LED control    Pitch tracking    Signal characteristic detection
(optional)                                (Amplitude, velocity, etc.)
Filtering and Signal conditioning (zero crossing, derivative, etc.)
Analog to Digital conversion

TABLE 2

Software Stack

Windows Application (main application)
O/S
Driver
USB control layer

TABLE 3

Hex Codes Associated with Extended Tablature within Rich MIDI Format

| Type | Hex data | Specific data |
|---|---|---|
| (none) | 0x00 | |
| Hammer-on | 0x01 | |
| Pull-off | 0x02 | |
| Slide up | 0x03 | |
| Slide down | 0x04 | |
| Brush | 0x05 | |
| Roll (Arpeggio) | 0x06 | |
| Natural harmonic | 0x07 | |
| Artificial harmonic | 0x08 | |
| Simple vibrato | 0x09 | |
| Simple tremolo | 0x0A | |
| Simple trill | 0x0B | |
| Bend | 0x0C | amplitude in ¼ tones |
| Muted | 0x0D | |
| Dead note | 0x0E | |
| Tap | 0x0F | |
| Bend up and down | 0x10 | ¼ tones between first note and bended note, between bended note and returned note |
| Return bend | 0x11 | ¼ tones to the returned note |

TABLE 3-continued

Hex Codes Associated with Extended Tablature within Rich MIDI Format

| Type | Hex data | Specific data |
|---|---|---|
| Bend down | 0x12 | ¼ tones to the down note (pre-bend and release) |
| Down stroke | 0x13 | |
| Up stroke | 0x14 | |
| Slap | 0x15 | |
| Pop | 0x16 | |
| Whammy bar | 0x17 | depth; speed (relative to tempo?) |
| Vibrato | 0x18 | depth; speed (relative to tempo?) |
| Tremolo | 0x19 | depth; speed (relative to tempo?) |
| Trill | 0x1A | number of trills (rhythm of trills?) |
| Finger Played | 0x1B | |
| Associated MPEG Video/Audio | | Multimedia String Assoc. with Data file by MIDI Time Code |

TABLE 4

Hardware and Software for Assembling Alpha version of VG Studio Pro

| Component | Supplier | Part Number | Cost $ |
|---|---|---|---|
| Hardware | | | |
| Hexaphonic mag. pickup | Roland | GK-2A | 100 |
| Data acquisition board | Data Translation | DT9803 | 1,150 |
| Signal conditioning circuit | Multiple | | 150 |
| Enclosure | Multiple | | 150 |
| 13-pin connector cable | Multiple | | 30 |
| PC | Multiple | | 1,500 |
| | | HW SubTTL: | $3,080 |
| Software | | | |
| MATLAB | MathWorks | | 1,900 |
| Signal Processing Toolbox | Mathworks | | 800 |
| | | SW SubTTL: | $2,700 |
| | | est. TOTAL: | $5,780 |

TABLE 5

Standard 13 Pin Connector Pin-out

| Pin | Description |
|---|---|
| 1–6 | String signals |
| 7 | Guitar out |
| 8 | Volume |
| 9 | NC |
| 10 | Switch 1 |
| 11 | Switch 2 |
| 12 | +7 V (phantom power) |
| 13 | −7 V (phantom power) |

TABLE 6

Test Results, Transcription of "Layla 1", "Layla 2", "Smooth", "Ramble On"

| | Alpha VG Studio Pro output | | | | EMS | | |
|---|---|---|---|---|---|---|---|
| Delta time | MIDI message | Channel | Note | velocity | In EMS notation | transcription | Notes |
| 1416 | 9 | 2 | 69 | 127 | 69 B | 69 | match |
| 139 | 14 | 2 | 127 | 127 | | | |
| 23 | 11 | 2 | 103 | 2 | H | 72 H | match* |
| 70 | 8 | 2 | 69 | 0 | | | |
| 23 | 14 | 2 | 0 | 64 | | | |
| 23 | 9 | 1 | 74 | 127 | 74 B | 74 | match |
| 163 | 14 | 1 | 127 | 127 | | | |
| 23 | 8 | 1 | 74 | 0 | | | |
| 0 | 11 | 1 | 103 | 2 | H | 77 H | match* |
| 23 | 14 | 1 | 0 | 64 | | | |
| 23 | 9 | 1 | 74 | 127 | 74 P | 74 P | match |
| 0 | 11 | 1 | 103 | 3 | | | |
| 139 | 9 | 2 | 72 | 127 | 72 | 72 | match |
| 70 | 8 | 1 | 74 | 0 | | | |
| 23 | 8 | 2 | 72 | 0 | | | |
| 70 | 9 | 1 | 74 | 127 | 74 | 74 | match |
| 534 | 8 | 1 | 74 | 0 | | | |
| 209 | 9 | 1 | 77 | 127 | 77 B | 77 B2 | match |
| 70 | 14 | 1 | 62 | 73 | | | |
| 23 | 14 | 1 | 45 | 81 | | | |
| 23 | 14 | 1 | 54 | 90 | | | |
| 23 | 14 | 1 | 39 | 95 | | | |
| 23 | 14 | 1 | 117 | 101 | | | |
| 46 | 14 | 1 | 43 | 107 | | | |
| 163 | 14 | 1 | 34 | 112 | | | |
| 163 | 8 | 1 | 77 | 0 | | | |
| 23 | 14 | 1 | 0 | 64 | | | |
| 23 | 9 | 1 | 77 | 127 | 77 B | 77 | match |
| 232 | 14 | 1 | 73 | 60 | | | |
| 232 | 14 | 1 | 58 | 56 | | | |
| 23 | 8 | 1 | 77 | 0 | | | |
| 23 | 14 | 1 | 0 | 64 | | | |
| 46 | 9 | 1 | 76 | 127 | 76 | 76 | match |
| 511 | 8 | 1 | 76 | 0 | | | |
| 23 | 9 | 2 | 72 | 127 | 72 | 72 | match |
| 488 | 8 | 2 | 72 | 0 | | | |
| 46 | 9 | 1 | 74 | 127 | 74 | 74 | match |
| 418 | 8 | 1 | 74 | 0 | | | |
| 93 | 9 | 2 | 69 | 127 | 69 B | 69 | match |
| 139 | 14 | 2 | 127 | 127 | | | |
| 23 | 11 | 2 | 103 | 2 | H | 72 H | match* |
| 70 | 8 | 2 | 69 | 0 | | | |
| 23 | 14 | 2 | 0 | 64 | | | |
| 255 | 9 | 1 | 74 | 127 | 74 | 74 | match |
| 70 | 8 | 1 | 74 | 0 | | | |
| | | | | | 77 H | | hammer-on & pull-off missed |
| | | | | | 74 P | | |
| 46 | 9 | 2 | 72 | 127 | 72 | 72 | match |
| 93 | 8 | 2 | 72 | 0 | | | |
| 23 | 9 | 1 | 74 | 127 | 74 | 74 | match |
| 511 | 8 | 1 | 74 | 0 | | | |
| 279 | 9 | 1 | 79 | 127 | 79 B | 79 B2 | match |
| 70 | 14 | 1 | 101 | 67 | | | |
| 23 | 14 | 1 | 85 | 85 | | | |
| 23 | 14 | 1 | 18 | 99 | | | |
| 23 | 14 | 1 | 113 | 103 | | | |
| 46 | 14 | 1 | 21 | 110 | | | |
| 70 | 14 | 1 | 92 | 114 | | | |
| 23 | 14 | 1 | 104 | 118 | | | |
| 209 | 14 | 1 | 67 | 114 | | | |
| 23 | 8 | 1 | 79 | 0 | | | |
| 23 | 14 | 1 | 0 | 64 | | | |
| 23 | 9 | 1 | 78 | 127 | 78 B? | 79 | flagged possibly bad note |
| 0 | 11 | 1 | 119 | 0 | | | |
| 116 | 14 | 1 | 127 | 127 | | | |
| 23 | 14 | 1 | 82 | 103 | | | |
| 0 | 11 | 1 | 103 | 2 | | | |
| 23 | 11 | 1 | 103 | 3 | | | |
| 255 | 14 | 1 | 57 | 99 | | | |
| 70 | 8 | 1 | 78 | 0 | | | |
| 23 | 14 | 1 | 0 | 64 | | | |

TABLE 6-continued

Test Results, Transcription of "Layla 1", "Layla 2", "Smooth", "Ramble On"

| Alpha VG Studio Pro output | | | | | EMS | | |
|---|---|---|---|---|---|---|---|
| Delta time | MIDI message | Channel | Note | velocity | In EMS notation | transcription | Notes |
| 23 | 9 | 1 | 76 | 127 | 76 | 76 | match |
| 488 | 8 | 1 | 76 | 0 | | | |
| 23 | 9 | 2 | 72 | 127 | 72 | 72 | match |
| 488 | 8 | 2 | 72 | 0 | | | |
| 46 | 9 | 2 | 74 | 127 | 74 B | 74 | match |
| 232 | 14 | 2 | 72 | 68 | | | |
| 70 | 14 | 2 | 75 | 63 | | | |
| 116 | 14 | 2 | 126 | 66 | | | |
| 139 | 14 | 2 | 102 | 61 | | | |
| 70 | 14 | 2 | 68 | 66 | | | |
| 23 | 14 | 2 | 69 | 72 | | | |
| 23 | 14 | 2 | 31 | 77 | | | |
| 93 | 14 | 2 | 64 | 70 | | | |
| 23 | 14 | 2 | 64 | 62 | | | |
| 70 | 14 | 2 | 110 | 74 | | | |
| 23 | 14 | 2 | 51 | 84 | | | |
| 23 | 14 | 2 | 14 | 90 | | | |
| 70 | 14 | 2 | 81 | 85 | | | |
| 23 | 8 | 2 | 74 | 0 | | | |
| 23 | 14 | 2 | 0 | 64 | | | |

*Hammer-on (greater than allowed range of 2) matches

Test results for Layla 2

| Alpha VG Studio Pro output | | | | | EMS | | |
|---|---|---|---|---|---|---|---|
| Delta time | MIDI message | Channel | Note | velocity | In EMS notation | transcription | Notes |
| 1393 | 9 | 5 | 50 | 127 | 50 | 50–57 | match |
| 23 | 9 | 4 | 57 | 127 | 57 B | | match |
| 46 | 14 | 5 | 91 | 60 | | | |
| 209 | 14 | 4 | 26 | 48 | | | |
| 0 | 14 | 5 | 51 | 38 | | | |
| 23 | 14 | 4 | 111 | 38 | | | |
| 0 | 14 | 5 | 66 | 28 | | | |
| 0 | 11 | 5 | 103 | 3 | P | 48–55 S | match* |
| 23 | 14 | 4 | 13 | 5 | | | |
| 0 | 14 | 5 | 17 | 9 | | | |
| 23 | 11 | 4 | 103 | 3 | P | | match* |
| 0 | 14 | 5 | 0 | 0 | | | |
| 46 | 14 | 4 | 65 | 0 | | | |
| 46 | 14 | 5 | 0 | 0 | | | |
| 23 | 14 | 4 | 0 | 0 | | | |
| 0 | 14 | 5 | 0 | 0 | | | |
| 23 | 14 | 4 | 0 | 0 | | | |
| 0 | 8 | 5 | 50 | 0 | | | |
| 23 | 8 | 4 | 57 | 0 | | | |
| 0 | 11 | 4 | 103 | 3 | | | |
| 0 | 14 | 5 | 0 | 64 | | | |
| 23 | 14 | 4 | 0 | 64 | | | |
| 0 | 9 | 5 | 46 | 127 | 46 | 46–53 | match |
| 23 | 9 | 4 | 53 | 127 | 53 B | | |
| 163 | 14 | 5 | 118 | 59 | | | |
| 302 | 8 | 5 | 46 | 0 | | | |
| 23 | 8 | 4 | 53 | 0 | | | |
| 0 | 14 | 5 | 0 | 64 | | | |
| 46 | 9 | 4 | 53 | 127 | 53 | | possible accidental note, not transcribed |
| 0 | 9 | 5 | 45 | 127 | 45 | 45 | match |
| 116 | 8 | 4 | 53 | 0 | | | |
| 93 | 9 | 6 | 42 | 127 | 42 B | 43 (bad note!) | match |
| 46 | 8 | 5 | 45 | 0 | | | |
| 93 | 14 | 6 | 74 | 55 | | | |
| 23 | 14 | 6 | 41 | 59 | | | |
| 23 | 14 | 6 | 0 | 0 | | | |
| 23 | 11 | 6 | 103 | 3 | P | | extra pull-off |
| 23 | 14 | 6 | 0 | 0 | | | |
| 23 | 8 | 6 | 42 | 0 | | | |
| 23 | 14 | 6 | 0 | 64 | | | |
| 46 | 9 | 4 | 55 | 127 | 55 B | 48–55 | match |
| 0 | 9 | 5 | 48 | 127 | 48 B | | match |
| 93 | 14 | 5 | 89 | 60 | | | |
| 23 | 14 | 4 | 82 | 60 | | | |
| 325 | 14 | 5 | 62 | 56 | | | |
| 23 | 8 | 5 | 48 | 0 | | | |
| 23 | 8 | 4 | 55 | 0 | | | |
| 0 | 14 | 5 | 0 | 64 | | | |
| 23 | 14 | 4 | 0 | 64 | | | |
| 0 | 9 | 5 | 45 | 127 | 45 | 45 | match |
| 255 | 8 | 5 | 45 | 0 | | | |
| 23 | 9 | 6 | 43 | 127 | 43 B | 43 | match |
| 116 | 14 | 6 | 26 | 59 | | | |
| 46 | 14 | 6 | 0 | 0 | | | |
| 23 | 14 | 6 | 0 | 0 | | | |
| 0 | 11 | 6 | 103 | 3 | | | |
| 70 | 8 | 6 | 43 | 0 | | | |
| 23 | 14 | 6 | 0 | 64 | | | |
| 23 | 9 | 4 | 57 | 127 | 57 B | 50–57 | match |
| 0 | 9 | 5 | 50 | 127 | 50 B | | match |
| 116 | 14 | 5 | 74 | 60 | | | |
| 116 | 14 | 4 | 77 | 60 | | | |
| 952 | 8 | 4 | 57 | 0 | | | |
| 0 | 8 | 5 | 50 | 0 | | | |
| 23 | 14 | 4 | 0 | 64 | | | |
| 0 | 14 | 5 | 0 | 64 | | | |
| 255 | 9 | 5 | 50 | 127 | 50 B | 50–57 | match |
| 23 | 9 | 4 | 57 | 127 | 57 B | | match |
| 232 | 14 | 4 | 117 | 52 | | | |
| 0 | 14 | 5 | 15 | 59 | | | |
| 23 | 14 | 4 | 1 | 34 | | | |
| 0 | 14 | 5 | 4 | 29 | | | |
| 23 | 14 | 4 | 43 | 5 | | | |
| 0 | 11 | 4 | 103 | 3 | P | 48–55 S | match* |
| 0 | 14 | 5 | 82 | 4 | | | |
| 0 | 11 | 5 | 103 | 3 | P | | match* |
| 23 | 14 | 4 | 99 | 1 | | | |
| 0 | 14 | 5 | 48 | 0 | | | |
| 70 | 8 | 5 | 50 | 0 | | | |
| 23 | 14 | 5 | 0 | 64 | | | |
| 23 | 14 | 4 | 0 | 0 | | | |
| 23 | 14 | 4 | 0 | 0 | | | |
| 23 | 8 | 4 | 57 | 0 | | | |
| 23 | 14 | 4 | 0 | 64 | | | |
| 23 | 9 | 5 | 46 | 127 | 46 B | 46–53 | match |
| 23 | 9 | 4 | 53 | 127 | 53 B | | match |
| 93 | 14 | 4 | 65 | 60 | | | |
| 255 | 14 | 5 | 86 | 60 | | | |
| 93 | 8 | 5 | 46 | 0 | | | |
| 23 | 8 | 4 | 53 | 0 | | | |
| 0 | 14 | 5 | 0 | 64 | | | |
| 23 | 14 | 4 | 0 | 64 | | | |
| 23 | 9 | 4 | 53 | 127 | 53 B | | possible accidental note, not transcribed |
| 0 | 9 | 5 | 45 | 127 | 45 | 45 | match |
| 70 | 14 | 4 | 46 | 59 | | | |
| 163 | 8 | 5 | 45 | 0 | | | |
| 46 | 9 | 6 | 43 | 127 | 43 B | 43 (bad note!) | match |
| 70 | 14 | 6 | 35 | 55 | | | |

-continued

Test results for Layla 2

| Delta time | MIDI message | Channel | Note | velocity | In EMS notation | EMS transcription | Notes |
|---|---|---|---|---|---|---|---|
| 23 | 14 | 6 | 125 | 42 | | | |
| 23 | 14 | 6 | 117 | 32 | | | |
| 23 | 14 | 6 | 42 | 29 | | | |
| 23 | 8 | 4 | 53 | 0 | | | |
| 0 | 14 | 6 | 0 | 0 | | | |
| 23 | 14 | 4 | 0 | 64 | | | |
| 0 | 11 | 6 | 103 | 3 | P | | extra pull-off |
| 70 | 8 | 6 | 43 | 0 | | | |
| 23 | 9 | 5 | 48 | 127 | 48 | 48–55 | match |
| 0 | 14 | 6 | 0 | 64 | | | match |
| 23 | 9 | 4 | 55 | 127 | 55 B | | |
| 186 | 14 | 5 | 74 | 60 | | | |
| 279 | 8 | 5 | 48 | 0 | | | |
| 23 | 14 | 4 | 22 | 56 | | | |
| 0 | 14 | 5 | 0 | 64 | | | |
| 23 | 8 | 4 | 55 | 0 | | | |
| 0 | 9 | 5 | 45 | 127 | 45 | 45 | match |
| 23 | 14 | 4 | 0 | 64 | | | |
| 209 | 8 | 5 | 45 | 0 | | | |
| 23 | 9 | 6 | 43 | 127 | 43 B | 43 | match |
| 116 | 14 | 6 | 10 | 60 | | | |
| 46 | 14 | 6 | 108 | 4 | | | |
| 23 | 14 | 6 | 0 | 0 | | | |
| 0 | 11 | 6 | 103 | 3 | | | |
| 70 | 14 | 6 | 0 | 0 | | | |
| 23 | 9 | 5 | 50 | 127 | 50 B | 50–57 | match |
| 0 | 8 | 6 | 43 | 0 | | | |
| 23 | 9 | 4 | 57 | 127 | 57 | | match |
| 0 | 14 | 6 | 0 | 64 | | | |
| 139 | 14 | 5 | 30 | 60 | | | |
| 789 | 8 | 4 | 57 | 0 | | | |
| 0 | 8 | 5 | 50 | 0 | | | |
| 23 | 14 | 5 | 0 | 64 | | | |

*short slides indistinguishable from pull-offs

Test results for "Smooth"

| Delta time | MIDI message | Channel | Note | velocity | In EMS notation | EMS transcription | Notes |
|---|---|---|---|---|---|---|---|
| 1509 | 9 | 3 | 69 | 127 | 69 B | 69 | match |
| 209 | 14 | 3 | 60 | 68 | | | |
| 93 | 14 | 3 | 15 | 64 | | | |
| 139 | 14 | 3 | 108 | 76 | | | |
| 46 | 14 | 3 | 29 | 81 | | | |
| 70 | 14 | 3 | 53 | 69 | | | |
| 23 | 14 | 3 | 56 | 62 | | | |
| 46 | 14 | 3 | 103 | 70 | | | |
| 23 | 14 | 3 | 102 | 77 | | | |
| 23 | 14 | 3 | 76 | 86 | | | |
| 70 | 14 | 3 | 17 | 81 | | | |
| 23 | 14 | 3 | 20 | 65 | | | |
| 23 | 14 | 3 | 103 | 60 | | | |
| 46 | 14 | 3 | 55 | 66 | | | |
| 23 | 14 | 3 | 23 | 80 | | | |
| 23 | 14 | 3 | 86 | 83 | | | |
| 23 | 14 | 3 | 8 | 88 | | | |
| 23 | 14 | 3 | 90 | 84 | | | |
| 23 | 14 | 3 | 69 | 77 | | | |
| 23 | 14 | 3 | 102 | 61 | | | |
| 70 | 14 | 3 | 46 | 72 | | | |
| 23 | 14 | 3 | 92 | 79 | | | |
| 23 | 14 | 3 | 13 | 89 | | | |
| 46 | 14 | 3 | 41 | 85 | | | |
| 23 | 14 | 3 | 120 | 73 | | | |
| 23 | 14 | 3 | 86 | 62 | | | |
| 70 | 14 | 3 | 106 | 76 | | | |
| 23 | 14 | 3 | 121 | 86 | | | |
| 23 | 14 | 3 | 18 | 91 | | | |
| 46 | 8 | 3 | 69 | 0 | | | |
| 23 | 14 | 3 | 0 | 64 | | | |
| 836 | 9 | 3 | 68 | 127 | 68 B | 68 | match |
| 209 | 14 | 3 | 112 | 69 | | | |
| 23 | 14 | 3 | 41 | 93 | | | |
| 23 | 11 | 3 | 103 | 2 | H | 69 H | match |
| 209 | 8 | 3 | 68 | 0 | | | |
| 23 | 14 | 3 | 0 | 64 | | | |
| 23 | 9 | 2 | 71 | 127 | 71 | 71 | match |
| 209 | 8 | 2 | 71 | 0 | | | |
| 70 | 9 | 2 | 71 | 127 | 71 B | 71 B1 | match |
| 209 | 14 | 2 | 64 | 76 | | 71 R | match* |
| 23 | 14 | 2 | 53 | 90 | | | |
| 23 | 14 | 2 | 48 | 97 | | | |
| 23 | 14 | 2 | 4 | 101 | | | |
| 23 | 14 | 2 | 124 | 104 | | | |
| 70 | 14 | 2 | 6 | 97 | | | |
| 23 | 14 | 2 | 6 | 82 | | | |
| 23 | 14 | 2 | 56 | 69 | | | |
| 23 | 14 | 2 | 52 | 63 | | | |
| 46 | 14 | 2 | 74 | 59 | | | |
| 232 | 8 | 2 | 71 | 0 | | | |
| 23 | 14 | 2 | 0 | 64 | | | |
| 23 | 9 | 3 | 69 | 127 | 69 | 69 | match |
| 93 | 8 | 3 | 69 | 0 | | | |
| 46 | 9 | 2 | 71 | 127 | 71 | 71 | match |
| 116 | 8 | 2 | 71 | 0 | | | |
| 46 | 9 | 2 | 72 | 127 | 72 H | 72 H | match |
| 0 | 11 | 2 | 103 | 2 | | | |
| 232 | 8 | 2 | 72 | 0 | | | |
| 0 | 9 | 3 | 69 | 127 | 69 | 69 | match |
| 93 | 8 | 3 | 69 | 0 | | | |
| 46 | 9 | 3 | 69 | 127 | 69 B | 69 | match |
| 232 | 14 | 3 | 82 | 67 | | | |
| 116 | 14 | 3 | 119 | 61 | | | |
| 46 | 14 | 3 | 72 | 58 | | | |
| 70 | 14 | 3 | 119 | 63 | | | |
| 46 | 14 | 3 | 16 | 68 | | | |
| 70 | 14 | 3 | 124 | 63 | | | |
| 23 | 14 | 3 | 88 | 56 | | | |
| 70 | 14 | 3 | 99 | 61 | | | |
| 23 | 14 | 3 | 48 | 69 | | | |
| 23 | 14 | 3 | 106 | 72 | | | |
| 93 | 14 | 3 | 124 | 60 | | | |
| 23 | 14 | 3 | 72 | 56 | | | |
| 46 | 14 | 3 | 13 | 62 | | | |
| 23 | 14 | 3 | 32 | 67 | | | |
| 23 | 14 | 3 | 53 | 78 | | | |
| 23 | 14 | 3 | 10 | 86 | | | |
| 70 | 14 | 3 | 31 | 78 | | | |
| 23 | 14 | 3 | 116 | 61 | | | |
| 23 | 8 | 3 | 69 | 0 | | | |
| 0 | 11 | 3 | 103 | 3 | P | | extra pull-off |
| 23 | 14 | 3 | 0 | 64 | | | |
| 952 | 9 | 2 | 76 | 127 | 76 B | 74 B2 | wrong pitch |
| 70 | 14 | 2 | 8 | 8 | | | |
| 23 | 14 | 2 | 125 | 12 | | | |
| 0 | 11 | 2 | 103 | 3 | P | | extra pull-off |
| 23 | 14 | 2 | 31 | 22 | | | |
| 23 | 14 | 2 | 0 | 37 | | | |
| 46 | 14 | 2 | 62 | 44 | | | |
| 139 | 14 | 2 | 35 | 48 | | | |
| 46 | 14 | 2 | 76 | 52 | | | |
| 46 | 14 | 2 | 74 | 58 | | | |

-continued

Test results for "Smooth"

| Alpha VG Studio Pro output | | | | | EMS | | |
|---|---|---|---|---|---|---|---|
| Delta time | MIDI message | Channel | Note | velocity | In EMS notation | transcription | Notes |
| 46 | 14 | 2 | 83 | 62 | | | |
| 70 | 14 | 2 | 27 | 53 | | | |
| 23 | 14 | 2 | 38 | 43 | | | |
| 46 | 14 | 2 | 56 | 47 | | | |
| 23 | 14 | 2 | 19 | 57 | | | |
| 23 | 14 | 2 | 103 | 61 | | | |
| 93 | 14 | 2 | 70 | 55 | | | |
| 46 | 14 | 2 | 34 | 59 | | | |
| 23 | 14 | 2 | 89 | 65 | | | |
| 70 | 14 | 2 | 120 | 59 | | | |
| 23 | 14 | 2 | 3 | 49 | | | |
| 23 | 14 | 2 | 5 | 40 | | | |
| 46 | 14 | 2 | 44 | 47 | | | |
| 23 | 14 | 2 | 81 | 57 | | | |
| 23 | 14 | 2 | 72 | 66 | | | |
| 46 | 14 | 2 | 64 | 70 | | | |
| 70 | 8 | 2 | 76 | 0 | | | |
| 23 | 14 | 2 | 0 | 64 | | | |
| 46 | 9 | 2 | 76 | 127 | 76 B | 74 B2 | wrong pitch |
| 163 | 14 | 2 | 12 | 60 | | 74 R | match* |
| 23 | 14 | 2 | 123 | 55 | | | |
| 46 | 14 | 2 | 31 | 42 | | | |
| 23 | 14 | 2 | 107 | 33 | | | |
| 23 | 14 | 2 | 79 | 20 | | | |
| 23 | 14 | 2 | 111 | 4 | | | |
| 23 | 14 | 2 | 0 | 0 | | | |
| 23 | 8 | 2 | 76 | 0 | | | |
| 23 | 14 | 2 | 0 | 64 | | | |
| 23 | 9 | 2 | 72 | 127 | 72 | 72 | match |
| 93 | 8 | 2 | 72 | 0 | | | |
| 70 | 9 | 3 | 69 | 127 | 69 B | 69 | match |
| 163 | 14 | 3 | 69 | 60 | | | |
| 46 | 14 | 3 | 0 | 64 | | | |
| 46 | 14 | 3 | 87 | 68 | | | |
| 116 | 14 | 3 | 1 | 61 | | | |
| 139 | 14 | 3 | 75 | 68 | | | |
| 23 | 14 | 3 | 115 | 71 | | | |
| 23 | 14 | 3 | 76 | 75 | | | |
| 70 | 14 | 3 | 23 | 63 | | | |
| 23 | 14 | 3 | 11 | 59 | | | |
| 70 | 14 | 3 | 78 | 64 | | | |
| 23 | 14 | 3 | 3 | 78 | | | |
| 23 | 14 | 3 | 86 | 83 | | | |
| 23 | 14 | 3 | 55 | 87 | | | |
| 70 | 14 | 3 | 118 | 74 | | | |
| 23 | 14 | 3 | 95 | 63 | | | |
| 23 | 14 | 3 | 84 | 59 | | | |
| 46 | 14 | 3 | 25 | 67 | | | |
| 23 | 14 | 3 | 32 | 80 | | | |
| 23 | 14 | 3 | 110 | 88 | | | |
| 23 | 14 | 3 | 69 | 92 | | | |
| 46 | 14 | 3 | 3 | 89 | | | |
| 23 | 8 | 3 | 69 | 0 | | | |
| 23 | 14 | 3 | 0 | 64 | | | |
| 1022 | 9 | 3 | 68 | 127 | 68 B | 68 | match |
| 255 | 14 | 3 | 41 | 94 | | | |
| 23 | 11 | 3 | 103 | 2 | H | 69 H | match |
| 163 | 8 | 3 | 68 | 0 | | | |
| 23 | 14 | 3 | 0 | 64 | | | |
| 46 | 9 | 2 | 71 | 127 | 71 | 71 | match |
| 139 | 8 | 2 | 71 | 0 | | | |
| 139 | 9 | 2 | 71 | 127 | 71 B | 71 B1 | match |
| 186 | 14 | 2 | 11 | 68 | | 71 R | match* |
| 23 | 14 | 2 | 90 | 73 | | | |
| 23 | 14 | 2 | 30 | 87 | | | |
| 23 | 14 | 2 | 63 | 92 | | | |
| 46 | 14 | 2 | 106 | 95 | | | |
| 46 | 14 | 2 | 42 | 85 | | | |
| 23 | 14 | 2 | 18 | 72 | | | |
| 23 | 14 | 2 | 45 | 64 | | | |
| 23 | 14 | 2 | 25 | 60 | | | |
| 163 | 14 | 2 | 70 | 56 | | | |
| 23 | 8 | 2 | 71 | 0 | | | |
| 23 | 14 | 2 | 0 | 64 | | | |
| 70 | 9 | 3 | 69 | 127 | 69 | 69 | match |
| 116 | 8 | 3 | 69 | 0 | | | |
| 46 | 9 | 2 | 71 | 127 | 71 B | 71 | match |
| 209 | 14 | 2 | 82 | 92 | | | |
| 23 | 11 | 2 | 103 | 2 | H | 72 H | match |
| 163 | 8 | 2 | 71 | 0 | | | |
| 23 | 14 | 2 | 0 | 64 | | | |
| 0 | 9 | 3 | 69 | 127 | 69 B | 69 | match |
| 70 | 14 | 3 | 78 | 60 | | | |
| 70 | 8 | 3 | 69 | 0 | | | |
| 23 | 14 | 3 | 0 | 64 | | | |
| 23 | 9 | 3 | 69 | 127 | 69 B | 69 | match |
| 186 | 14 | 3 | 62 | 60 | | | |
| 23 | 14 | 3 | 13 | 64 | | | |
| 139 | 14 | 3 | 21 | 60 | | | |
| 139 | 14 | 3 | 36 | 71 | | | |
| 93 | 14 | 3 | 7 | 75 | | | |
| 23 | 14 | 3 | 29 | 63 | | | |
| 23 | 14 | 3 | 96 | 57 | | | |
| 70 | 14 | 3 | 16 | 64 | | | |
| 23 | 14 | 3 | 109 | 73 | | | |
| 23 | 14 | 3 | 10 | 80 | | | |
| 70 | 14 | 3 | 89 | 75 | | | |
| 23 | 14 | 3 | 76 | 60 | | | |
| 93 | 14 | 3 | 117 | 64 | | | |
| 23 | 14 | 3 | 80 | 74 | | | |
| 23 | 14 | 3 | 99 | 79 | | | |
| 46 | 14 | 3 | 11 | 75 | | | |
| 23 | 8 | 3 | 69 | 0 | | | |
| 23 | 14 | 3 | 0 | 64 | | | |

*Releases (notated R) show up here as bends

Test results for "Ramble On"

| Alpha VG Studio Pro output | | | | | EMS | | |
|---|---|---|---|---|---|---|---|
| Delta time | MIDI message | Channel | Note | velocity | In EMS notation | transcription | Notes |
| 1765 | 9 | 6 | 40 | 127 | 40 B | 40–47 | match |
| 23 | 9 | 5 | 47 | 127 | 47 B | | match |
| 139 | 14 | 6 | 109 | 58 | | | |
| 186 | 8 | 6 | 40 | 0 | | | |
| 23 | 14 | 6 | 0 | 64 | | | |
| 23 | 14 | 5 | 56 | 50 | | | |
| 0 | 9 | 6 | 40 | 127 | 40 | 40–47 | match |
| 23 | 14 | 5 | 10 | 47 | | | |
| 23 | 14 | 5 | 1 | 66 | | | |
| 46 | 14 | 5 | 94 | 62 | | | |
| 93 | 14 | 5 | 127 | 127 | | | |
| 0 | 8 | 6 | 40 | 0 | | | |
| 23 | 8 | 5 | 47 | 0 | | | |
| 0 | 11 | 5 | 103 | 2 | H | | note detected as hammer-on |
| 23 | 14 | 5 | 0 | 64 | | | |
| 0 | 9 | 6 | 40 | 127 | 40 | 40–49 | match |
| 23 | 9 | 5 | 49 | 127 | 49 | | match |
| 325 | 8 | 5 | 49 | 0 | | | |
| 0 | 8 | 6 | 40 | 0 | | | |
| 46 | 9 | 5 | 49 | 127 | 49 B | 40–49 | match |
| 0 | 9 | 6 | 40 | 127 | 40 | | match |

-continued

Test results for "Ramble On"

| Alpha VG Studio Pro output | | | | | EMS | | |
|---|---|---|---|---|---|---|---|
| Delta time | MIDI message | Channel | Note | velocity | In EMS notation | transcription | Notes |
| 186 | 14 | 5 | 28 | 51 | | | |
| 0 | 8 | 6 | 40 | 0 | | | |
| 23 | 8 | 5 | 49 | 0 | | | |
| 23 | 14 | 5 | 0 | 64 | | | |
| 0 | 9 | 6 | 40 | 127 | 40 | 40–47 | match |
| 23 | 9 | 5 | 47 | 127 | 47 | | match |
| 348 | 8 | 5 | 47 | 0 | | | |
| 0 | 8 | 6 | 40 | 0 | | | |
| 46 | 9 | 5 | 47 | 127 | 47 B | 40–47 | match |
| 0 | 9 | 6 | 40 | 127 | 40 | | match |
| 163 | 8 | 6 | 40 | 0 | | | |
| 46 | 9 | 6 | 43 | 127 | 43 B | 43 | match |
| 186 | 14 | 6 | 51 | 74 | | | |
| 23 | 14 | 5 | 100 | 69 | | | |
| 0 | 14 | 6 | 49 | 98 | | | |
| 23 | 8 | 5 | 47 | 0 | | | |
| 0 | 11 | 6 | 103 | 2 | H | 44 H | match |
| 23 | 14 | 5 | 0 | 64 | | | |
| 93 | 14 | 6 | 40 | 82 | | | |
| 23 | 9 | 5 | 47 | 127 | 47 P | 47 | match |
| 0 | 14 | 6 | 0 | 0 | | | |
| 0 | 11 | 6 | 103 | 3 | | | |
| 23 | 14 | 6 | 0 | 0 | | | |
| 116 | 14 | 6 | 0 | 0 | | | |
| 23 | 14 | 6 | 0 | 0 | | | |
| 23 | 8 | 5 | 47 | 0 | | | |
| 0 | 8 | 6 | 43 | 0 | | | |
| 23 | 14 | 6 | 0 | 64 | | | |
| 23 | 9 | 5 | 47 | 127 | 47 B | 40–47 | match |
| 0 | 9 | 6 | 40 | 127 | 40 | | match |
| 255 | 14 | 5 | 49 | 60 | | | |
| 116 | 8 | 6 | 40 | 0 | | | |
| 23 | 8 | 5 | 47 | 0 | | | |
| 23 | 14 | 5 | 0 | 64 | | | |
| 0 | 9 | 6 | 40 | 127 | 40 | 40–47 | match |
| 23 | 9 | 5 | 47 | 127 | 47 B | | match |
| 93 | 14 | 5 | 81 | 60 | | | |
| 70 | 8 | 5 | 47 | 0 | | | |
| 0 | 8 | 6 | 40 | 0 | | | |
| 23 | 14 | 5 | 0 | 64 | | | |
| 23 | 9 | 5 | 49 | 127 | 49 | 40–49 | match |
| 0 | 9 | 6 | 40 | 127 | 40 | | match |
| 372 | 8 | 5 | 49 | 0 | | | |
| 0 | 8 | 6 | 40 | 0 | | | |
| 46 | 9 | 5 | 49 | 127 | 49 | 40–49 | match |
| 0 | 9 | 6 | 40 | 127 | 40 | | match |
| 139 | 8 | 5 | 49 | 0 | | | |
| 23 | 8 | 6 | 40 | 0 | | | |
| 46 | 9 | 6 | 40 | 127 | 40 B | 40–47 | match |
| 23 | 9 | 5 | 47 | 127 | 47 | | match |
| 46 | 14 | 6 | 28 | 68 | | | |
| 325 | 8 | 5 | 47 | 0 | | | |
| 0 | 8 | 6 | 40 | 0 | | | |
| 23 | 14 | 6 | 0 | 64 | | | |
| 23 | 9 | 5 | 47 | 127 | 47 | 40–47 | match |
| 0 | 9 | 6 | 40 | 127 | 40 | | match |
| 163 | 8 | 5 | 47 | 0 | | | |
| 0 | 8 | 6 | 40 | 0 | | | |
| 46 | 9 | 5 | 47 | 127 | 47 B | | possible extra note |
| 0 | 9 | 6 | 43 | 127 | 43 B | 43 | match |
| 70 | 14 | 5 | 60 | 60 | | | |
| 139 | 14 | 6 | 84 | 89 | | | |
| 23 | 8 | 5 | 47 | 0 | | | |
| 0 | 11 | 6 | 103 | 2 | H | 44 H | match |
| 23 | 14 | 5 | 0 | 64 | | | |
| 0 | 14 | 6 | 82 | 94 | | | |
| 116 | 14 | 6 | 87 | 99 | | | |
| 23 | 14 | 6 | 69 | 82 | | | |
| 23 | 14 | 6 | 0 | 0 | | | |
| 0 | 11 | 6 | 103 | 3 | P | | extra pull-off |
| 23 | 9 | 5 | 47 | 127 | 47 | 47 | match |
| 0 | 14 | 6 | 0 | 0 | | | |
| 46 | 14 | 6 | 0 | 0 | | | |
| 23 | 14 | 6 | 0 | 0 | | | |
| 70 | 14 | 6 | 0 | 0 | | | |
| 23 | 8 | 6 | 43 | 0 | | | |
| 23 | 14 | 6 | 0 | 64 | | | |
| 464 | 14 | 5 | 70 | 49 | | | |
| 23 | 8 | 5 | 47 | 0 | | | |
| 23 | 14 | 5 | 0 | 64 | | | |

TABLE 7

Complete MIDI Guitar Systems

| Manufacturer/Model | Pickup | Audio-to-MIDI | Price | Notes |
|---|---|---|---|---|
| Fender | Hexaphonic Magnetic (Roland GK-2A) | "Roland ready"* | | No info on web. (discontinued?) |
| Ovation | Hexaphonic Magnetic (Roland GK-2A) | "Roland ready"* | | No info on web. (discontinued?) |
| Takamine | Hexaphonic Magnetic Shadow? | Shadow SH-075 | | No info on web. (discontinued?) |
| Godin/ LGX-SA | Piezo (LR Baggs) | Roland compatible* | | |
| Brian Moore/ I2p | Piezo (RMC) | Virtual DSP | $1700 | |
| Parker/ MIDIFly | Piezo (LR Baggs/ Fishman) | Virtual DSP | $3600 | |
| John Birch | Hexaphonic Magnetic | M3 guitar to MIDI | L700 | Works w/bass. Not compatible w/others? |

*Axon audio-to-MIDI is compatible with Roland.

TABLE 8

Guitars using other technologies

| Manufacturer/Model | Pickup | Audio-to-MIDI | Price | Notes |
|---|---|---|---|---|
| Zeta/ Mirror 6 | Probably Hexaphonic Magnetic | Wired fret board Pitch tracking for bends | $3800 (1988) | Fast. From 1980s. Open strings, slow oxidation! |
| Gibson/ Infinity | | Fret sensing | | Not much info. Not produced recently |
| Starr Labs/ Ztar | None | Really a keyboard | $2000–$3000 | Really a keyboard. Can have string triggers. Cost depends on model |
| K-Muse/ Photon | Optical | Its own non-MIDI system | $2000 | Optical pickup may have less crosstalk. (Obsolete data) |

TABLE 8-continued

Guitars using other technologies

| Manufacturer/Model | Pickup | Audio-to-MIDI | Price | Notes |
|---|---|---|---|---|
| Yamaha/G10 | None | Ultrasonic fret sensing | | Doesn't produce guitar audio |

TABLE 9

Pickups/Preamps

| Manufacturer/Model | Type of pickup | Comments |
|---|---|---|
| Roland/GK-2A | Hexaphonic, magnetic | "workhorse of MIDI guitar pickups". Includes pre-amp with 13-pin out. |
| Axon/101 Shadow/SH-1550 | Hexaphonic, magnetic | Very similar to Roland GK-2A. 13-pin out. Make both magnetic and piezo. (hexaphonic may only come in magnetic) Full system -- Combined w/SH075 audio-to-MIDI. Guitar all the way to 5-pin MIDI. |
| RMC (LR Baggs/Fishman are similar to RMC) | Hexaphonic piezo | Described as "best for MIDI". Will sound more like an acoustic guitar. Company is in Berkeley. Separate pre-amp w/ 13-pin out. |
| Hoag Lightbeam Bono Electronics | Hexaphonic optical. Make both piezo and magnetic hexaphonic. | |

TABLE 10

Audio-to-MIDI Hardware

| Manufacturer/Model | Technology | Speed | Accuracy | Notes |
|---|---|---|---|---|
| Axon | Neural Net Uses transient only. | Very Fast. 1 period + 0.5 ms 13 ms for low E | May be worse than Roland (not tested in-house) | Works w/magnetic and piezo bridges. |
| Roland | period timing | Slow. May take 24–30 ms for low E | Fair | Roland is the standard. |
| Virtual DSP | | Fast | May be good (not tested in-house) | Expensive. Complete system w/ piezo bridges. No 13-pin connector. |
| Shadow | | Fast. (not tested in-house) Claims 1 period for "optimum conditions" | | Not much web info about shadow audio-to-MIDI hardware. Shadow seems to focus more on pickups. |

TABLE 11

Audio-to-MIDI Software

| Manufacturer/Model | Technology | Speed/polyphony | Accuracy | Notes |
|---|---|---|---|---|
| Wildcat/Autoscore | Stat. analysis through neural nets, fuzzy logic, multivar. statistic techniques" | Not real-time/monophonic | Depends on source. Error rates of "1–2 notes per minute (voice)" and 10%–15% (sax). | $100–$200. Company in Berkeley. Many positive reviews on web. |
| Akoff/Music Composer | | Not real-time/polyphonic | Claims pitch recog. (in general) is only 60%–70% accurate as a whole. | Available for NT |
| Digital Ear | | Not real-time/monophonic | Good. An independent review placed it better than Intelliscore and Inst2midi. | $80 Yamaha recommends this software. Positive reviews on web. |

TABLE 11-continued

Audio-to-MIDI Software

| Manufacturer/ Model | Technology | Speed/ polyphony | Accuracy | Notes |
|---|---|---|---|---|
| Intelliscore | Neither FFT or wavelets | Both real-time and non-real-time/ version available/ polyphonic | Good. Not quite as good as digital ear but better than inst2midi. | Available for NT. Website claims that neither FFT or wavelets work, but wavelets might be better. Company offers DLL for app dev. |
| Inst2Midi | Compares ratio of partials | Real-time/ monophonic | Poor. Worse than both digital ear and Intelliscore. | Comparing ratios of partials is only important for instruments w/o a strong fundamental. |
| Araki/ Amazing Midi | | Not real-time/ polyphonic | Claims to be good for things "like piano or guitar" | Available for NT |

What is claimed is:

1. A data acquisition apparatus, comprising:
means for combining an output from a guitar pickup with the output from a hand position sensor into a digital data stream; and
means for storing said digital data stream into a data file.

2. An apparatus as recited in claim 1, wherein said means for combining comprises a computer system adapted for extracting note pitch and duration information from said output of said guitar pickup and for extracting guitar specific playing techniques from said hand position sensor.

3. An apparatus as recited in claim 2, wherein said means for combining generates a digital data stream containing representations of notes being played and techniques utilized to play said notes.

4. An apparatus as recited in claim 2, wherein said output from said guitar pickup registers the motion of a particular string and does not comprise audio of a piece being played.

5. An apparatus as recited in claim 1:
wherein said means for combining determines a plurality of guitar specific playing techniques from the guitar pickup and hand position sensor; and
wherein said plurality of guitar specific playing techniques need not be entered manually to generate said digital data stream.

6. An apparatus as recited in claim 1, wherein said means for storing said digital data stream comprises a computer system adapted for converting said digital data stream into a data file adapted for storage on a computer media.

7. An apparatus as recited in claim 1, further comprising means for playing said data file by generating audio for a given musical piece in addition to animated images of guitar playing techniques utilized.

8. An apparatus as recited in claim 7, wherein said animated images include the display of the entire guitar or active portions thereof.

9. An apparatus as recited in claim 8, wherein said active portions comprise strings; frets, and board.

10. An apparatus as recited in claim 7, wherein said animated images include the display of guitar fingering.

11. An apparatus as recited in claim 7, wherein said animated images include representations of a musician's hands.

12. An apparatus as recited in claim 11, wherein said musician's hands are selectively shown in response to user selected settings.

13. An apparatus as recited in claim 11, wherein the display of said musician's hands is user selectable from the group of representation techniques consisting essentially of fingertips, outlines, semi-transparent renditions, or combinations thereof.

14. An apparatus as recited in claim 7, wherein said means for playing said data file is adapted for allowing the user to control the playing speed and repetitions.

15. An apparatus as recited in claim 7, wherein said means for playing said data file is adapted for allowing the user to change preferences on how aspects of the data file are played visually or aurally or both visually and aurally.

16. An apparatus as recited in claim 7, wherein said means for playing said data file is adapted for allowing the user to change viewing angles.

17. An apparatus as recited in claim 7, wherein said means for playing said data file is adapted for generating an off-line, hardcopy, output.

18. An apparatus as recited in claim 7, wherein said data files may be shared or otherwise communicated over a network.

19. A data acquisition apparatus, comprising:
means for combining an output from a guitar pickup with the output from a hand position sensor;
means for digitally encoding said combined outputs into a digital data stream; and
means for storing said data stream on a digital storage device.

20. An apparatus as recited in claim 19:
wherein said means of combining, digitally encoding, and storing comprise a computer and programming associated with said computer for
registering the output from a guitar pickup and a hand position sensing system,
encoding said outputs digitally into a digital data stream, and
storing said digital data stream as a computer readable file.

21. An apparatus as recited in claim 19, wherein said guitar pickup is selected from the group of guitar pickups consisting essentially of optical sensors, magnetic sensors, and piezo-electric sensors.

22. An apparatus as recited in claim 20, wherein said guitar pickup comprises at least one infrared optical sensors with at least one emitter detector pair adapted for being positioned in relation to a string for registering motion therein and generating an analog waveform output.

23. A data acquisition apparatus, comprising:
means for registering note pitch and duration from a guitar pickup in response to a guitar musical piece being played;
means for determining guitar specific playing techniques utilized during playing of said guitar musical piece;
means for digitally encoding and combining said note pitch and duration information with said guitar specific playing techniques into a data stream; and
means for generating a multimedia output of said data stream providing both audio and visual display of said guitar musical piece being played.

24. An apparatus as recited in claim 23, wherein said means for determining guitar specific playing techniques comprises:
a hand position sensor;
said hand position sensor configured to generate signals in response to hand positioning and motions during the playing of said guitar musical piece.

25. An apparatus as recited in claim 23, wherein said means for determining guitar specific playing techniques comprises at least one software routine executable on a computer system for deriving playing techniques from the output of the guitar pickup.

26. An apparatus as recited in claim 23, further comprising:
means for registering guitar audio during play;
wherein additional information is available from which guitar specific playing techniques may be determined.

27. An apparatus as recited in claim 26, wherein said means for registering guitar audio comprises a monitor input that is digitized for use within said means for determining guitar specific playing techniques.

28. An apparatus as recited in claim 26, wherein said means for registering note pitch and duration determines pitches and durations from the guitar pickup but does not register audio output for inclusion in said data stream.

29. An apparatus as recited in claim 26, wherein said means for registering note pitch and duration generates a digital notation of the note pitch and durations.

30. An apparatus as recited in claim 29, wherein said digital notation follows a MIDI format.

31. An apparatus as recited in claim 23, wherein said means for generating a multimedia output comprises:
an audio annunciation system for generating notes following the digitally encoded note pitch and duration information;
a visual display adapted for displaying a representation of a guitar being played; and
means for mapping said guitar playing techniques from said data stream to provide a dynamic visual representation of the playing techniques that were utilized when said guitar musical piece was played.

32. An apparatus as recited in claim 31, further comprising:
a computer screen for displaying said data stream; and
means for mapping said data stream into the representation of a guitar and virtual model of the positioning of the left and right hands.

33. A data acquisition apparatus, comprising:
means for combining the output from a guitar pickup with the output from a hand position sensing system;
means for digitally encoding said combined outputs into a digital data stream;
means for combining said digital data stream with synchronized real-time digital audio and digital video information; and
means for storing said combined digital data stream with synchronized real-time digital audio and digital video information on a computer or other digital storage device.

34. A data acquisition apparatus, comprising:
means for combining the output from a guitar pickup with the output from a hand position sensing system;
means for digitally encoding said combined outputs into a synchronized real-time digital data stream; and
means for playing said digital data stream, or file into which said data stream was stored, wherein audio is generated in response to the registrations of the guitar pickup while animations are generated of a guitar and playing techniques utilized in response to playing techniques registered by said hand position sensing system.

35. A data acqustion system, comprising:
a pickup configured for sensing an analog waveform generated by movement of one or more strings of a stringed musical instrument;
an analog to digital converter configured for digitizing said analog waveform into a digital waveform; and
means for registering hand positioning of a musician when playing said stringed musical instrument.

36. A system as recited in claim 35, wherein said stringed instrument is a guitar or bass.

37. A system as recited in claim 35, wherein said pickup is any conventional guitar pickup adapted for registering the actions of each string separately.

38. A system as recited in claim 35, wherein said pickup is selected from the group of pickup sensors consisting essentially of optical sensors, magnetic sensors, and piezo-electric sensors.

39. A system as recited in claim 38:
wherein said pickup comprises at least one infrared optical sensor with at least one emitter detector pair for each string of said string instrument; and
wherein said pickup is adapted for being positioned proximal to the strings of said stringed instrument for registering motion thereof and generating an analog waveform output in response thereto.

40. A system as recited in claim 35, wherein said means for registering hand positioning comprises a data glove adapted for registering finger position in relation to said strings of said stringed instrument.

41. A system as recited in claim 40, wherein said data glove is further adapted for outputting absolute finger position relative to hand position.

42. A system as recited in claim 35, further comprising means for combining said digital waveform from said optical sensor and finger position data from said data glove into a processed data stream.

43. A system as recited in claim 42, wherein said processed data stream represents a string being played/muted.

44. A system as recited in claim 42, wherein said processed data stream represents a pitch being modified.

45. A system as recited in claim 42, wherein said processed data stream comprises data selected from the group of data consisting essentially of string(s) played, string identification, fret identification, pitch bend, slides, harmonic characteristic of a note, dynamic characteristics of a note, identification of hammer-on, identification of hammer-ff, finger/fret relationship, and event timing.

46. A system as recited in claim 35, further comprising:
   means for generating MIDI data in response to said digital waveform;
   means for detecting guitar specific techniques in said digital waveform and said registered hand positioning; and
   means for encoding information about said guitar specific techniques within said MIDI data to provide a rich MIDI data format wherein said guitar specific techniques are encoded as tablature notations as extensions of the MIDI data format.

47. A system as recited in claim 46, wherein said means for generating MIDI data comprises a computer adapted for executing a program including pitch detection routines from a computer readable storage medium.

48. A system as recited in claim 46, wherein said means for detecting guitar specific techniques comprises a computer adapted for executing a program including guitar specific techniques detection algorithms from a computer readable storage medium.

49. A system as recited in claim 46, wherein said means for encoding information comprises a computer adapted for executing a program from a computer readable storage medium.

50. A system as recited in claim 46, wherein said means for generating MIDI data, detecting guitar specific techniques, and for encoding information comprise a computer adapted for executing a program from a computer readable storage medium.

51. A data acquisition apparatus, comprising:
   means for combining the output from a guitar pickup with the output from a hand position sensor; and
   means for digitally encoding said combined outputs into a digital data stream.

52. An apparatus as recited in claim 51, wherein said guitar pickup comprises an optical pickup.

53. An apparatus as recited in claim 51, wherein said hand position sensor comprises a data glove.

54. A data acquisition apparatus, comprising:
   means for combining the output from a guitar pickup with the output from a hand position sensing system; and
   means for digitally encoding said combined outputs into a digital data stream.

55. A system as recited in claim 54, wherein said pickup is a conventional guitar pickup head capable of registering the action on individual strings of a stringed instrument.

56. A system as recited in claim 54, wherein said pickup is selected from the group of pickup sensors consisting essentially of optical sensors, magnetic sensors, and piezo-electric sensors.

57. A system as recited in claim 54, wherein said guitar pickup comprises an optical pickup.

58. A data acquisition apparatus, comprising:
   a guitar pickup adapted for mounting to a guitar for registering the motion of each of a plurality of guitar strings;
   means for sensing hand positioning of a guitarist when said motion of said guitar strings is being registered; and
   means for combining said string motion and said hand positioning into a data element.

59. An apparatus as recited in claim 58, wherein said guitar pickup comprises a hexaphonic pickup adapted for sensing string motions on a six string guitar.

60. An apparatus as recited in claim 58, wherein said guitar pickup is selected from the group of pickup sensors consisting of optical sensors, magnetic sensors, and piezo-electric sensors.

61. An apparatus as recited in claim 58, wherein said pickup comprises infrared optical sensors with at least one emitter detector pair adapted for registering individual string motion, and said pickup adapted for positioning proximal to each string for registering motion thereof and generating an analog waveform output therefrom.

62. An apparatus as recited in claim 58, wherein said means for sensing hand positioning comprises a data glove adapted for registering finger position in relation to said strings.

63. An apparatus as recited in claim 62, wherein said data glove is further adapted for outputting absolute finger position relative to hand position.

64. An apparatus as recited in claim 58, wherein said data element comprises a data stream, or data file.

65. An apparatus as recited in claim 64, wherein said data stream or data file comprises information on note pitch and duration, as well as information on the techniques utilized to create the given notes and bridges between notes.

66. An apparatus as recited in claim 65, wherein said data stream or data file comprises a stream or file in a rich MIDI format which includes extended tablature notations.

67. A data acqusition system, comprising:
   a sensor adapted for sensing an analog waveform generated by movement of one or more strings of a stringed musical instrument;
   an analog to digital converter configured for digitizing said analog waveform into a digital waveform;
   means for generating a data stream or data file in response to said digital waveform which contains note pitch and duration information;
   means for detecting guitar specific techniques which were utilized during said movement of said strings to create said digital waveforms; and
   means for encoding information about said guitar specific techniques within said data stream or data file.

68. A system as recited in claim 67, wherein said sensor is selected from the group of stringed instrument pickup sensors consisting of optical sensors, magnetic sensors, and piezo-electric sensors.

69. A system as recited in claim 67, wherein said pickup comprises infrared optical sensors with at least one emitter detector pair adapted for being positioned in relation to a string for registering motion therein and generating an analog waveform output.

70. A system as recited in claim 67, wherein said data stream or data file comprises MIDI data according to a rich MIDI format with tablature extensions corresponding to said guitar specific techniques.

71. A system as recited in claim 67, wherein said processed data stream or data file comprises data selected from the group of data consisting essentially of string(s) played, string identification, fret identification, pitch bend, harmonic characteristic of a note, dynamic characteristics of a note, identification of hammer-on, identification of hammer-off, and event timing.

72. A data acquisition apparatus, comprising:
  a computer; and
  programming associated with said computer for carrying out the operations of extracting note pitch and duration information from an output of a guitar pickup;
    extracting guitar specific playing techniques from a hand position sensing system;
    combining the output from said guitar pickup with the output from said hand position sensing system into a digital data stream; and
    converting said digital data stream into a data file adapted for storage on a computer media.

73. An apparatus as recited in claim 72, wherein said digital data stream comprises representations of notes being played and the techniques utilized to play said notes.

74. An apparatus as recited in claim 72, wherein said output from said guitar pickup registers the motion of a particular string and does not comprise audio of a piece being played.

75. An apparatus as recited in claim 72, further comprising means for playing said data file by generating audio for a given musical piece in addition to animated images of the guitar playing techniques utilized.

76. An apparatus as recited in claim 75, wherein said animated images include the display of the entire guitar or active portions thereof.

77. An apparatus as recited in claim 76, wherein said active portions comprise strings, frets, and board.

78. An apparatus as recited in claim 75, wherein said animated images include the display of guitar fingering.

79. An apparatus as recited in claim 75, wherein said animated images include representations of the musicians hands.

80. An apparatus as recited in claim 79, wherein said musicians hands are selectively shown in response to user selected settings.

81. An apparatus as recited in claim 79, wherein the display of said musicians hands are user selectable from the group of representation techniques consisting of fingertips, outlines, semi-transparent renditions, or combinations thereof.

82. An apparatus as recited in claim 75, wherein said means for playing said data file is adapted for allowing the user to control the playing speed and repetitions.

83. An apparatus as recited in claim 75, wherein said means for playing said data file is adapted for allowing the user to change preferences on how aspects of the data file are played visually or aurally or both visually and aurally.

84. An apparatus as recited in claim 75, wherein said means for playing said data file is adapted for allowing the user to change viewing angles.

85. An apparatus as recited in claim 75, wherein said means for playing said data file is adapted for generating an off-line, hardcopy, output.

86. An apparatus as recited in claim 75, wherein said data files may be shared or otherwise communicated over a network.

87. A data acquisition apparatus, comprising:
  a computer; and
  programming associated with said computer for
    registering the output from a guitar pickup and a hand position sensor,
    encoding said outputs digitally into a digital data stream, and
    storing said digital data stream as a computer readable file.

88. An apparatus as recited in claim 87, wherein said guitar pickup is selected from the group of guitar pickups consisting essentially of optical sensors, magnetic sensors, and piezo-electric sensors.

89. An apparatus as recited in claim 87, wherein said guitar pickup comprises at least one infrared optical sensor with at least one emitter detector pair adapted for being positioned in relation to a string for registering motion therein and generating an analog waveform output.

90. A data acqusition system, comprising:
  a pickup configured for sensing an analog waveform generated by movement of one or more strings of a stringed musical instrument;
  an analog to digital converter configured for digitizing said analog waveform into a digital waveform; and
  a data glove adapted for registering finger position in relation to said strings of said stringed instrument.

91. A system as recited in claim 90, wherein said data glove is further adapted for outputting absolute finger position relative to hand position.

92. A system as recited in claim 90, wherein said stringed instrument is a guitar or bass.

93. A system as recited in claim 90, wherein said pickup is any conventional guitar pickup adapted for registering the actions of each string separately.

94. A system as recited in claim 90, wherein said pickup is selected from the group of pickup sensors consisting essentially of optical sensors, magnetic sensors, and piezo-electric sensors.

95. A system as recited in claim 94:
  wherein said pickup comprises at least one infrared optical sensor with at least one emitter detector pair for each string of said string instrument; and
  wherein said pickup is adapted for being positioned proximal to the strings of said stringed instrument for registering motion thereof and generating an analog waveform output in response thereto.

96. A system as recited in claim 90, further comprising means for combining said digital waveform from said optical sensor and finger position data from said data glove into a processed data stream.

97. A system as recited in claim 96, wherein said processed data stream represents a string being played/muted.

98. A system as recited in claim 96, wherein said processed data stream represents a pitch being modified.

99. A system as recited in claim 96, wherein said processed data stream comprises data selected from the group of data consisting essentially of string(s) played, string identification, fret identification, pitch bend, slides, harmonic characteristic of a note, dynamic characteristics of a note, identification of hammer-on, identification of hammer-off, finger/fret relationship, and event timing.

100. A system as recited in claim 90, further comprising:
  means for generating MIDI data in response to said digital waveform;
  means for detecting guitar specific techniques in said digital waveform and said registered hand positioning; and
  means for encoding information about said guitar specific techniques within said MIDI data to provide a rich MIDI data format wherein said guitar specific techniques are encoded as tablature notations as extensions of the MIDI data format.

101. A system as recited in claim 100, wherein said means for generating MIDI data comprises a computer adapted for executing a program including pitch detection routines from a computer readable storage medium.

102. A system as recited in claim 100, wherein said means for detecting guitar specific techniques comprises a computer adapted for executing a program including guitar specific techniques detection algorithms from a computer readable storage medium.

103. A system as recited in claim 100, wherein said means for encoding information comprises a computer adapted for executing a program from a computer readable storage medium.

104. A system as recited in claim 100, wherein said means for generating MIDI data, detecting guitar specific techniques, and for encoding information comprise a computer adapted for executing a program from a computer readable storage medium.

105. A data acquisition apparatus, comprising:
   a guitar pickup adapted for mounting to a guitar for registering the motion of each of a plurality of guitar strings;
   a data glove adapted for registering finger position of a guitarist in relation to said strings when said motion is being registered;
   a computer; and
   programming associated with said computer for combining said string motion and said hand positioning into a data element.

106. An apparatus as recited in claim 105, wherein said data glove is further adapted for outputting absolute finger position relative to hand position.

107. An apparatus as recited in claim 105, wherein said guitar pickup comprises a hexaphonic pickup adapted for sensing string motions on a six string guitar.

108. An apparatus as recited in claim 105, wherein said guitar pickup is selected from the group of pickup sensors consisting of optical sensors, magnetic sensors, and piezoelectric sensors.

109. An apparatus as recited in claim 105:
   wherein said pickup comprises at least one infrared optical sensor with at least one emitter detector pair adapted for registering individual string motion; and
   wherein said pickup is adapted for positioning proximal to each string for registering motion thereof and generating an analog waveform output therefrom.

110. An apparatus as recited in claim 105, wherein said data element comprises a data stream, or data file.

111. An apparatus as recited in claim 110, wherein said data stream or data file comprises information on note pitch and duration, as well as information on the techniques utilized to create the given notes and bridges between notes.

112. An apparatus as recited in claim 111, wherein said data stream or data file comprises a stream or file in a MIDI format which includes tablature notations as extensions of the MIDI format.

113. A system for automatically generating data describing guitar playing techniques associated with a given piece of guitar music being played by a musician, comprising:
   programming stored on a computer readable media and executable on a computer for
      receiving digitized string motion data from guitar mounted sensors,
      extracting guitar specific playing techniques using guitar specific signal processing algorithms operating on said digitized string motion data, and
      generating a data stream or data file containing information about said guitar specific playing techniques associated with said piece of guitar music.

114. A system as recited in claim 113, wherein said programming carries out the operations of:
   extracting pitch and rhythm from said digital string motion data using signal processing algorithms; and
   combining said pitch and rhythm information into said generated data stream or data file.

115. A system as recited in claim 114, wherein said pitch and rhythm information is extracted in a data stream or data file following a MIDI format.

116. A system as recited in claim 115, wherein said guitar specific playing techniques are encoded as tablature notations as extensions of the MIDI format.

117. A system as recited in claim 113, wherein said digital string motion data is received from a digital data stream.

118. A system as recited in claim 113, wherein said digital string motion data is received from data file that may be accessed by a computer executing said programming.

119. A media adapted for being read by a computer including a computer program which, when executed on a computer system operably connected to a visual display and audio annunciator, causes the computer to perform steps comprising:
   receiving a data stream or data file containing note pitch and duration information, as well as information on guitar specific playing techniques utilized for creating said notes and transitions between notes;
   converting note pitch and duration information from said data stream or said data file into an audio stream adapted for being directed to an audio system for audio playback;
   extracting guitar specific playing techniques from said data file or stream; and
   generating a dynamic image stream of said notes being played on a guitar in response to said extracted guitar specific playing techniques.

120. A media as recited in claim 119, wherein said data stream or data file comprises data selected from the group of data consisting essentially of string(s) played, string identification, fret identification, pitch bend, slides, string muting, harmonic characteristic of a note, dynamic characteristics of a note, identification of hammer-on, identification of hammer-off, finger/fret relationship, and event timing.

121. A media as recited in claim 119, wherein said dynamic image stream comprises non-static computer generated images showing said extracted guitar playing techniques being executed for generating said notes.

122. A data acquisition method, comprising:
   (a) registering string motion as detected by a guitar pickup;
   (b) registering hand positions with a means for sensing hand positions; and
   (c) combining the output from said guitar pickup with the output from said means for sensing hand positions.

123. A method as recited in claim 122, wherein said means for sensing hand positions comprises a data glove.

124. A method as recited in claim 122, wherein string motion is registered using a guitar pickup.

125. A method as recited in claim 124, wherein said guitar pickup is selected from the group of pickups consisting of optical pickups, piezo electric pickups, magnetic pickups, acoustic pickups, and combinations thereof.

126. A method as recited in claim 124, wherein said guitar pickup comprises an optical pickup.

127. A method as recited in claim 122, further comprising digitally encoding said combined outputs into a digital data stream.

128. A data acquisition method, comprising:
(a) combining the output from a standard guitar pickup with the output from a hand position sensing system; and
(b) digitally encoding said combined outputs into a digital data stream.

129. A method as recited in claim 128, wherein said guitar pickup comprises an optical pickup.

130. A method as recited in claim 128, wherein said hand position sensing system comprises a data glove.

131. A data acquisition method, comprising:
(a) digitally encoding the output from a guitar pickup into note pitch and duration information within a digital data stream;
(b) digitally converting the output from a hand position sensing system into notations about playing techniques associated with said pitch and duration information; and
(c) combining said playing technique notations within said digital data stream.

132. A data acquisition method, comprising:
(a) combining the output from a standard guitar pickup with the output from a hand position sensing system;
(b) digitally encoding said combined outputs into a digital data stream; and
(c) storing said data stream on a digital storage device.

133. A method as recited in claim 132, wherein said storage device comprises a computer.

134. A data acquisition method, comprising:
(a) combining the output from a guitar pickup with the output from a hand position sensing system,
(b) digitally encoding said combined outputs into a data stream having notations for note pitch, note duration, and associated playing techniques; and
(c) displaying said data stream as audio accompanied by an animated image sequence of the guitar specific playing techniques utilized when the output from the guitar pickup and hand position sensing system were combined.

135. A method as recited in claim 134, wherein said animated image sequence depicts a representation of a guitar and positioning of the left and right hands of the guitarist.

* * * * *